(12) United States Patent
Nagasaka et al.

(10) Patent No.: US 7,292,228 B2
(45) Date of Patent: Nov. 6, 2007

(54) SCREEN OPERATING DEVICE FOR A VEHICLE

(75) Inventors: Chikao Nagasaka, Aichi-ken (JP);
Yoshimasa Kunimatsu, Aichi-ken (JP);
Yasuhiro Fujioka, Aichi-ken (JP)

(73) Assignee: Kabushiki Kaisha Tokai-Rika-Denki-Seisakusho, Aichi-ken (JP)

(*) Notice: Subject to any disclaimer, the term of this patent is extended or adjusted under 35 U.S.C. 154(b) by 364 days.

(21) Appl. No.: 10/433,697

(22) PCT Filed: Dec. 5, 2001

(86) PCT No.: PCT/JP01/10598

§ 371 (c)(1),
(2), (4) Date: Nov. 21, 2003

(87) PCT Pub. No.: WO02/46902

PCT Pub. Date: Jun. 13, 2002

(65) Prior Publication Data

US 2004/0085352 A1    May 6, 2004

(30) Foreign Application Priority Data

Dec. 5, 2000 (JP) .............................. 2000-370120
Dec. 5, 2000 (JP) .............................. 2000-370121
Dec. 15, 2000 (JP) .............................. 2000-381519

(51) Int. Cl.
*G09G 5/00* (2006.01)

(52) U.S. Cl. ...................... 345/173; 345/55; 345/168; 345/174

(58) Field of Classification Search ................ 345/173, 345/174, 168, 55
See application file for complete search history.

(56) References Cited

U.S. PATENT DOCUMENTS 6,043,809 A * 3/2000 Holehan ...................... 345/168
6,493,461 B1 * 12/2002 Mennie et al. ............... 382/135
6,611,257 B1 * 8/2003 Dotson et al. ............... 345/174
6,650,345 B1 * 11/2003 Saito et al. .................. 715/764

FOREIGN PATENT DOCUMENTS

| JP | 06-149531 | 5/1994 |
|----|-----------|--------|
| JP | 06-187089 | 7/1994 |
| JP | 06-309138 | 11/1994 |
| JP | 06-332620 | 12/1994 |
| JP | 08-249101 | 9/1996 |
| JP | 09-330175 | 12/1997 |

(Continued)

*Primary Examiner*—Richard Hjerpe
*Assistant Examiner*—Leonid Shapiro
(74) *Attorney, Agent, or Firm*—Roberts, Mlotkowski & Hobbes; Thomas W. Cole

(57) ABSTRACT

A screen operating device having good operability is obtained. When a push switch is pressed via a sheet switch within a predetermined time from a finger touching the sheet switch, a click signal is received within a predetermined time from receipt of a touch signal. After receipt of this touch signal, if a click signal is received within a predetermined time, buttons other than a predetermined selection button 32 are not displayed on a screen of a monitor device 26, and processing corresponding to a label displayed on the selection button 32 is carried out. In this way, a specific processing, such as a processing having a high frequency of use or the like, can be carried out rapidly.

21 Claims, 39 Drawing Sheets

FOREIGN PATENT DOCUMENTS

| | | |
|---|---|---|
| JP | 10-111778 | 4/1998 |
| JP | 10-143313 | 5/1998 |
| JP | 10-198492 | 7/1998 |
| JP | 10-293644 | 11/1998 |
| JP | 2000-250697 | 9/2000 |
| JP | 2000242707 A * | 9/2000 |

* cited by examiner

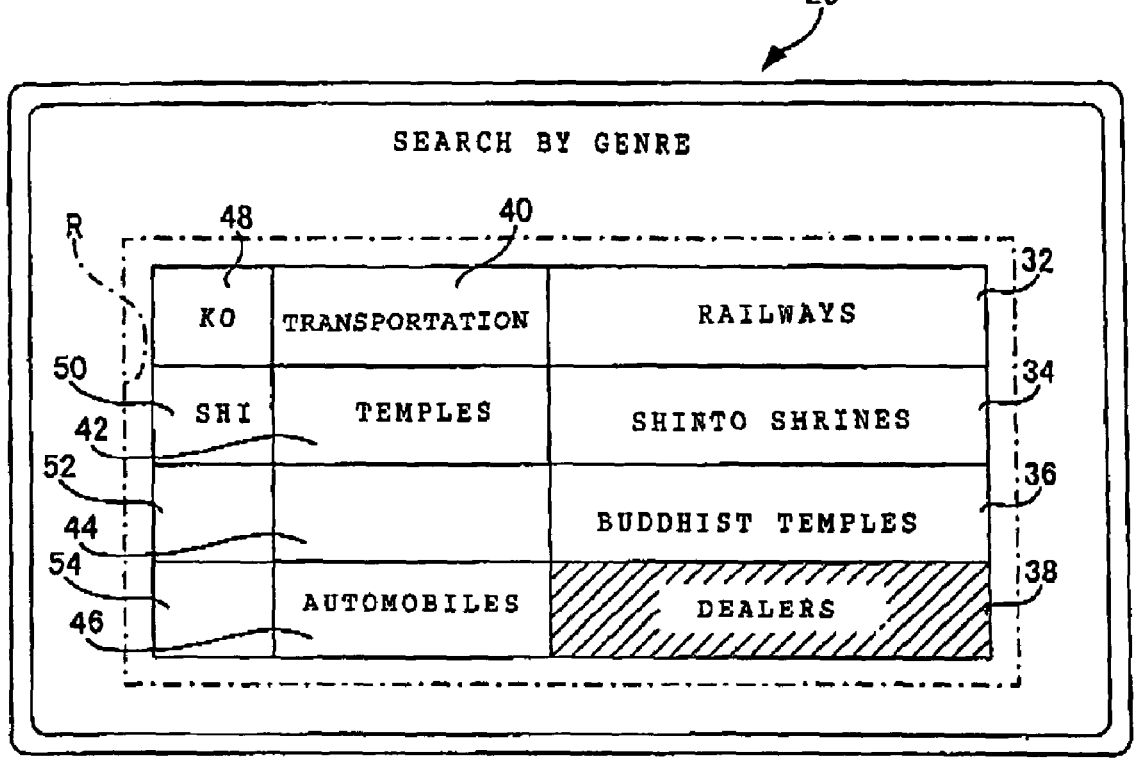

SCREEN OPERATING DEVICE FOR A VEHICLE

TECHNICAL FIELD

The present invention relates to a screen operating device carrying out switching and the like of images which are displayed, for example, on an output screen of a monitor device mounted in a vehicle.

BACKGROUND TECHNOLOGY

In recent years, there has been the trend toward increasing the functions of so-called car navigation devices in which a map, for example, is displayed on an output screen of a monitor device mounted in a vehicle, such that the current position of the vehicle or the like can be confirmed.

On the other hand, basically, an operation button or an operation switch or the like for each function which the car navigation device has is provided at controllers for operating car navigation devices up until now. By operating the operation button or the operation switch corresponding to a desired function, that function is executed.

However, it has become difficult to provide, at a controller, an operation button or an operation switch for each function due to the increase in the functions of car navigation devices as described above, i.e., the large increase in the types of functions.

Further, even if an operation button or an operation switch were provided for each function at one controller, the operation buttons or the operation switches would be extremely small, and the problem that the operability thereof would be poor would arise.

On the other hand, with regard to so-called car audio devices as well which carry out playback of music data or the like recorded on compact discs and carry out receiving and the like of radio broadcasts or television broadcasts, the same problems as with car navigation devices arise due to the increase in the functions of car audio devices in the same way as with the above-described car navigation devices.

In consideration of the above-described circumstances, an object of the present invention is to provide a screen operating device for a vehicle which has good operability.

DISCLOSURE OF THE INVENTION

In order to achieve the above-described object, the screen operating device for a vehicle recited in claim 1 comprises: a case provided within a vehicle cabin, and provided as a separate body from an outputting means which displays an image; position detecting means having, at a reverse surface of a sheet-shaped operation surface which is provided at the case in a state in which an obverse of the operation surface is exposed from the case and whose obverse is a flat surface or a curved surface, a plurality of first line terminals disposed parallel to one another and a plurality of second line terminals disposed parallel to one another along a direction orthogonal to the plurality of first line terminals in a state of being separated from the plurality of first line terminals in a direction of thickness of the operation surface, and when the operation surface is pressed, the position detecting means outputs a position detection signal corresponding to a pressed region on the press surface due to one of the plurality of first line terminals and one of the plurality of second line terminals contacting one another and becoming continuous at the pressed region; pressing force detecting means provided within the case at a side of the second line terminals opposite the operation surface, and in a state in which one of the plurality of first line terminals contacts one of the plurality of second line terminals due to pressing force with respect to the operation surface, when the pressing force is a predetermined value or more, a continuous state arises, and the pressing force detecting means outputs a pressing force detection signal which is different than the position detection signal; and control means provided as a separate body from the outputting means and the case, and displaying an image at the outputting means, and switching or maintaining the image displayed at the outputting means on the basis of a detection signal corresponding to at least one of a presence/absence of the operating body on the operation surface, a position of the operating body on the operation surface, and a locus of movement on the operation surface, among the position detection signal and the pressing force detection signal.

The screen operating device for a vehicle recited in claim 2 has the feature that, in the present invention recited in claim 1, when a pressing force detection signal is not outputted after a predetermined time has elapsed from output of the position detection signal, a predetermined screen is outputted to the outputting means, and when the pressing force detection signal is outputted within the predetermined time, the control means carries out a specific processing other than output of the predetermined screen.

The screen operating device for a vehicle recited in claim 3 has the feature that, in the present invention recited in claim 1, when the position detection signal is outputted continuously after a predetermined time has elapsed from output of the position detection signal, the control means outputs a predetermined screen to the outputting means, and when output of the position detection signal is stopped within the predetermined time, the control means carries out a specific processing other than output of the predetermined screen.

The screen operating device for a vehicle recited in claim 4 has the feature that, in the present invention recited in claim 1, in either one case of a case in which the pressing force detection signal is outputted within a predetermined time from output of the position detection signal and a case in which output of the position detection signal is stopped within a time, which is the same as or different than the predetermined time, from output of the position detection signal, the control means outputs a predetermined screen to the outputting means, and in the other one case, the control means carries out a specific processing other than output of the predetermined screen.

The screen operating device for a vehicle recited in claim 5 has the feature that, in the present invention recited in claim 1, when the control means displays, at the outputting means, a first screen based on a specific function and one or a plurality of function switching portions belonging to another function which is different than the specific function, and the position of the operating body on the operation surface based on the position detection signal corresponds to the function switching portion, the control means displays at the outputting means a second screen based on the other function to which said function switching portion belongs.

The screen operating device for a vehicle recited in claim 6 has the feature that, in the present invention recited in claim 5, in a state in which the control means displays the second screen on the outputting means, when the position detection signal is not outputted, the control means displays the first screen on the outputting means.

The screen operating device for a vehicle recited in claim 7 has the feature that, in the present invention recited in claim 5, in a displayed state of the second screen, the control means displays one or a plurality of selection portions belonging to the other function, and in a state immediately after switching to the second screen, the control means sets the selection portion, which is at a position corresponding to the function switching portion which was selected during display of the first screen immediately before display of the second screen, in a selected state.

The screen operating device for a vehicle recited in claim 8 has the feature that, in the present invention recited in claim 7, the control means displays, at the function switching portion, processing contents at the time of selecting the selection portion which is set in the selected state immediately after the second screen switching.

The screen operating device for a vehicle recited in claim 9 has the feature that, in the present invention recited in claim 6, in a displayed state of the second screen, the control means displays one or a plurality of selection portions belonging to the other function, and in a state immediately after switching to the second screen, the control means sets the selection portion, which is at a position corresponding to the function switching portion which was selected during display of the first screen immediately before display of the second screen, in a selected state.

The screen operating device for a vehicle recited in claim 10 has the feature that, in the present invention recited in claim 9, the control means displays, at the function switching portion, processing contents at the time of selecting the selection portion which is set in the selected state immediately after the second screen switching.

The screen operating device for a vehicle recited in claim 11 has the feature that, in the present invention recited in claim 1, the control means displays data at respective predetermined positions in a display region of the outputting means, and, on the basis of the position detection signal, the control means computes a moving direction of the operating body moving on the operation surface, and the control means moves all of or a portion of the data in a direction substantially opposite to the moving direction, and displays, at the outputting means, data of an outer side of the display region in a direction corresponding to the moving direction.

The screen operating device for a vehicle recited in claim 12 has the feature that, in the present invention recited in claim 11, on the basis of the position detection signal which changes, the control means computes a staying time of the operating body at at least one point of a movement starting point of the operating body on the operation surface, one or plural intermediate points during movement, and a movement ending point, or a moving time from at least one of the points to another one point, and the control means executes movement of the data when the computed staying time or moving time is less than a predetermined value.

The screen operating device for a vehicle recited in claim 13 has the feature that, in the present invention recited in claim 12, on the basis of a predetermined detection signal which the detecting means outputs other than the position detection signal which changes, the control means moves all of or a portion of the data at a speed which is different than a moving speed of the data based on the position detection signal which changes.

The screen operating device for a vehicle recited in claim 14 has the feature that, in the present invention recited in claim 13, on the basis of the position detection signal which changes, the control means computes a staying time of the operating body at least one point of a movement starting point of the operating body on the operation surface, one or plural intermediate points during movement, and a movement ending point, or a moving time from at least one of the points to another one point, and sets a moving speed of the data on the basis of the computed staying time or moving time.

The screen operating device for a vehicle recited in claim 15 has the feature that, in the present invention recited in claim 14, the control means executes movement of the data when the position detection signal, in a case in which the position detecting means detects the operating body whose movement on the operation surface has ended and which is positioned on the operation surface, is not outputted immediately after the position detection signal which changes is outputted.

The screen operating device for a vehicle recited in claim 16 has the feature that, in the present invention recited in claim 11, on the basis of a predetermined detection signal which the detecting means outputs other than the position detection signal which changes, the control means moves all of or a portion of the data at a speed which is different than a moving speed of the data based on the position detection signal which changes.

The screen operating device for a vehicle recited in claim 17 has the feature that, in the present invention recited in claim 16, on the basis of the position detection signal which changes, the control means computes a staying time of the operating body at least one point of a movement starting point of the operating body on the operation surface, one or plural intermediate points during movement, and a movement ending point, or a moving time from at least one of the points to another one point, and sets a moving speed of the data on the basis of the computed staying time or moving time.

The screen operating device for a vehicle recited in claim 18 has the feature that, in the present invention recited in claim 17, the control means executes movement of the data when the position detection signal, in a case in which the position detecting means detects the operating body whose movement on the operation surface has ended and which is positioned on the operation surface, is not outputted immediately after the position detection signal which changes is outputted.

The screen operating device for a vehicle recited in claim 19 has the feature that, in the present invention recited in claim 11, on the basis of the position detection signal which changes, the control means computes a staying time of the operating body at least one point of a movement starting point of the operating body on the operation surface, one or plural intermediate points during movement, and a movement ending point, or a moving time from at least one of the points to another one point, and sets a moving speed of the data on the basis of the computed staying time or moving time.

The screen operating device for a vehicle recited in claim 20 has the feature that, in the present invention recited in claim 19, the control means executes movement of the data when the position detection signal, in a case in which the position detecting means detects the operating body whose movement on the operation surface has ended and which is positioned on the operation surface, is not outputted immediately after the position detection signal which changes is outputted.

The screen operating device for a vehicle recited in claim 21 has the feature that, in the present invention recited in claim 11, the control means executes movement of the data when the position detection signal, in a case in which the position detecting means detects the operating body whose movement on the operation surface has ended and which is positioned on the operation surface, is not outputted immediately after the position detection signal which changes is outputted.

In the screen operating device for a vehicle relating to the present invention recited in claim 1, at the operation surface of the position detecting means which is exposed from the case which is provided as a separate body from the outputting means and the control means, when an operating body pushes the operation surface in a state in which the operating body such as a person's finger or the like is positioned on the operation surface, one of the plurality of first line terminals structuring the position detecting means and one of the plurality of second line terminals which intersect the plurality of first line terminals contact one another due to the pressing force, and become continuous. A position detection signal corresponding to this continuity is inputted to the control means.

On the other hand, in a state in which one of the aforementioned plurality of first line terminals and one of the plurality of second line terminals are continuous, when the operating body presses the operation surface further at a pressing force of a predetermined value or more, the aforementioned pressing force is detected by the pressing force detecting means provided at the reverse surface side of the position detecting means within the case. In this way, when the pressing force is detected by the pressing force detecting means, a pressing force detection signal is outputted from the pressing force detecting means, and further, this pressing force detection signal is inputted to the control means.

If the position detection signal or the pressing force detection signal inputted to the control means is a signal corresponding to at least any one of the presence/absence of the operating body on the operation surface, the position of the operating body on the operation surface, and the locus of movement on the operation surface, the image (screen) displayed on the outputting means is switched or maintained by the control means.

In this way, the operation or the like by the operating body on the operation surface whose operation region is a flat surface or a curved surface is carried out, which is different than a conventional screen operation by a switch or a button. Thus, by applying the present invention to, for example, a car navigation device having many functions or the like, display is switched to a screen corresponding to a desired function, even without disposing a large number of buttons or switches.

Furthermore, for example, by displaying a main menu formed by a plurality of selection portions (as one example, so-called "icons") on the screen of the outputting means, and selecting a selection portion to which the desired function belongs by operation of the operating body on the operation surface, it is possible to also carry out so-called "hierarchical processing" in which a sub menu screen of a selected function which is similarly structured by a plurality of selection portions is displayed, and it is easy to handle the trend toward increasing the functions.

In the screen operating device for a vehicle relating to the present invention recited in claim 2, a position detection signal is outputted from the position detecting means due to an operating body, such as a person's finger or the like, being positioned on the operation surface. When a position detection signal is outputted from the position detecting means, clocking is started by the control means or another clocking means. Further, if a pressing force detection signal is not inputted to the control means even if a predetermined time has elapsed from input of the position detection signal to the control means, a predetermined screen is outputted to the outputting means by the control means.

Accordingly, in this state, the operator can confirm the predetermined screen outputted to the outputting means. For example, if the predetermined screen is a guiding screen for guiding the operation thereafter, the operator can reliably carry out the operation thereafter while confirming the screen.

In contrast, if a pressing force detection hand signal is inputted to the control means within the predetermined time from the input of the position detection signal to the control means, a specific processing other than the output of the predetermined screen to the outputting means is carried out by the control means.

In this way, in a case in which, for example, the processing contents of the specific processing are known even if the outputting means is not confirmed, as described above, the specific processing is executed by applying pressing force to the operation surface within the predetermined time. Thus, processing can be executed quickly as compared with a case in which processing is again carried out after confirming the operation contents at the outputting means. Thus, it is possible to prevent or lessen the operator from having an unpleasant feeling due to a processing delay or the like or output of unnecessary operation contents.

Note that, in the present invention, for example, the aforementioned predetermined screen is outputted to the outputting means, and in this state, the processing which is carried out at the control means or another means by some type of operation may be the same as or different than the aforementioned specific processing.

Further, the aforementioned specific processing of course may be a processing which is completely different than the processing of outputting the aforementioned predetermined screen. For example, it may be a processing of outputting only a portion of the predetermined screen, or may be a processing of outputting a portion of or all of another screen other than the predetermined screen.

In the screen operating device for a vehicle relating to the present invention recited in claim 3, a position detection signal is outputted from the position detecting means due to an operating body, such as a person's finger or the like, being positioned on the operation surface. When the position detection signal is outputted from the position detecting means, clocking is started by the control means or another clocking means. When a predetermined time has elapsed from input of the position detection signal to the control means, and further, the operating body detection hand signal is continuously inputted to the control means, the predetermined screen is outputted by the control means to the outputting means.

Accordingly, in this state, the operator can confirm the predetermined screen outputted to the outputting means. For example, if the predetermined screen is a guiding screen for guiding the operation thereafter, the operator can reliably carry out the operation thereafter while confirming the screen.

In contrast, if output of the position detection signal is stopped within the predetermined time from the input of the position detection signal to the control means, a specific processing other than the output of the predetermined screen to the outputting means is carried out by the control means.

In this way, in a case in which, for example, the processing contents of the specific processing are known even if the outputting means is not confirmed, as described above, the specific processing is executed by moving the operating body away from the operation surface within the predetermined time, or the like. Thus, processing can be executed quickly as compared with a case in which processing is again carried out after confirming the operation contents at the outputting means. Thus, it is possible to prevent or lessen the operator from having an unpleasant feeling due to a processing delay or the like or output of unnecessary operation contents.

Note that, in the present invention, for example, the aforementioned predetermined image is outputted to the outputting means, and in this state, the processing which is carried out at the control means or another means by some type of operation may be the same as or different than the aforementioned specific processing.

Further, the aforementioned specific processing of course may be a processing which is completely different than the processing of outputting the aforementioned predetermined image. For example, it may be a processing of outputting only a portion of the predetermined image, or may be a processing of outputting a portion of or all of another image other than the predetermined screen.

Moreover, the specific processing recited in claim 3 and the specific processing recited in claim 2 may be processings of the same contents, or may be different processings.

In the screen operating device for a vehicle relating to the present invention recited in claim 4, a position detection signal is outputted from the position detecting means due to an operating body, such as a person's finger or the like, being positioned on the operation surface. When a position detecting signal is outputted from the position detecting means, clocking is started by the control means or another clocking means. A predetermined screen is outputted to the outputting means by the control means, in either one case of a case in which a pushing force detection signal is inputted to the control means within a predetermined time from input of a position detection signal to the control means, and a case in which output of the position detection signal is stopped within a time which is the same as or different than the aforementioned predetermined time due to the operating body having been positioned on the operation surface but the operating body being moved away from the operation surface within the predetermined time, or the like.

Accordingly, in this state, the operator can confirm the predetermined screen outputted to the outputting means. For example, if the predetermined screen is a guiding screen for guiding the operation thereafter, the operator can reliably carry out the operation thereafter while confirming the screen.

In contrast, in the other case as opposed to the aforementioned one case, a specific processing other than output of the predetermined screen to the outputting means is carried out by the control means.

In this way, in a case in which, for example, the processing contents of the specific processing are known even if the outputting means is not confirmed, as described above, the specific processing is executed by carrying out an operation resulting in the aforementioned other case. Thus, processing can be executed quickly as compared with a case in which processing is again carried out after confirming the operation contents at the outputting means. Thus, it is possible to prevent or lessen the operator from having an unpleasant feeling due to a processing delay or the like or output of unnecessary operation contents.

Note that, in the present invention, for example, the aforementioned predetermined image is outputted to the outputting means, and in this state, the processing which is carried out at the control means or another means by some type of operation may be the same as or different than the aforementioned specific processing.

Further, the aforementioned specific processing of course may be a processing which is completely different than the processing of outputting the aforementioned predetermined image. For example, it may be a processing of outputting only a portion of the predetermined image, or may be a processing of outputting a portion of or all of another image other than the predetermined screen.

Moreover, the specific processing recited in claim 4 and the specific processing recited in claim 1 or claim 2 may be processings of the same contents, or may be different processings.

In the screen operating device for a vehicle relating to the present invention recited in claim 5, in a state in which a first screen based on a specific function is displayed at the outputting means, when the position detecting means detects the position of the operating body on the operation surface and a position detection signal corresponding to the position of the operating body is outputted from the position detecting means, this position detection signal is inputted to the control means. If the position of the operating body on the operation surface, which is based on the position detection signal inputted to the control means, corresponds to a function switching portion on the first screen, that function switching portion is selected. In this way, a second screen, which is based on the function (another function) to which the selected function switching portion belongs, is displayed.

In this way, in the present screen operating device for a vehicle, even if the first screen which is based on a specific function is displayed, by selecting the function switching portion, it is possible to switch to a second screen which is based on another function. Therefore, the operability at the time of carrying out operations belonging to other functions is good.

Note that it suffices for what is called the second screen here (i.e., the screen based on the other function) to be a screen which can carry out operations based on another function. Provided that operations based on another function can be carried out, a screen based on a function (e.g., a specific function) which is different than the other function may be displayed.

Further, a structure is of course possible in which, when the detecting means detects the operating body at a position, on the operation surface, which is different than the position corresponding to the function selection portion during display of the first screen, work belonging to a specific function based on the first screen is selected or is executed.

In the screen operating device for a vehicle relating to the present invention recited in claim 6, in a state in which the second screen is displayed at the outputting means, if a position detection signal is not outputted, the display of the outputting means is switched by the control means to the first screen which is based on the specific function before switching to the second screen.

Thus, even in a case in which the selected other function is not the desired function or in a case in which operation belonging to the selected other function is finished or the like, there is no need for a special operation for returning to the original screen, and the operability is improved even more.

In the screen operating device for a vehicle relating to the present invention recited in claim 7, one or a plurality of selection portions belonging to another function are displayed on the second screen by the control means. Here, in the present screen operating device for a vehicle, in a state immediately after having switched to the second screen, the selection portion, which is at the position corresponding to the function switching portion which was selected during display of the first screen immediately before the second screen was displayed, is set in a selected state by the control means.

Accordingly, if an execution instruction is carried out immediately after switching to the second screen, processing corresponding to this selection portion is executed. Namely, in the present screen operating device for a vehicle, in a case in which processing corresponding to this selection portion is carried out, there is no need to carrying out the selection work again after having switched to the second screen. Thus, the workability is improved.

In particular, the workability can be improved even more by allotting a processing having a particularly high frequency of use to a selection portion which is set in a selected state immediately after the second screen switching.

In the screen operating device for a vehicle relating to the present invention recited in claim 8, the processing contents of the selection portion which is set in a selected state immediately after second screen switching, are displayed by the control means at the function switching portion. Thus, even during display of the first screen, the processing contents due to selecting that function switching portion and carrying out the execution instruction, are known, and the operability improves even more.

In the screen operating device for a vehicle relating to the present invention recited in claim 9, one or a plurality of selection portions which belong to another function are displayed on the second screen by the control means. Here, in the present screen operating device for a vehicle, in the state immediately after having switched to the second screen, the selection portion, which is at the position corresponding to the function switching portion which was selected during display of the first screen immediately before the second screen was displayed, is set in a selected state by the control means.

Accordingly, if an execution instruction is carried out immediately after switching to the second screen, the processing corresponding to this selection portion is executed. Namely, in the present screen operating device for a vehicle, in a case in which the processing corresponding to this selection portion is carried out, there is no need to again carry out the selection work after the second screen has been switched to. Thus, the workability improves.

In particular, the workability can be improved even more by allotting a processing having a particularly high frequency of use to a selection portion which is set in a selected state immediately after the second screen switching.

In the screen operating device for a vehicle relating to the present invention recited in claim 10, the processing contents of the selection portion which is set in a selected state immediately after second screen switching, are displayed by the control means at the function switching portion. Thus, even during display of the first screen, the processing contents due to selecting that function switching portion and carrying out the execution instruction, are known, and the operability improves even more.

In accordance with the screen operating device for a vehicle relating to the present invention recited in claim 11, when the operating body is positioned on the operation surface in a state in which data is displayed in a display region of the outputting means, the position of the operating body on the operation surface is detected by the position detecting means. Further, when the position detecting means detects the position of the operating body on the operation surface, the position detecting means outputs a position detection signal corresponding thereto, and this position detection signal is inputted to the control means.

Further, when the operating body moves on the operation surface, in accordance therewith, the position of the operating body on the operation surface which the position detecting means detects, changes, and the position detection signal also changes in accordance therewith. At the control means, the moving direction of the operating body on the operation surface is computed on the basis of the inputted position detection signal.

Next, at the control means, all of or a portion of the data displayed at the outputting means is moved in the direction substantially opposite to the computed moving direction, with respect to the display region. In this way, all of or a portion of the data, which was positioned within the display region of the outputting means up until then, is moved out of the display region either continuously or intermittently, from the side in the direction substantially opposite to the computed moving direction. Further, the data, which was up until then positioned outside of the display region at the side opposite the computed moving direction, is moved into the display region from the side substantially opposite to the computed moving direction, and is displayed.

In this way, in the present screen operating device for a vehicle, by moving the data in the direction opposite to the moving direction of the operating body, it appears as if the display region has moved in the moving direction of the operating body.

Here, as described above, in the present screen operating device for a vehicle, movement of the data is carried out by a position detection signal which changes being inputted. Further, the moving direction of the data at this time is carried out by the control means computing the moving direction of the operating body on the operation surface. In this way, if the operating body is moved on the operation surface, even if, thereafter, no operation is carried out or operation is not continued, it is possible to continue moving the data.

In the screen operating device for a vehicle relating to the present invention recited in claim 12, when a position detection signal which changes is outputted from the position detecting means due to the operating body moving on the operation surface, on the basis of this position detection signal, a staying time of the operating body at least one point of a movement starting point of the operating body, one or plural intermediate points during the movement, and a movement ending point, or a moving time from one of these points to another one point, is computed by the control means.

Moreover, when the computed staying time or moving time is less than a predetermined value, movement of data is executed by the control means.

In this way, inadvertent movement of data due to inadvertent movement of the operating body on the operation surface or the like, is prevented or suppressed.

In accordance with the screen operating device for a vehicle relating to the present invention recited in claim 13, when a predetermined detection signal, which is different from the position detection signal which changes and which is based on the movement of the operating body on the operation surface, is outputted from the detecting means, the control means moves all of or a portion of the data at a moving speed which is different than a case in which the position detection signal which changes is inputted.

Accordingly, by properly using the operation for outputting the predetermined detection signal and the movement of the operating body on the operation surface, adjustment of the data moving speed is possible.

In the screen operating device for a vehicle relating to the present invention recited in claim 14, when a position detection signal which changes is outputted from the position detecting means due to the operating body moving on the operation surface, on the basis of this position detection signal which changes, a staying time of the operating body at least one point of a movement starting point of the operating body, one or plural intermediate points during the movement, and a movement ending point, or a moving time from one of these points to another one point, is computed at the control means.

Moreover, the moving speed of the data is set by the control means on the basis of the computed staying time or moving time.

Namely, in the present screen operating device for a vehicle, for example, the data moving speed differs in a case in which the moving speed of the operating body on the operation surface is fast and a case in which it is slow. Accordingly, rapid movement of data and fine adjustment of the data display position and the like are easy.

In accordance with the screen operating device for a vehicle relating to the present invention recited in claim 15, in a case in which movement of the operating body on the operation surface has ended, basically, there are a case in which the operating body is staying on the operation surface in a state in which movement has ended, and a case in which the operating body has been moved away from the operation surface immediately after movement ended.

Here, in the present screen operating device for a vehicle, movement of data by the control means is executed only in cases in which a position detection signal, which is outputted from the position detecting means when the operating body stays on the operation surface in a state in which movement has ended, is not outputted, i.e., only in cases in which the operating body has moved away from the operation surface immediately after movement ended.

Namely, by setting in this way, movement of data is not executed if the operating body is not intentionally moved away from the operation surface. In this way, inadvertent movement of data is prevented or suppressed.

In accordance with the screen operating device for a vehicle relating to the present invention recited in claim 16, when a predetermined detection signal, which is different from the position detection signal which changes on the basis of the movement of the operating body on the operation surface, is outputted from the detecting means, the control means moves all of or a portion of the data at a moving speed which is different than a case in which the position detection signal which changes is inputted.

Accordingly, by properly using the operation for outputting the predetermined detection signal and the movement of the operating body on the operation surface, adjustment of the data moving speed is possible.

In accordance with the screen operating device for a vehicle relating to the present invention recited in claim 17, when a position detection signal which changes is outputted from the position detecting means due to the operating body moving on the operation surface, on the basis of this position detection signal which changes, a staying time of the operating body at least one point of a movement starting point of the operating body, one or plural intermediate points during the movement, and a movement ending point, or a moving time from one of these points to another one point, is computed at the control means.

Moreover, the moving speed of the data is set by the control means on the basis of the computed staying time or moving time.

Namely, in the present screen operating device for a vehicle, for example, the data moving speed differs in a case in which the moving speed of the operating body on the operation surface is fast and a case in which it is slow. Accordingly, rapid movement of data and fine adjustment of the data display position and the like are easy.

In accordance with the screen operating device for a vehicle relating to the present invention recited in claim 18, in a case in which movement of the operating body on the operation surface has ended, basically, there are a case in which the operating body is staying on the operation surface in a state in which movement has ended, and a case in which the operating body has been moved away from the operation surface immediately after movement ended.

Here, in the present screen operating device for a vehicle, movement of data by the control means is executed only in cases in which a position detection signal, which is outputted from the position detecting means when the operating body stays on the operation surface in a state in which movement has ended, is not outputted, i.e., only in cases in which the operating body has moved away from the operation surface immediately after movement ended.

Namely, by setting in this way, movement of data is not executed if the operating body is not intentionally moved away from the operation surface. In this way, inadvertent movement of data is prevented or suppressed.

In accordance with the screen operating device for a vehicle relating to the present invention recited in claim 19, when a position detection signal which changes is outputted from the position detecting means due to the operating body moving on the operation surface, on the basis of this position detection signal which changes, a staying time of the operating body at least one point of a movement starting point of the operating body, one or plural intermediate points during the movement, and a movement ending point, or a moving time from one of these points to another one point, is computed at the control means.

Moreover, the moving speed of the data is set by the control means on the basis of the computed staying time or moving time.

Namely, in the present screen operating device for a vehicle, for example, the data moving speed differs in a case in which the moving speed of the operating body on the operation surface is fast and a case in which it is slow. Accordingly, rapid movement of data and fine adjustment of the data display position and the like are easy.

In accordance with the screen operating device for a vehicle relating to the present invention recited in claim 20, in a case in which movement of the operating body on the operation surface has ended, basically, there are a case in which the operating body is staying on the operation surface in a state in which movement has ended, and a case in which the operating body has been moved away from the operation surface immediately after movement ended.

Here, in the present screen operating device for a vehicle, movement of data by the control means is executed only in cases in which a position detection signal, which is outputted from the position detecting means when the operating body stays on the operation surface in a state in which movement has ended, is not outputted, i.e., only in cases in which the operating body has moved away from the operation surface immediately after movement ended.

Namely, by setting in this way, movement of data is not executed if the operating body is not intentionally moved away from the operation surface. In this way, inadvertent movement of data is prevented or suppressed.

In accordance with the screen operating device for a vehicle relating to the present invention recited in claim 21, in a case in which movement of the operating body on the operation surface has ended, basically, there are a case in which the operating body is staying on the operation surface in a state in which movement has ended, and a case in which the operating body has been moved away from the operation surface immediately after movement ended.

Here, in the present screen operating device for a vehicle, movement of data by the control means is executed only in cases in which a position detection signal, which is outputted from the position detecting means when the operating body stays on the operation surface in a state in which movement has ended, is not outputted, i.e., only in cases in which the operating body has moved away from the operation surface immediately after movement ended.

Namely, by setting in this way, movement of data is not executed if the operating body is not intentionally moved away from the operation surface. In this way, inadvertent movement of data is prevented or suppressed.

BRIEF DESCRIPTION OF THE DRAWINGS

FIG. 55 is a screen example after the start of data movement (high speed scrolling) of the small classification data.

BEST MODES FOR IMPLEMENTING THE INVENTION

Structure of First Embodiment

Figure 1:
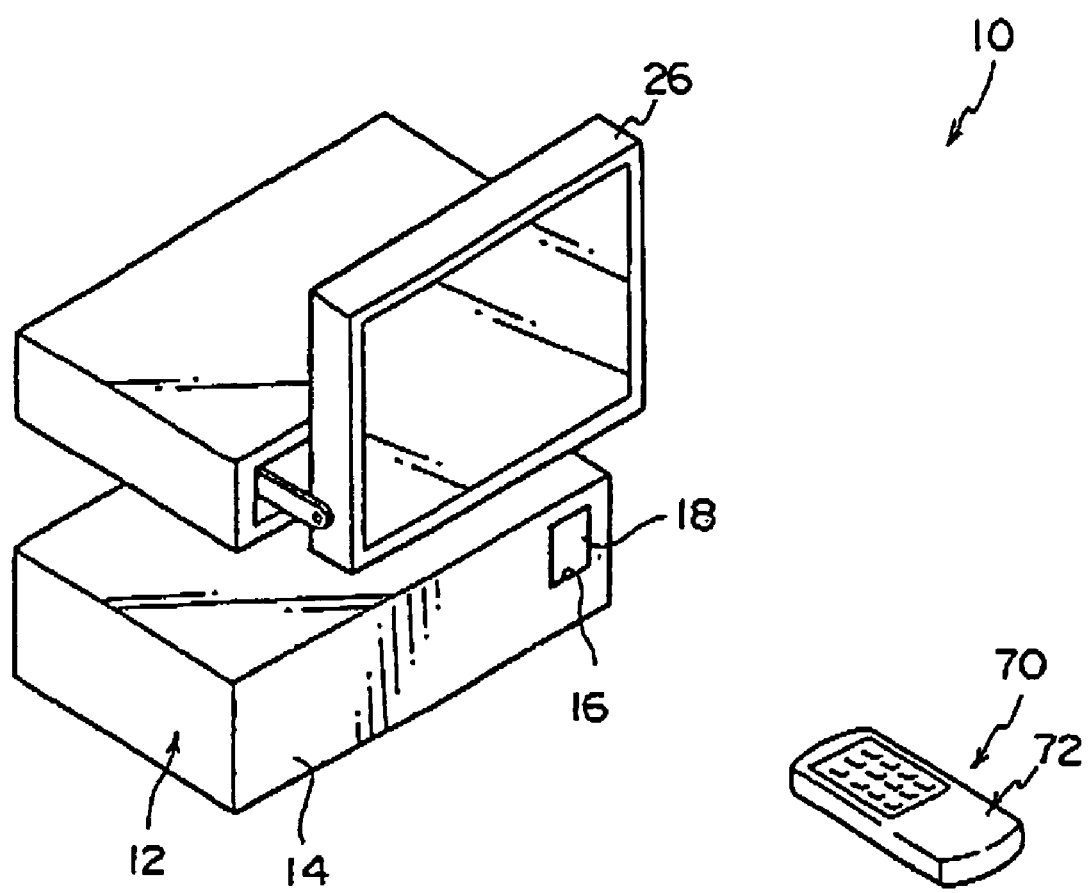
FIG. 1 is a perspective view showing the schematic external appearance of a screen operating device for a vehicle relating to a first embodiment of the present invention.

The schematic external appearance of a car navigation device 10 having, as a function thereof, a screen operating device relating to a first embodiment of the present invention, is shown in FIG. 1. The structure of the present car navigation device 10 is shown by a block diagram in FIG. 2.

Figure 2:
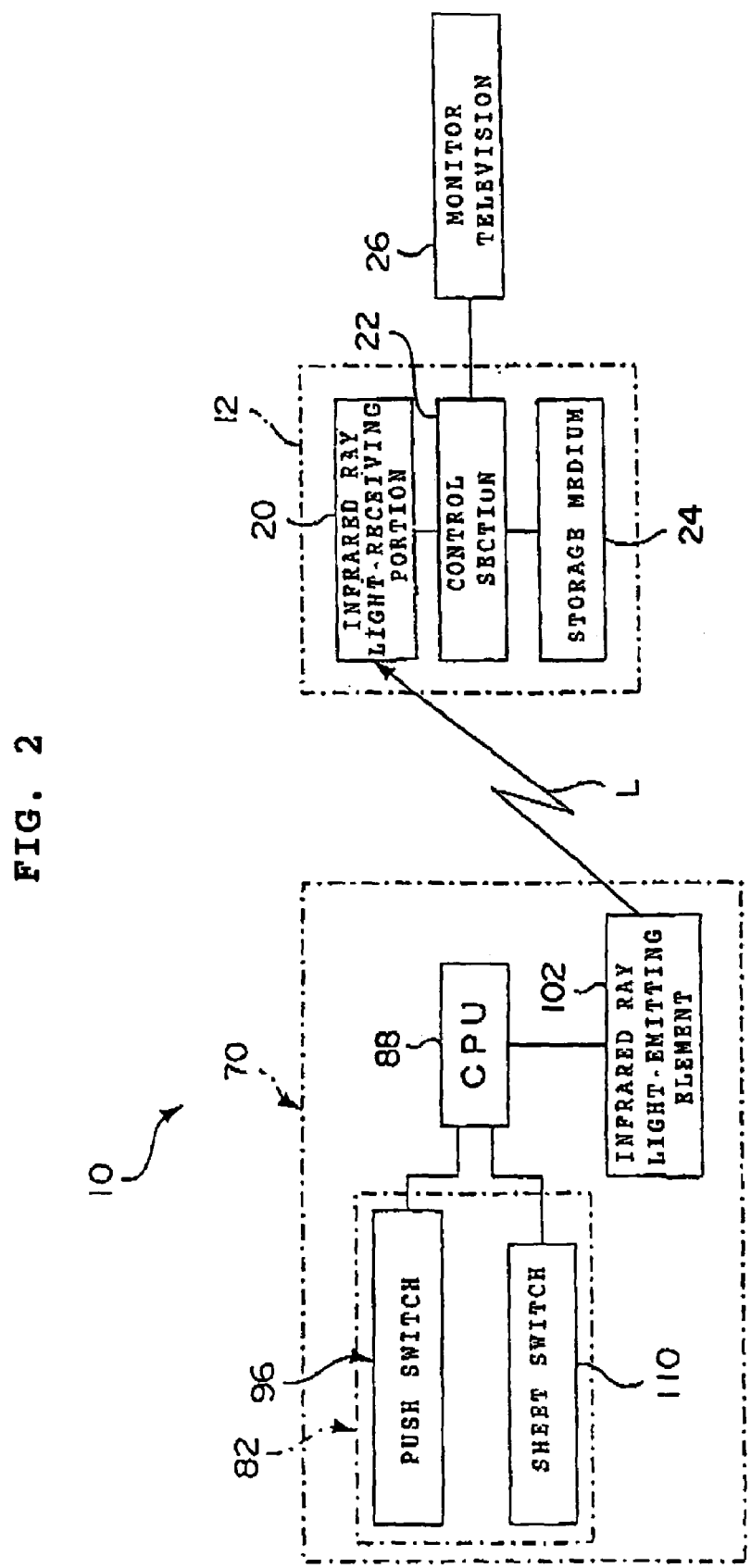
FIG. 2 is a block diagram showing the schematic structure of the screen operating device for a vehicle relating to the first embodiment of the present invention.

As shown in these drawings, the present car navigation device 10 is equipped with a device main body 12 which is accommodated, for example, in an accommodating portion (not shown) formed at the instrument panel of a vehicle. An opening portion 16 is formed in an outer wall portion 14 of the device main body 12. A window 18, which is transparent or which has been colored such that infrared light can pass therethrough, is fit in. An infrared ray light-receiving portion 20 shown in FIG. 2 is provided at the inner side of the device main body 12 via this opening portion 16.

The infrared ray light-receiving portion 20 is connected to a control section 22 serving as a control means such as a CPU or the like provided at the interior of the device main body 12, and transmits, to the control section 22, an electrical signal corresponding to a received infrared ray signal. On the other hand, the control section 22 is connected to a storage medium 24 provided at the interior of the device main body 12 or at the exterior of the device main body 12, and reads various programs stored in the storage medium 24 and processes and executes them.

Further, the control section 22 is connected to a monitor device 26 serving as an outputting means, via a connecting means such as a flat cable or the like. The results of processing and the results of execution at the control section 22 can be displayed.

Figure 8:
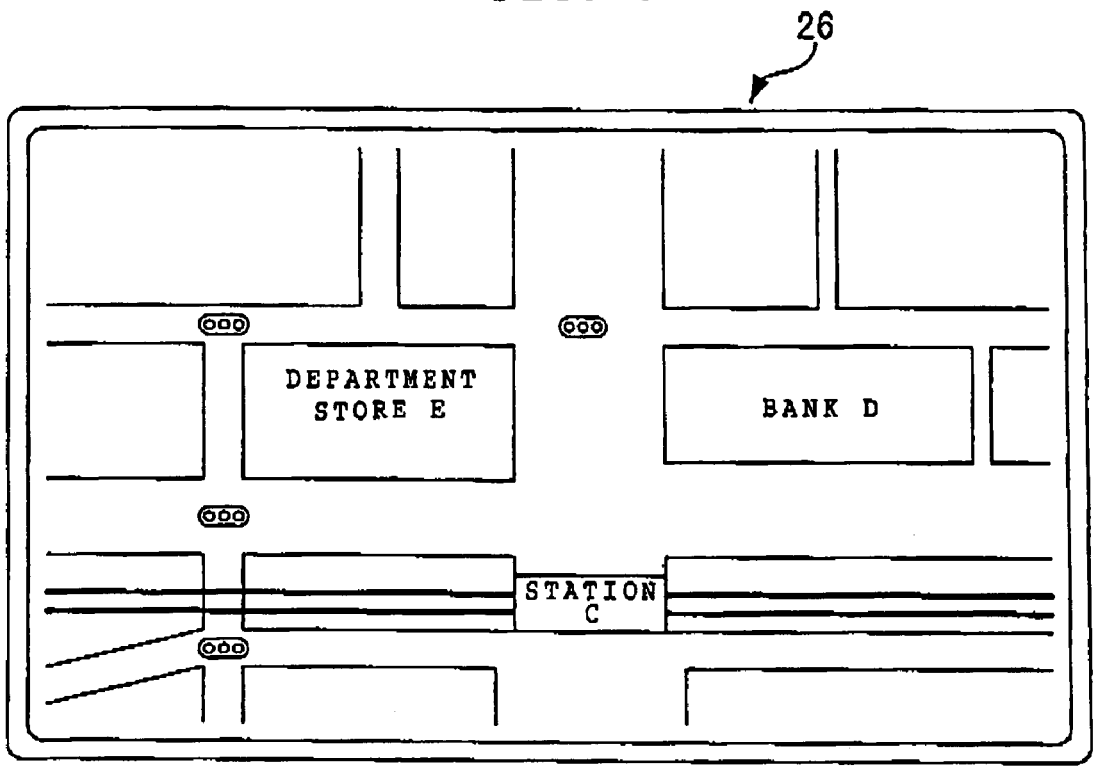
FIG. 8 is a screen example of an outputting means of the screen operating device for a vehicle relating to the first embodiment of the present invention.

Concretely, in the present embodiment, when, for example, the control section 22 reads a car navigation program from the storage medium 24, as shown in FIG. 8, the control section 22 expands map data or the like as a main screen.

Figure 9:
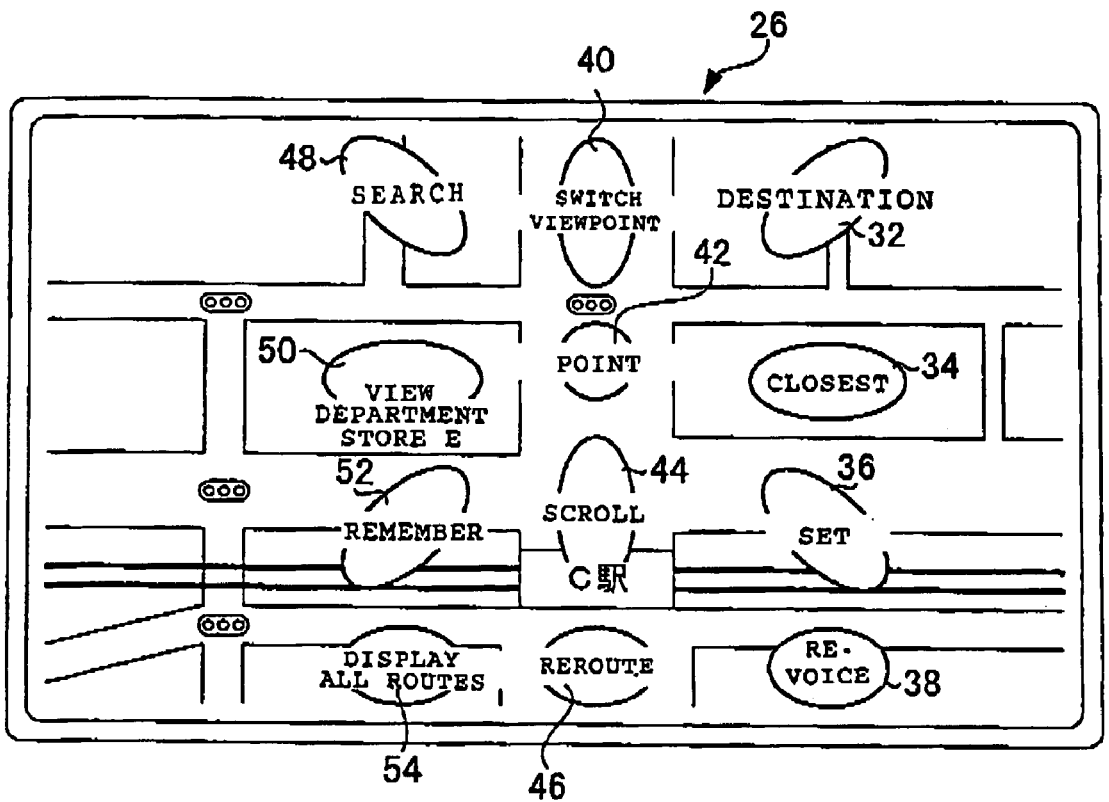
FIG. 9 is a screen example, corresponding to FIG. 8, at the time of usual trace mode processing.

Further, when, for example, the control section 22 executes usual trace mode processing, which will be described later, in the car navigation program from the storage medium 24, as shown in FIG. 9, the control section 22 displays a plurality of selection buttons 32, 34, 36, 38, 40, 42, 44, 46, 48, 50, 52, 54 in a matrix form (four lines and three columns in the present embodiment) on the aforementioned map screen, and displays labels, such as the names or the like of the processings or functions which can be executed or started-up from the main menu, at the respective selection buttons 32-54.

Figure 3:
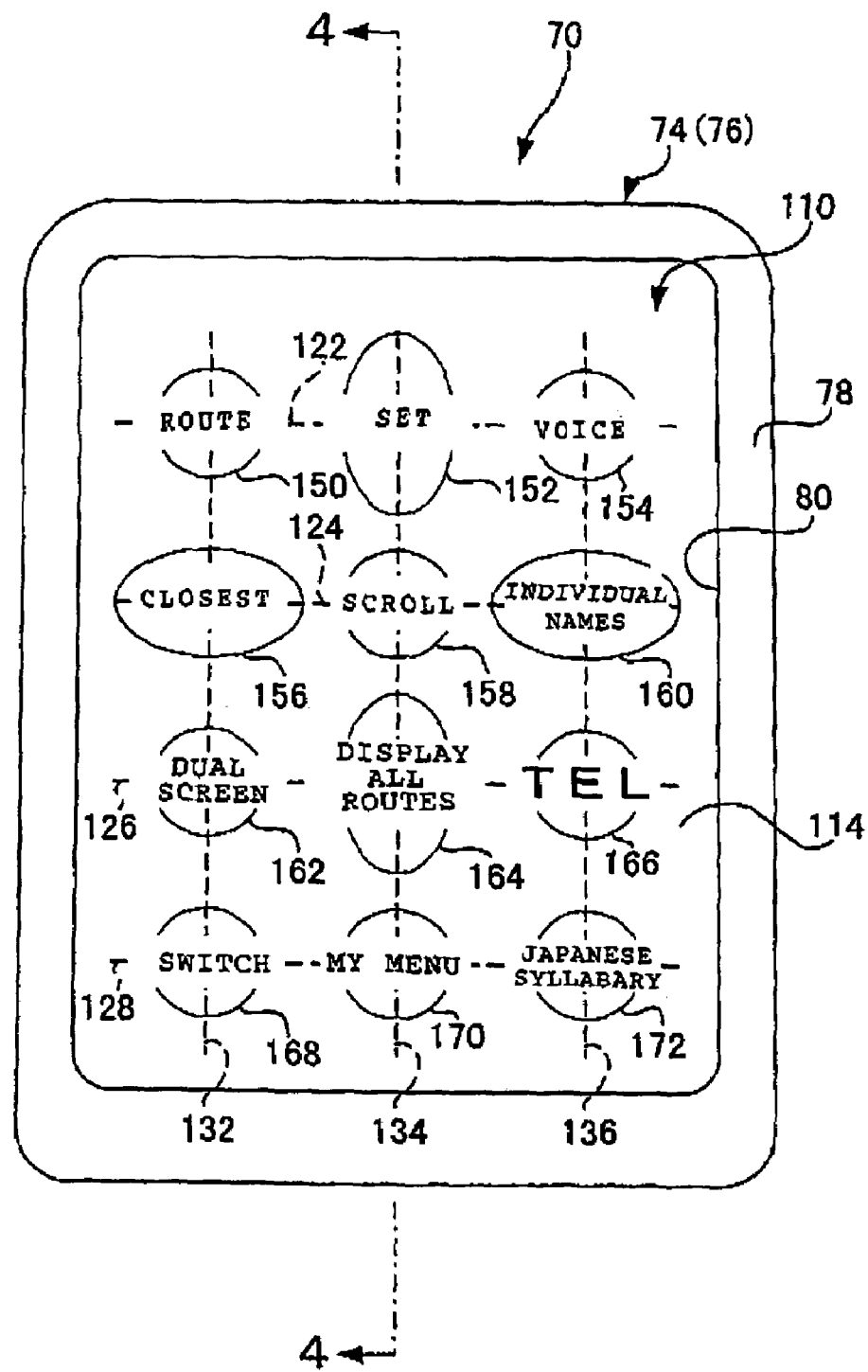
FIG. 3 is a plan view of a controller equipped with a detecting means of the screen operating device for a vehicle relating to the first embodiment of the present invention.
Figure 4:
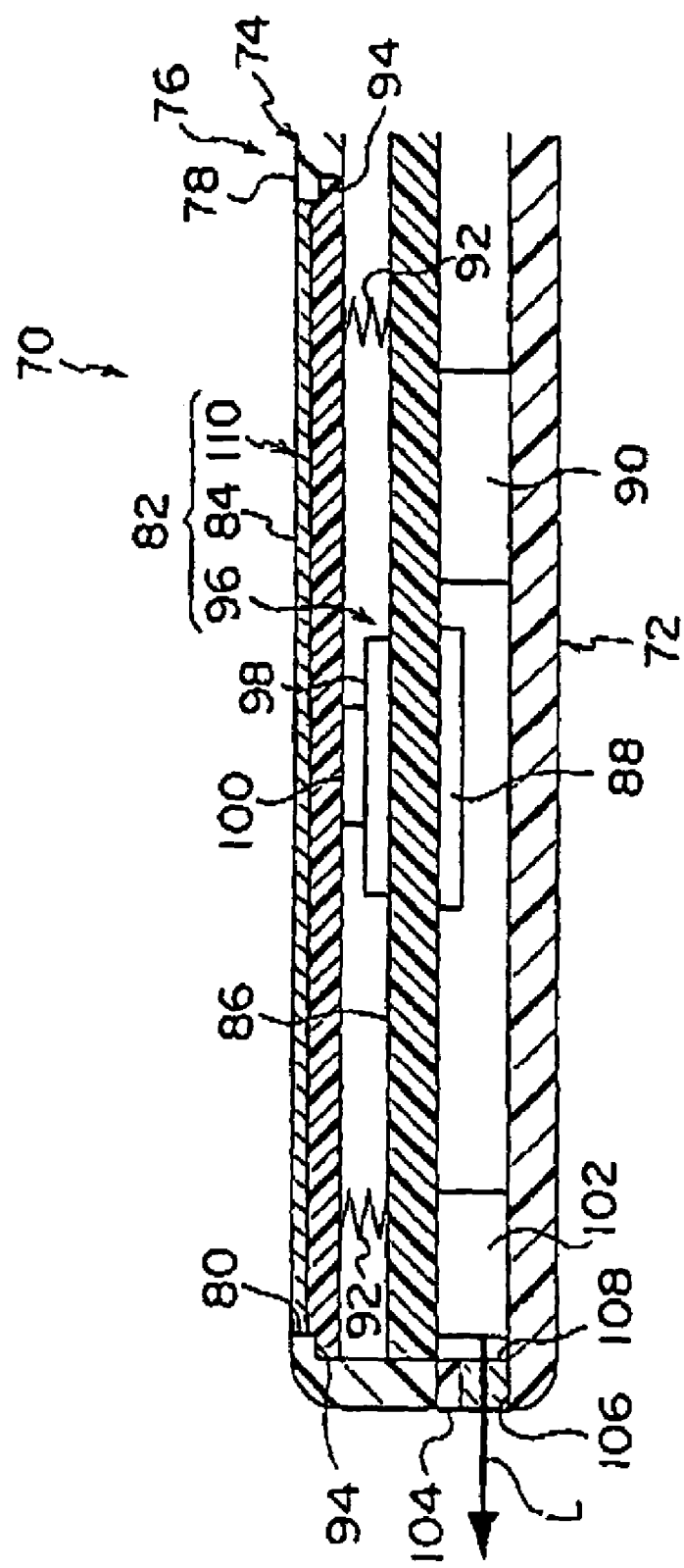
FIG. 4 is a cross-sectional view showing main portions of the controller and taken along line 4-4 of FIG. 3.

On the other hand, as shown in FIG. 1 and FIG. 2, the present car navigation device 10 is equipped with a controller 70 serving as an input means. As shown in FIG. 3 and FIG. 4, a substantially rectangular opening portion 80 is formed in an upper bottom portion 76 of an upper case 74 forming a case 76 of the controller 70. A panel 84 serving as an operation surface forming a panel switch 82, is provided at the case 76 so as to correspond to the opening portion 80. The outer peripheral configuration of the panel 84 is formed in a substantially rectangular flat plate shape corresponding to the opening portion 80.

A substrate 86 is disposed substantially parallel beneath the panel 84. Wiring, such as print wires or the like, is provided at least either one of the obverse and the reverse surface of the substrate 86, and a CPU 88 and a battery 90, as well as electrical parts such as resistors and capacitors and the like, are electrically connected to the substrate 86 by the aforementioned wiring.

The substrate 86 is fixed to the case 76 either directly or indirectly by an unillustrated holding means. Further, compression coil springs 92 are disposed on the substrate 86, and support the panel 84 in a state of urging the panel 84 toward the opening portion 80 side, such that the panel 84 is able to approach and move away from the substrate 86. Moreover, stoppers 94 are formed at the upper case 74. The stoppers 94 are engaged with the outer peripheral portion of the panel 84, and the panel 84 is held so as to be separated by a predetermined distance or more from the substrate 86.

Further, push switches 96 serving as pressing force detecting means are provided between the panel 84 and the substrate 86. A main body 98 of the push switch 96 is equipped with an unillustrated fixed contact. This fixed contact is electrically connected to the wiring of the substrate 86.

On the other hand, a movable portion 100 provided at the main body 98 is movable with respect to the main body 98 in substantially the same directions as the directions of the panel 84 approaching and moving away with respect to the substrate 86. At least one portion of the movable portion 100 moves into the main body 98 by moving in the direction of approaching the substrate 86. Further, an unillustrated movable contact is provided at the movable portion 100. When the movable portion 100 is moved in the direction of approaching the substrate 86, the movable contact contacts the fixed contact of the main body 98 and becomes continuous, and due to the movable portion 100 moving away from the substrate 86, the continuity with the fixed contact is cancelled.

Further, the side of the movable portion 100 opposite the main body 98 abuts the reverse surface of the panel 84. Accordingly, due to the panel 84 approaching the substrate 86, the movable portion 100 approaches the substrate 86, and the movable contact of the movable portion 100 contacts the fixed contact of the main body 98.

Moreover, an infrared ray light-emitting element 102 is disposed at the reverse surface side of the substrate 86 in a vicinity of the outer peripheral portion. The infrared light-emitting element 102 is electrically connected to the aforementioned CPU 88 and battery 90, and emits an infrared ray signal L on the basis of the signal from the CPU 88. An opening portion 106 is formed in a side wall 104 of a lower case 72 forming the case 76, so as to correspond to this infrared ray light-emitting element 102. A window 108, which is transparent or is colored to the extent that infrared rays can pass therethrough, is fit-in into this opening portion 106. The infrared ray signal L emitted at the infrared ray light-emitting element 102 passes through the window 108, exits to the exterior of the case 76, passes through the previously-mentioned window 18 of the device main body 12, and is received by the infrared ray light-receiving portion 20.

Figure 5:
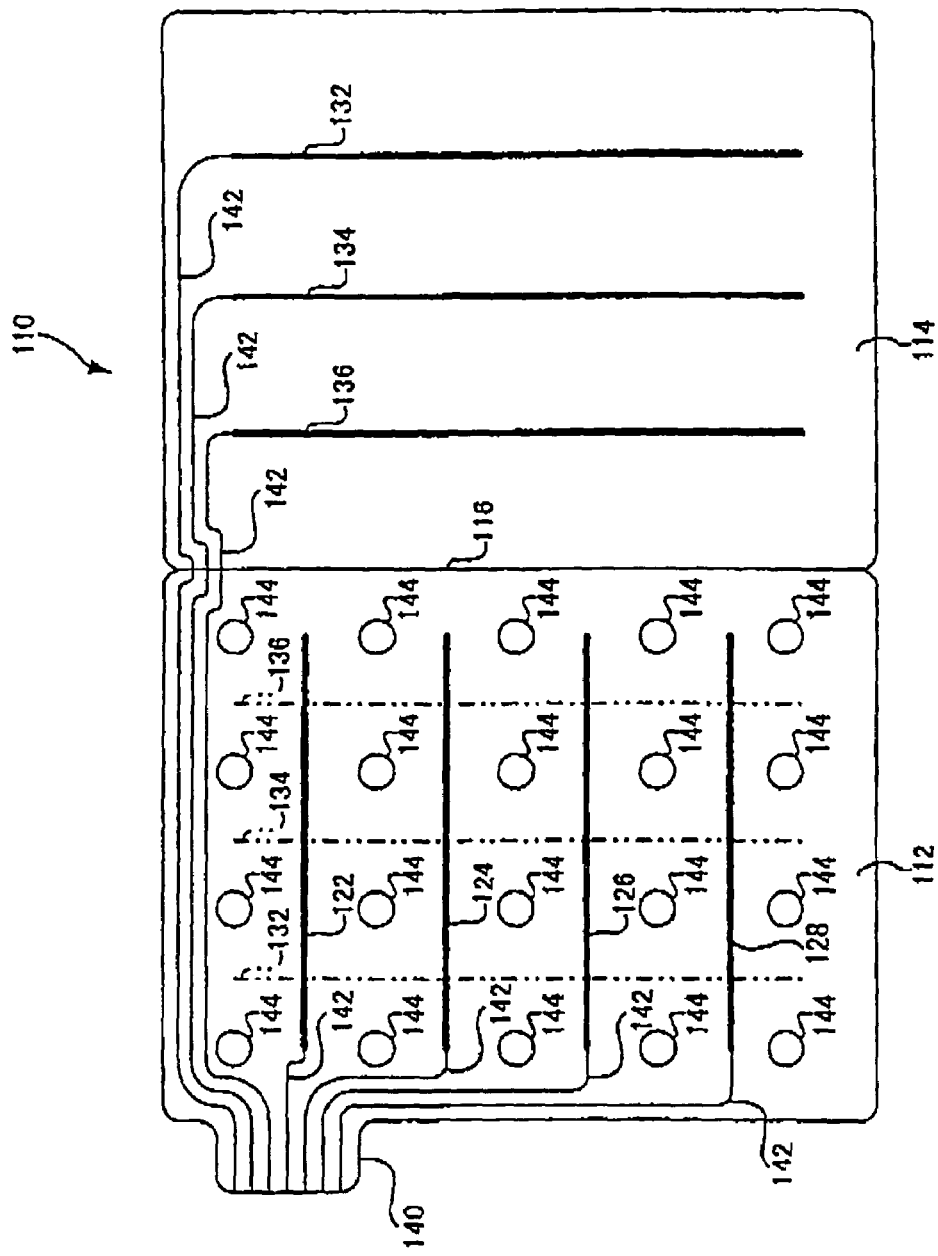
FIG. 5 is a plan view of an unfolded state of the detecting means.

On the other hand, as shown in FIG. 3, a sheet switch 110 serving as an operating body detecting means or a position detecting means, is placed at the obverse side of the panel 84. As shown in FIG. 5, the sheet switch 110 is equipped with a pair of base portions 112, 114. The base portions 112, 114 are each formed, for example, in a sheet shape which is substantially rectangular as seen in plan view, from an insulating synthetic resin material. At least the base portion 114 is set to a rigidity of an extent which can be elastically deformed by pressing force of a predetermined magnitude or more (e.g., the extent of a person lightly pressing with his/her finger). Further, the base portion 112 is connected, at the end portion thereof at one transverse direction side (the right side in FIG. 5) thereof, to the end portion at the other transverse direction side (the left side in FIG. 5) of the base portion 114. The base portion 112 can rotate relative to the base portion 114, with a connecting portion 116 between the base portion 112 and the base portion 114 being the axis.

Further, a plurality (four in the present embodiment) of line terminals 122, 124, 126, 128, 132, 134, 136 are formed on the obverse of the base portion 112.

The line terminals 122-128 are long along the transverse direction of the base portion 112, and the line terminals 132-136 are the longitudinal direction of the base portion 114.

Further, these line terminals 122-136 are connected, via connecting lines 142, to a connector portion 140 provided at the base portion 112, and are connected to the CPU 88 via the connector portion 140.

The base portion 112 and the base portion 114 are folded over at the connecting portion 116 such that the obverses thereof face one another. In this way, as shown by the two-dot chain lines on the base portion 112 in FIG. 5, the line terminals 132-136 are substantially orthogonal to the line terminals 122-128, and the line terminals 122-136 overall form a lattice form. In this state, when any of the line terminals 122-128 and any of the line terminals 132-136 contact one another and become continuous, this continuity is detected by the CPU 88.

Further, as shown in FIG. 3 and FIG. 5, a plurality of touch portions 150, 152, 154, 156, 158, 160, 162, 164, 166, 168, 170, 172 are formed at the reverse surface of the base portion 114 (i.e., the obverse of the sheet switch 110).

These touch portions 150-172 form a four-line, three-column matrix shape on the whole, and respectively correspond to the points of intersection of the line terminals 132-136 and the line terminals 122-128 in plan view. Accordingly, it is a structure in which, due to the surface of the sheet switch 110 (i.e., the obverse of the base portion 114) being pressed at one portion of these touch portions 150-172, at that portion, one of the line terminals 132-136 and one of the line terminals 122-128 become continuous. Namely, it is one type of criterion of the pressing portion.

Moreover, as shown in FIG. 3, labels are displayed on the reverse surface of the base portion 114 (i.e., the obverse of the sheet switch 110) in correspondence with all of or some of these touch portions 150-172 (in the present embodiment, the touch portions 150-172 except for the touch portions 152, 15B, 164). These labels mean the respective processings in a direct entry mode which will be described later.

Figure 23:
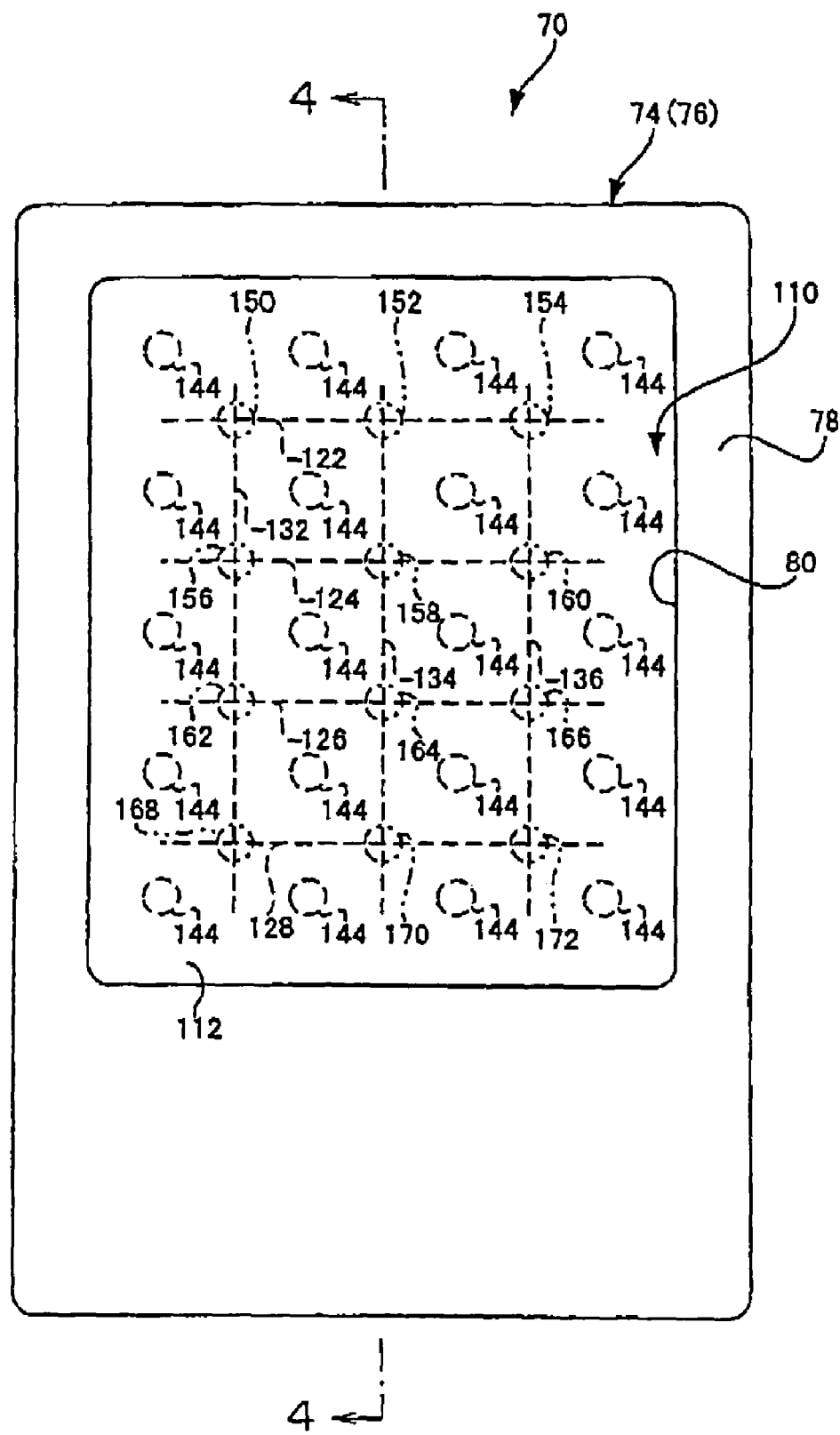
FIG. 23 is a plan view of a controller equipped with a detecting means of a screen operating device for a vehicle relating to a fifth embodiment of the present invention.

Note that, as shown in FIG. 3, in the present embodiment, all of these labels are formed by characters. However, basically, it suffices for the labels to be structured such that the names or the contents or the like of the respective processings in the direct entry mode can be understood by being looked at, e.g., various types of symbols (including picture symbols) other than characters can be used. Further, as shown in FIG. 23, it is possible to not form labels.

Moreover, as shown in FIG. 5, a plurality of projections 144 are formed on the obverse of the base portion 112. These projections 144 are positioned at the sides of the line terminals 122-128, and at the sides of the line terminals 132-136 in a state in which the line terminals 132-136 oppose the obverse of the base portion 112. The projections 144 hold the base portion 114 in a state in which the obverse of the base portion 114 is separated by a predetermined distance from the obverse of the base portion 112, in a state of being folded over around the connecting portion 116. Thus, in the usual state, the line terminals 122-128 and the line terminals 132-136 are separated from one another.

Operation, Effects of First Embodiment (Summary of Operation of Controller 70)

Next, before explaining the overall operation and effects of the present embodiment, the operation of the controller 70 will be briefly described.

In the present embodiment, when, for example the touch portion 160 among the touch portions 150-172 on the sheet switch 110 which are in vicinities of the points of intersection of any of the line terminals 122-128 and the line terminals 132-136 as seen in a plan view of the controller 70 (i.e., in the state shown in FIG. 3), is touched and the sheet switch 110 is pressed, at the touch portion 160, the base portion 114 forming the sheet switch 110 elastically deforms. In this way, the line terminal 124 and the line terminal 136, whose point of intersection is in a vicinity of the touch portion 160, contact and become continuous. However, because the base portion 114 is supported by the projections 144 in vicinities of the touch portions 150-172 except for the touch portion 160, the line terminals 122-136 do not contact one another and become continuous.

The continuity (continuity signal) of the line terminal 124 and the line terminal 136 is detected by the CPU 88. The CPU 88, which has detected this continuity, emits a light-emission signal in order to make the infrared ray light-emitting element 102 transmit (emit) the infrared ray signal L corresponding to the aforementioned continuity from among the plural types of infrared ray signals L. The infrared ray signal L, which is emitted from the infrared ray light-emitting element 102 in accordance with receipt of the light-emission signal, is received at the infrared ray light-receiving portion 20 of the device main body 12, and further, the control section 22 receives an electrical signal serving as a position detection signal based on the infrared ray signal L which the infrared ray light-receiving portion 20 received. Note that, hereinafter, the electrical signal which the control section 22 receives from the infrared ray light-receiving portion 20 on the basis of the infrared ray signal L at the time when one of the line terminals 122-128 and one of the line terminals 132-136 become continuous, will be called a "touch signal" for convenience.

On the other hand, when the panel 84 is pressed via the sheet switch 110 in a state in which an operator touches the reverse surface of the base portion 114 of the sheet switch 110 with his/her finger, the panel 84 moves, and the movable contact of the movable portion 110 and the fixed contact of the main body 98 of the push switch 96 become continuous. The continuity of the movable contact of the movable portion 100 and the fixed contact of the main body 98 is detected by the CPU 88. When the CPU 88 detects this, the CPU 88 makes the infrared ray signal L, which is based on the continuity signal of the movable contact of the movable portion 100 and the fixed contact of the main body 98, be emitted from the infrared ray light-emitting element 102.

The infrared ray signal L, which is emitted from the infrared ray light-emitting element 102 in this way, is received by the infrared ray light-receiving portion 20 of the device main body 12, and further, the control section 22 receives an electrical signal serving as a pressing force detection signal corresponding to the infrared ray signal L which the infrared ray light-receiving portion 20 has received. Note that, hereinafter, the electrical signal which the control section 22 receives from the infrared ray light-receiving portion 20 on the basis of the infrared ray signal L at the time when the movable contact of the movable portion 100 and the fixed contact of the main body 98 at the push switch 96 become continuous, will be called a "click signal" for convenience.

(Operation, Effects of Function Selection Processing)

Next, the operation and effects relating to the function selection processing for selecting various types of processings and functions at the present car navigation device 10 will be described on the basis of the flowcharts in FIG. 6 and FIG. 7.

In the present car navigation device 10, at step 200, when a car navigation program is read by the control section 22 from the storage medium 24, for example, map data is, by the control section 22, read from the storage medium 24 and expanded. As an example, the map shown in FIG. 8 is displayed on the monitor device 26.

Next, in step 202, initial setting processing is carried out. In the initial setting processing of step 202, a flag F1 and a timer (timer program) are reset. From this state, in step 204, it is judged, by the control section 22, whether or not the control section 22 has received an electrical signal from the infrared ray light-receiving portion 20 from the infrared ray light-emitting element 102 (the controller 70) (whether or not an electrical signal has been inputted to the control section 22). Here, for example, if a finger or the like has not touched the above-described sheet switch 100 and therefore none of the line terminals 122-136 are continuous, a touch signal is not sent (outputted) from the infrared ray light-receiving portion 20. Accordingly, in this state, the routine returns as is to step 202. In a sense, this state is a signal standby state until a touch signal is received.

In contrast, when it is judged in step 204 that a touch signal has been received, in step 206, the timer (timer program) is actuated, and clocking is started. Next, in step 208, it is judged whether or not a click signal has been received. If a click signal has been received, in step 210, 1 is substituted in for the flag F1, and the routine proceeds to step 212. If a click signal has not been received, the routine proceeds to step 212 without going through step 210.

In step 212, it is judged whether or not an elapsed time T from the time the timer started clocking has exceeded a set time TA which has been set in advance. Note that this set time TA is not particularly limited. However, basically, it suffices to set the set time TA to a length of an extent such that the operator will not have an unpleasant feeling such as an operation delay or the like. Empirically, this length is preferably about 0.2 to 0.4 seconds. If the elapsed time T has not exceeded the set time TA in step 212, the routine returns to step 208.

If it is judged in step 212 that the elapsed time T has exceeded the set time TA, in step 214, the elapsed time T is reset once. Next, in step 216, it is judged whether or not 1 has been substituted in for the flag F1, i.e., whether or not a click signal was received even one time during steps 208 through steps 212. If it is judged in step 216 that the flag F1 is still in the state of being reset, the routine proceeds to step 218 and the usual trace mode processing is started.

Figure 7:
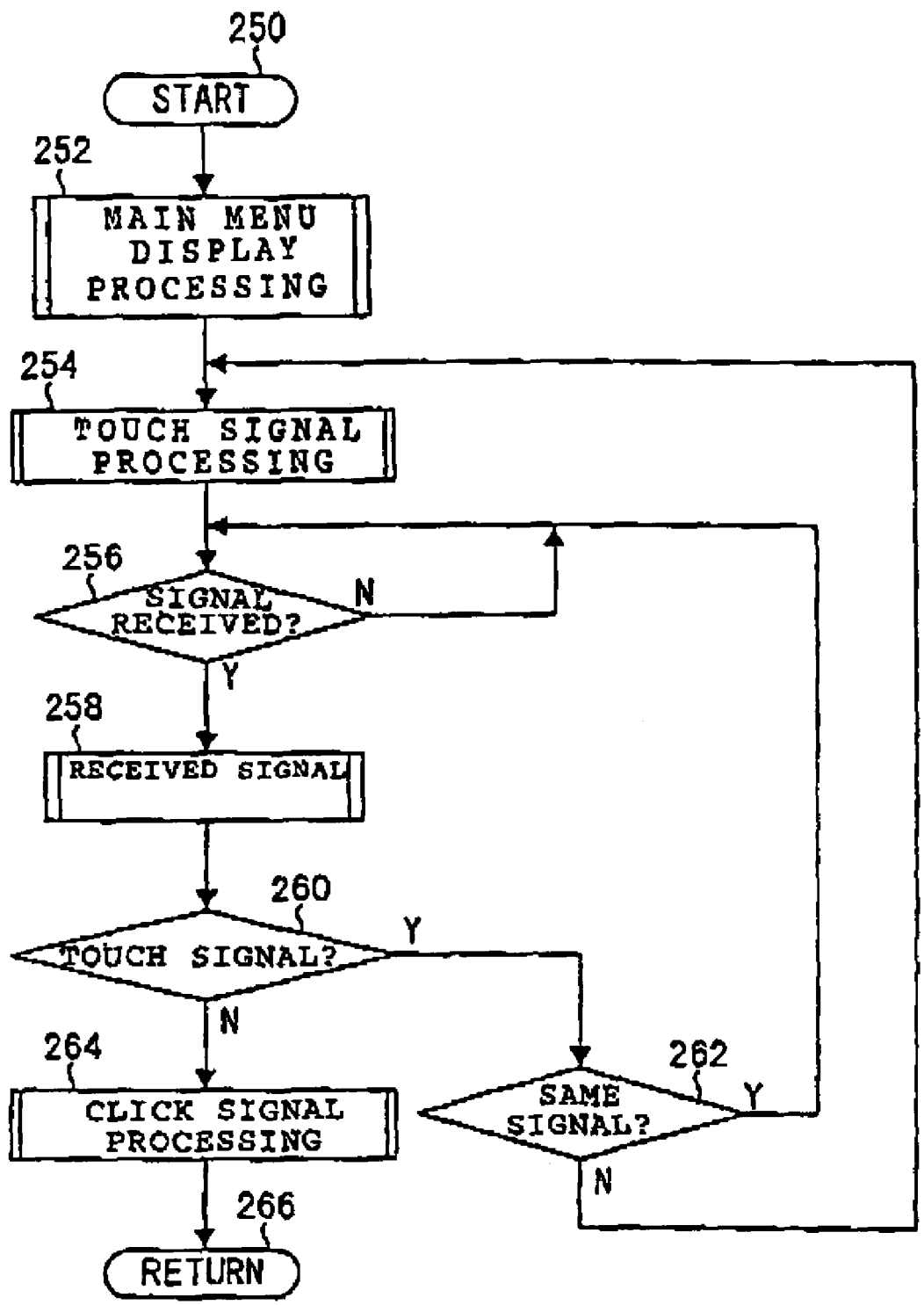
FIG. 7 is a flowchart showing the flow of control of usual trace mode processing.

Here, a flowchart of the usual trace mode processing is shown in FIG. 7.

When the usual trace mode processing is started in step 250, first, in step 252, display processing of a main menu, which corresponds to what is called in the claims a predetermined screen, is carried out. In this display processing of the main menu, as shown in FIG. 9, a plurality of selection buttons 32-54 are displayed on the screen of the monitor device 26 in a matrix form of four lines and three columns. Further, characters or symbols (including picture symbols) meaning the names, abbreviations, summaries of the functions, or the like of the processings and the functions which can be carried out in continuation from the main menu, are displayed at the respective selection buttons 32-54. Thus, by looking at the labels, the processings and functions which can be carried out next from the main menu can be confirmed.

Next, in step 254, the touch signal, which is immediately before this usual trace mode processing is carried out, is processed. In this touch signal processing, for example, if the touch signal, which is immediately before the usual trace mode processing is carried out, is a touch signal corresponding to the touch portion 154 (i.e., a touch signal in a case in which the line terminal 122 and the line terminal 136 are continuous), among the selection buttons 32-54 disposed in the matrix form of four lines and three columns, the selection button 32, which corresponds to the line and column position of the touch portion 154 among the touch portions 150-172 similarly provided in a matrix form of four lines and three columns, is reverse-displayed. In a case in which it is decided upon as is, it is shown that the processing or the function of the label displayed at this selection button 32 is to be executed (see FIG. 10).

When the touch signal processing has been completed, in step 256, a judgement is made as to whether or not the control section 22 has received an electrical signal from the infrared ray light-receiving portion 20 after having moved to the usual trace mode processing. Here, if a touch signal or a click signal has not been received after moving to the usual trace mode processing, the routine returns to step 254 as is.

In contrast, when it is judged in step 256 that the control section 22 has received an electrical signal from the infrared ray light-receiving portion 20, in step 258, processing of the received signal is carried out. Further, in step 260, a judgement is made as to whether this signal is a touch signal or not. If the signal at this time is a click signal, in step 264, click signal processing is carried out.

Figure 10:
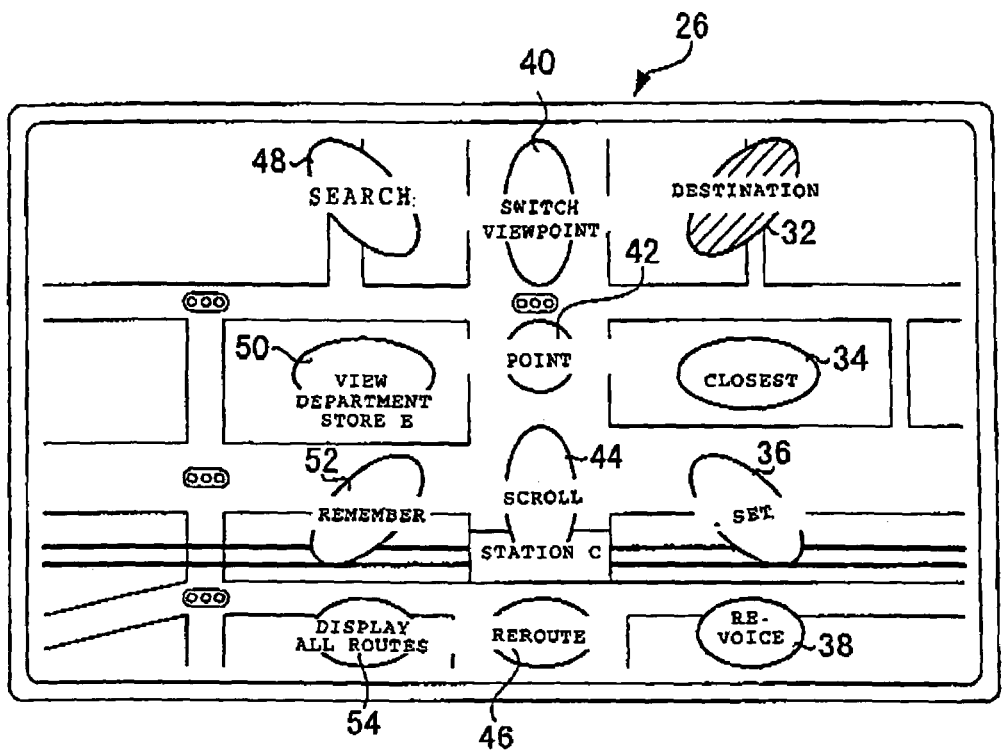
FIG. 10 is a screen example corresponding to FIG. 9, and shows a state in which touch signal processing has been carried out.
Figure 11:
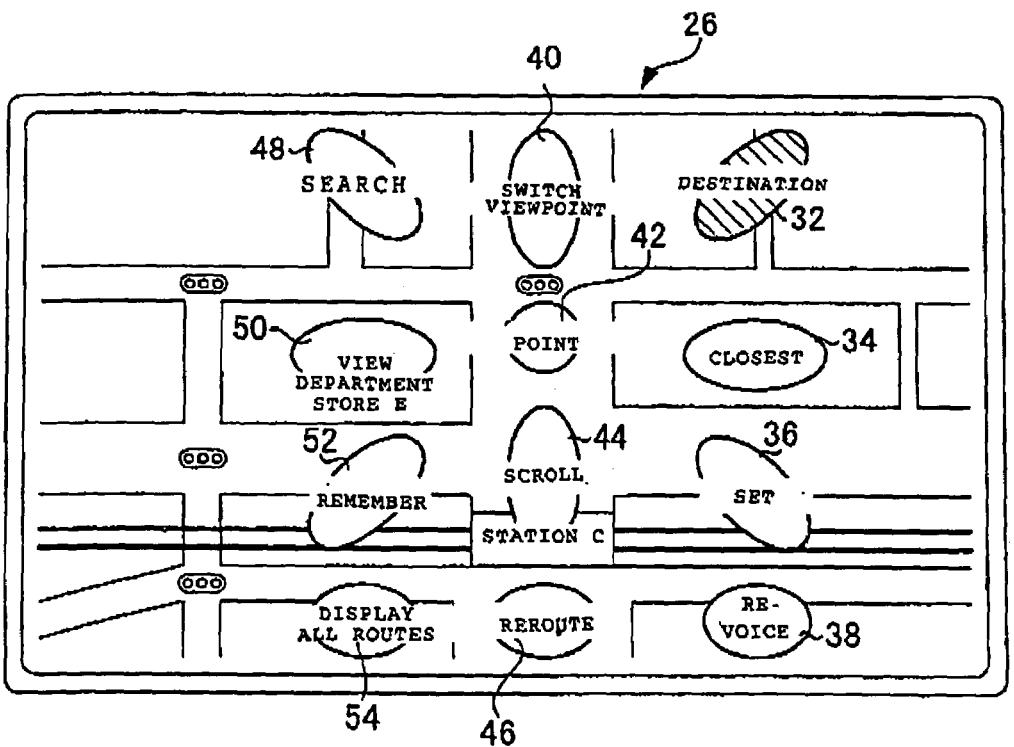
FIG. 11 is a screen example corresponding to FIG. 10, and shows a state in which click signal processing has been carried out.

For example, as shown in FIG. 10, if the routine proceeds to step 264 in a state in which the selection button 32 is reverse-displayed, as shown in FIG. 11, the color of the selection button 32 is changed to a different color, both in the state of being reverse-displayed and in the state before being reverse-displayed (the usual state). Note that, in the present embodiment, color changing of the selection button 32-54 corresponding to the click signal processing (the selection button 32 in the state shown in FIG. 11) was carried out. However, for example, the labels corresponding to the selection buttons 34-54 other than the selection button 32 which is being reverse-displayed may be deleted from the screen of the monitor device 26 in the click signal processing.

Next, in step 266, processing corresponding to the label displayed on that selection button 32-54 (the selection button 32 in the state shown in FIG. 11) is executed, and the program of the function corresponding to the label is executed. In step 218, the series of processings of the usual trace mode processing is carried out, and the routine proceeds to step 220 in FIG. 6. In step 220, the flag F1 is reset, and the routine proceeds to step 222, and the series of processings is completed. Note that, for example, when there is a further menu screen in the program of the function started-up in step 266 of FIG. 7, processing similar to the usual trace mode processing is carried out, and by repeating such processing, the processing which is ultimately desired is arrived at.

On the other hand, if it is judged in step 260 that the signal received in step 258 of FIG. 7 is a touch signal, the routine proceeds to step 262, and it is judged whether or not the received touch signal is the same signal as the touch signal which was received immediately before receipt of this touch signal. Here, if they are judged to be the same touch signal, the routine returns to step 256. If they are judged to not be the same touch signal, touch signal processing is carried out in step 254 on the basis of this new touch signal.

As described above, in the usual trace mode processing, the main menu is displayed on the screen of the monitor device 26. Therefore, it is possible to reliably select the desired processing or function while viewing the main menu.

Figure 6:
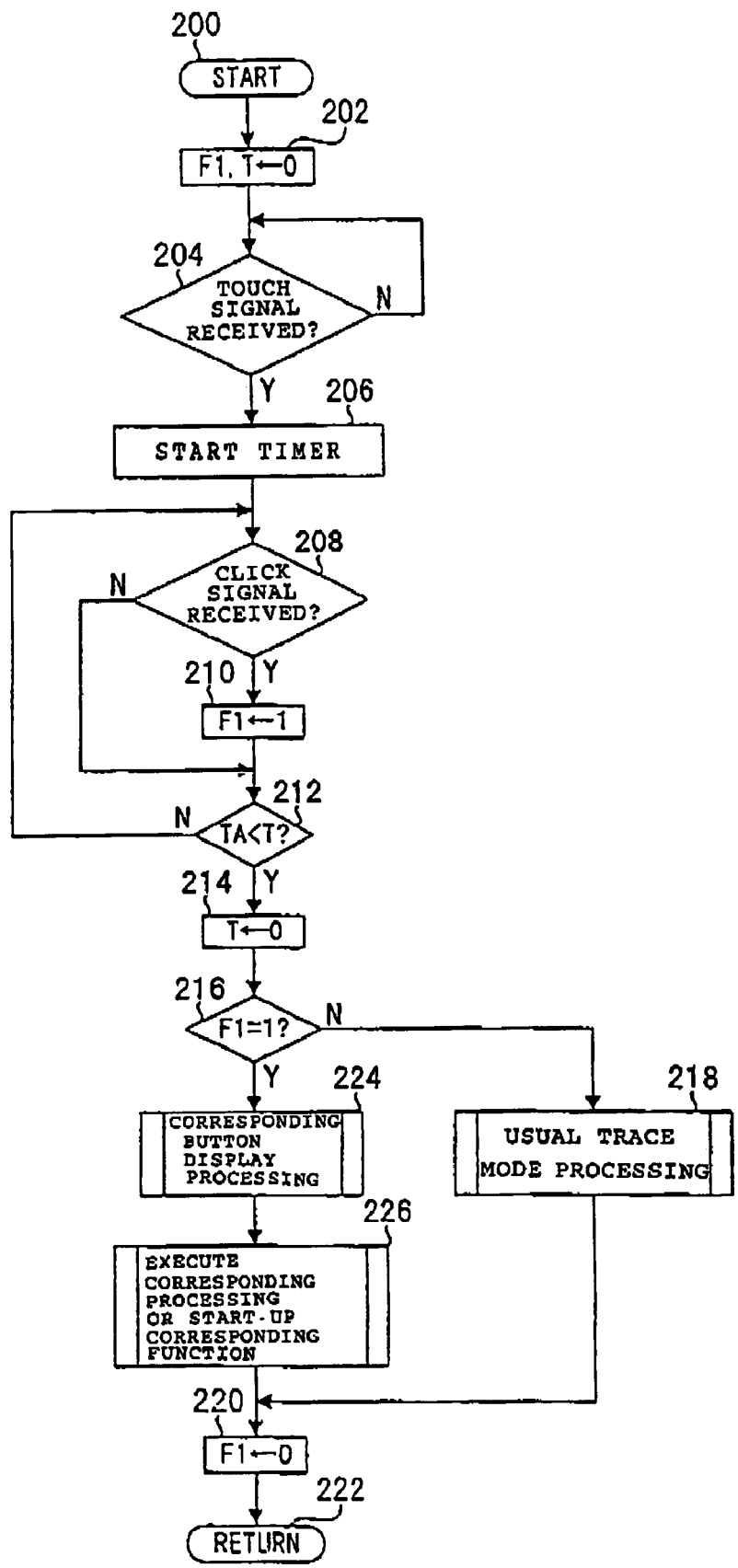
FIG. 6 is a flowchart showing the flow of control of the screen operating device for a vehicle relating to the first embodiment of the present invention.

Then, in step 216 of FIG. 6, when it is judged that 1 has been substituted in for the flag F1, i.e., when the control section 22 has received a click signal even one time during the time until the elapsed time T exceeded the set time TA, the routine proceeds to the direct entry mode processing of steps 224, 226.

In this direct entry mode processing, first, in step 224, display processing of the corresponding button corresponding to one of what is called specific processings in the claims, is carried out. In this corresponding button display processing, among the selection buttons 32-54, only the selection button 32-54 corresponding to the touch signal immediately before the direct entry mode processing is carried out is displayed on the monitor device 26 in the same way as the click signal receiving processing in step 264 of FIG. 7.

Figure 12:
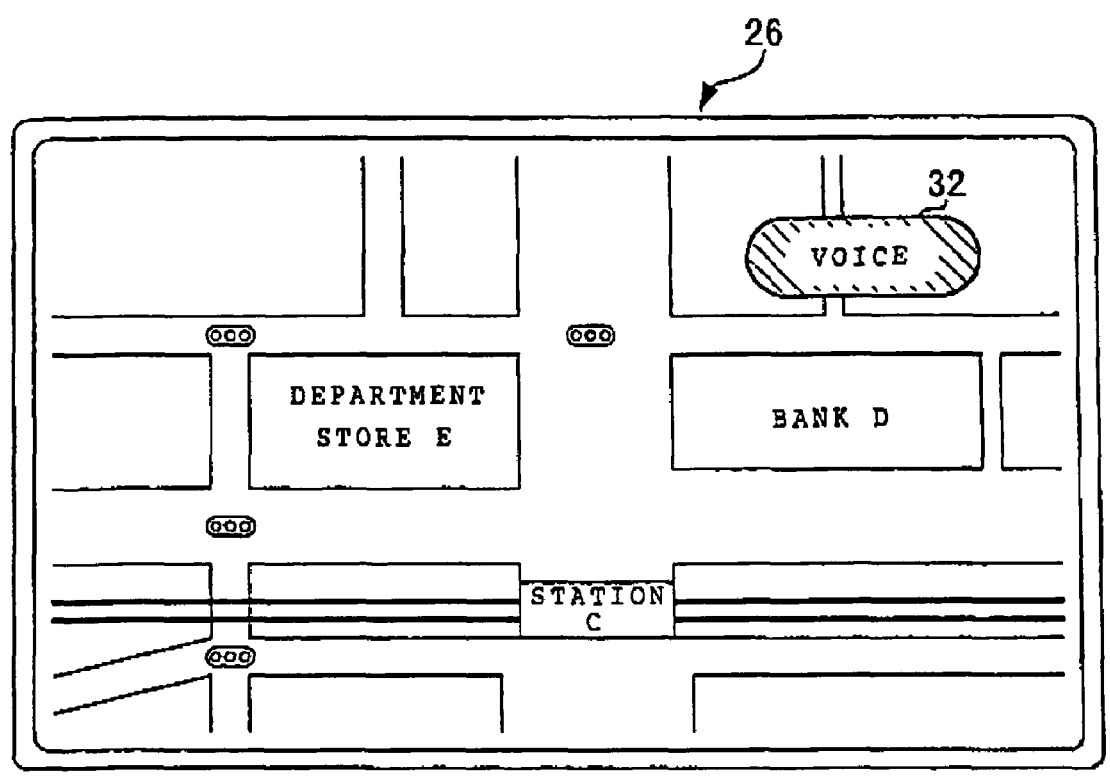
FIG. 12 is a screen example, corresponding to FIG. 8, at the time of direct entry mode processing which is one specific processing.

Namely, for example, if the touch signal immediately before the direct entry mode processing is carried out corresponds to the touch portion 154, among the selection buttons 32-54 which should be disposed in a matrix form of four lines and three columns, only the selection button 32 corresponding to the touch portion 154 among the touch portions 150-172 which are similarly provided in a matrix form of four lines and three columns, is displayed on the monitor device 26 (see FIG. 12).

Further, at this time, the label corresponding to the displayed selection button 32 is displayed. However, the label data of the label at this time is different from the label data at the time of the above-described usual trace mode processing, and is strictly label data at the time of the direct entry mode processing. This label data at the time of the direct entry mode processing is the same as the labels displayed at the respective touch portions 150-157 of the sheet switch 110.

Further, the displayed selection button 32 and the label displayed at this selection button 32 are displayed in a different color in both the usual state and in the reversed-processed state at the time of the usual trace mode processing (i.e., a state which is the same as after the click signal processing at the time of the usual trace mode processing). Note that the present embodiment is structured such that the displayed selection button 32 and the label displayed at this selection button 32 are displayed in a different color in the usual state and in the reversed-processed state at the time of the usual trace mode processing. However, for example, they may be displayed in the same state as the usual state at the time of the usual trace mode processing, or may be reversed-processed. Further, although the reason therefor will be described later, a structure in which the processing of step 224 is not carried out, i.e., a structure in which the selection buttons 32-54 and the labels are not displayed at the time of the direct entry mode processing, may be used.

Next, in step 226, the execution of the corresponding processing, which is the processing corresponding to what is called specific processing in the claims, or the starting-up of the corresponding function is carried out. In this step 266, the processing corresponding to the label displayed on the displayed selection button 32-54 (the selection button 32 in the state of FIG. 12) is executed, or the program of the function corresponding to the label is executed. In step 218, the series of processings of the usual trace mode processing is carried out, and the routine proceeds to step 220 of FIG. 6.

In this way, in the present embodiment, the processing can move to the direct entry mode processing due to, after any of the touch portions 150-172 has been touched and one of the line terminals 122-128 and one of the line terminals 132-136 have become continuous, the movable contact of the movable portion 100 and the fixed contact of the main body 98 of the push switch 96 being made to be continuous via the sheet switch 110 and the panel 84 within the set time TA (i.e., immediately).

Thus, if it is a processing which can be executed or a function which can be started-up in the direct entry mode processing, even if the processing or the function is not selected by looking at the monitor device 26, the desired processing or function can be executed immediately. Thus, it is possible to prevent or lessen the unpleasant feeling which the operator may have due to a processing delay or the like or display on the monitor device 26 which is not particularly needed at the present.

Further, as described above, in the present embodiment, the names or the like of the processings and functions at the time of the direct entry mode processing are displayed on the sheet switch 110. Therefore, if operation is carried out while viewing the sheet switch 110, even if the direct entry mode processing has started, the desired processing or function can be reliably executed without looking at and confirming the monitor device 26.

Note that the present embodiment was structured such that the routine proceeds to the direct entry mode processing of steps 226, 228 due to a click signal being received within the set time TA from receipt of the touch signal. However, a structure may be used in which the routine proceeds to the direct entry mode processing of steps 226, 228 in a case in which the finger is moved away from the sheet switch 110 within the set time TA from receipt of the touch signal and a state arises in which the control section 22 does not receive either the touch signal or the click signal. In this case as well, basically the same effects as the above-described effects can be obtained.

Second Embodiment

Next, other embodiments of the present invention will be described. Note that, in the following respective embodiments, features different than the above-described first embodiment have merely been added to the function selection processing, and the mechanical structure is the same as the above-described first embodiment. Therefore, description of the structure will be omitted.

Further, the operations and effects of the respective embodiments described hereinafter will be explained by using flowcharts of respective drawings. However, in these flowcharts, processings which are basically the same as the respective steps in the flowcharts of FIG. 6 and FIG. 7 which were used in explaining the above-described first embodiment, are denoted by the same step numbers and description thereof is omitted.

Figure 13:
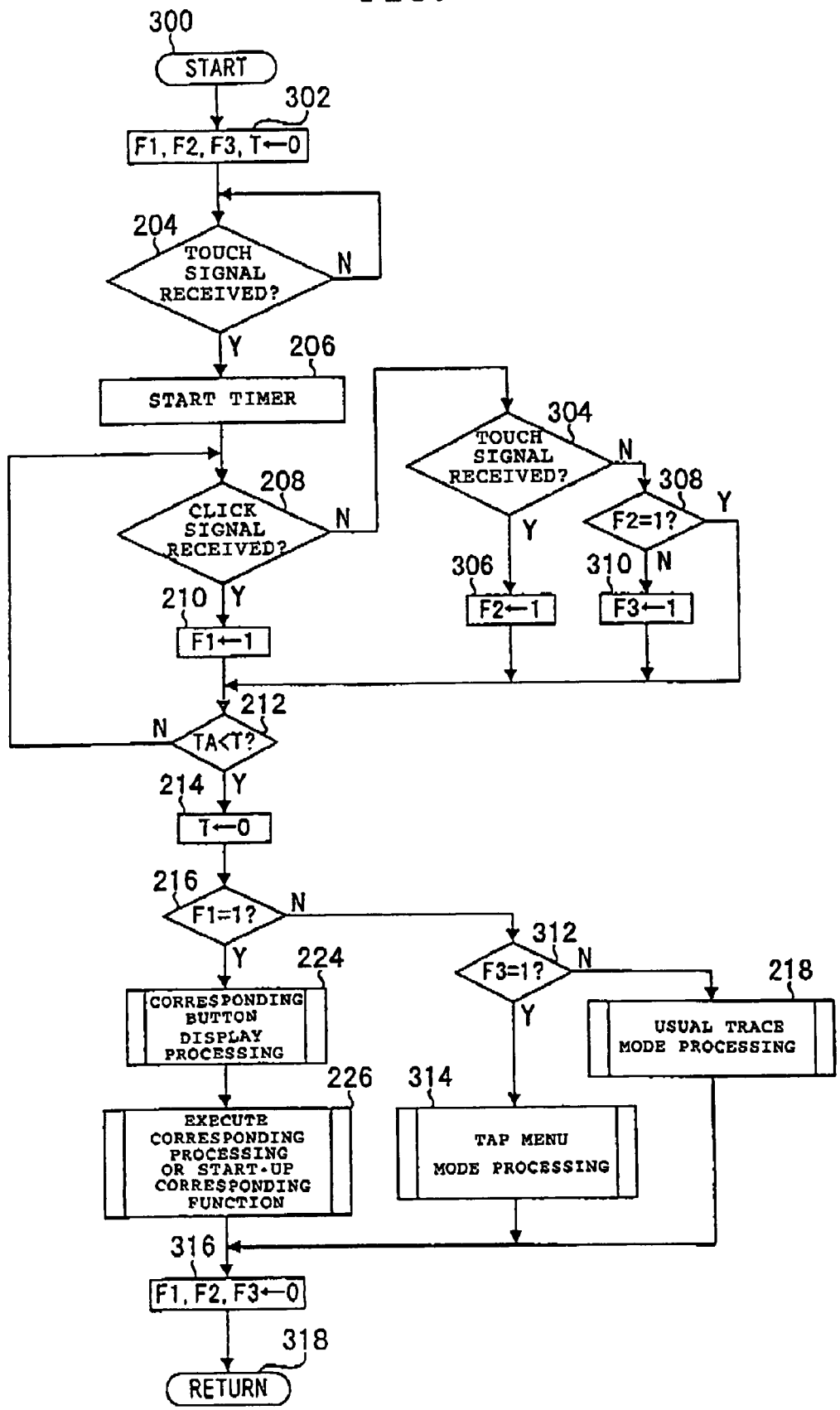
FIG. 13 is a flowchart showing the flow of control of a screen operating device for a vehicle relating to a second embodiment of the present invention.

A flowchart showing the function selection processing in the second embodiment of the present invention is shown in FIG. 13. The operation and effects of the present embodiment will be described on the basis of this drawing.

In the present embodiment, in step 300, when a car navigation program is read from the storage medium 24 and executed by the control section 22, as an example, the map shown in FIG. 8 is displayed on the monitor device 26.

Next, in step 302, respective flags F1, F2, F3 and a timer (timer program) are reset. From this state, the routine goes through steps 204, 206 and reaches step 208, and in step 208, a judgement is made as to whether or not a click signal from the infrared ray light-receiving portion 20 has been received by the control section 22.

However, in the present embodiment, if it is judged in this step 208 that a click signal has not been received, the routine proceeds to step 304.

In step 304, it is judged whether or not a touch signal has been received since the timer started in step 206. If a touch signal has been received, in step 306, 1 is substituted in for the flag F2, and the routine proceeds to step 212. Further, if it is judged in step 304 that a touch signal has not been received, in step 308, it is judged whether or not 1 has been substituted in for the flag F2. If it is judged in step 308 that the flag F2 remains reset, 1 is substituted in for the flag F3 in step 310. If it is judged that 1 has been substituted in for the flag F2, the routine proceeds to step 212 without going through step 310.

Namely, in the present embodiment, 1 is substituted in for the flag F1 if a click signal is received even one time during the period up until the elapsed time T from the start of the timer in step 206 has exceeded the set time TA. Further, 1 is substituted in for the flag F3 in a state in which a state in which a touch signal is not received is interposed between the touch signal judged to be received in step 204 and the touch signal judged to be received in step 304, i.e., if the sheet switch 110 is touched twice instantaneously and the touch signal is received twice instantaneously.

However, in a case in which it is judged in step 304 as well that a touch signal has been received due to the touch signal judged to be received in step 204 being continuously received, 1 is substituted in for the flag F2. Thus, 1 is not substituted in for the flag F3.

On the other hand, after the elapsed time T exceeds the set time TA and the routine proceeds from step 212 to step 214 and the elapsed time T is reset in step 214, it is judged in step 216 whether or not 1 has been substituted in for the flag F1. However, in the present embodiment, when it is judged in step 216 that the flag F1 remains reset, the routine proceeds to step 312, and it is judged whether or not 1 has been substituted in for the flag F3.

When it is judged in step 312 that the flag F3 remains reset, in step 218, the usual trace mode processing is carried out. However, when it is judged in step 312 that 1 has been substituted in for the flag F3, the routine proceeds to step 310, and tap menu mode processing is carried out.

Figure 14:
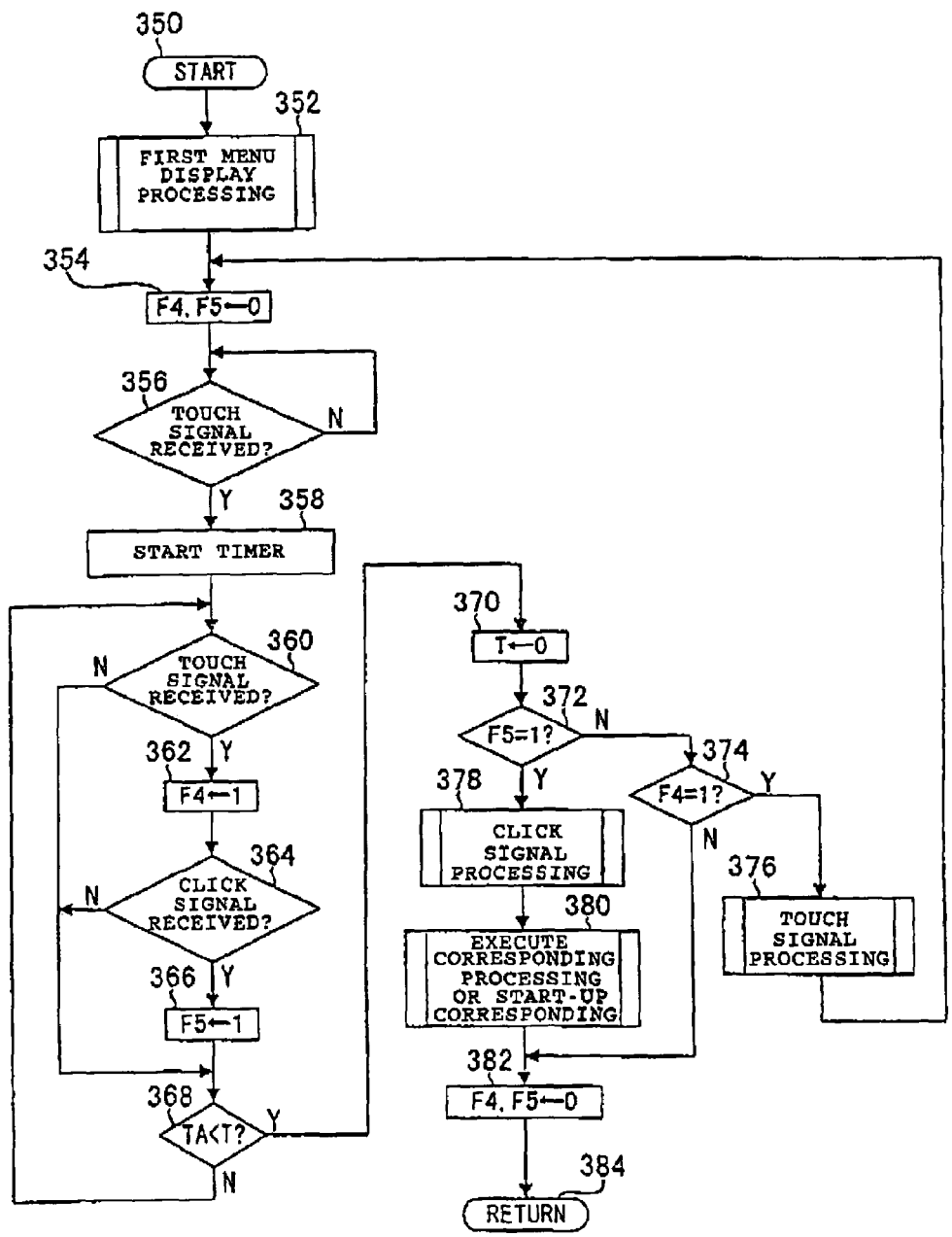
FIG. 14 is a flowchart showing the flow of tap menu mode processing in the second embodiment of the present invention.

Here, a flowchart of the tap menu mode processing is shown in FIG. 14. As shown in this figure, when the tap menu mode processing is started in step 350, first, display processing of a first menu, which corresponds to one of what is called specific processings in the claims, is carried out in step 352.

In the display processing of the first menu, as shown in FIG. 9, a plurality of selection buttons 32-54 are displayed on the screen of the monitor device 26, and further, the labels corresponding to the respective selection buttons 32-54 are displayed. These labels are characters or symbols (including picture symbols) which mean the names, abbreviations, summaries of the functions, or the like of the processings and functions which can be carried out in continuation from the first menu. By viewing the labels, the processings and functions which can be carried out in continuation from the first menu can be confirmed.

However, the label data of the labels at the time of executing the tap menu mode processing all are the same as or correspond to the labels displayed on the respective touch portions 150-172 of the sheet switch 110. Moreover, the line and column positions of the labels displayed at the respective selection buttons 32-54 are the same as the line and column positions of the labels displayed at the respective touch portions 150-172.

Next, in step 354, flags F4, F5 are reset. Moreover, in step 356, it is judged whether or not an electrical signal from the infrared ray light-receiving portion 20 has been received since the present tap menu mode processing is executed.

In regard thereto, when it is judged in step 356 that a touch signal has been received, in step 358, the timer (timer program) is operated, and clocking is started. Next, in step 360, it is judged whether or not a touch signal has been received again after the touch signal judged to be received in step 356. If a touch signal has been received, in step 362, 1 is substituted in for the flag F4, and the routine proceeds to step 364.

In step 364, it is judged whether or not a click signal has been received after the touch signal which was judged to be received in step 356. If a click signal has been received, in step 366, 1 is substituted in for the flag F5. If it is judged in step 360 that a touch signal has not been received or if it is judged in step 364 that a click signal has not been received, the routine proceeds from step 360 or step 364 directly to step 368, without going through step 362 or step 366.

In step 368, it is judged whether or not the elapsed time T from the start of the timer clocking has exceeded the set time TA which was set in advance. Note that this set time TA is not particularly limited. However, basically, it suffices to set the set time TA to a length of an extent such that the operator will not experience a sense of unease such as an operation delay or the like. Empirically, this length is preferably about 0.2 to 0.4 seconds. Further, the set time TA in the present direct entry mode processing may be the same as or may be different than the set time TA before moving to the direct entry mode processing (the flowchart in FIG. 13).

When it is judged in step 368 that the elapsed time T has exceeded the set time TA, in step 370, the elapsed time T is reset once. Then, in step 372, it is judged whether or not 1 has been substituted in for the flag F5, i.e., whether or not a click signal has been received even one time up until the time the elapsed time T from the start of the timer in step 358 has exceeded the set time TA.

When it is judged in step 372 that the flag F5 is still reset, in step 374, it is judged whether or not 1 has been substituted in for the flag F4. i.e., whether or not a touch signal has been received even one time up until the time the elapsed time T from the start of the timer in step 358 has exceeded the set time TA.

Figure 16:
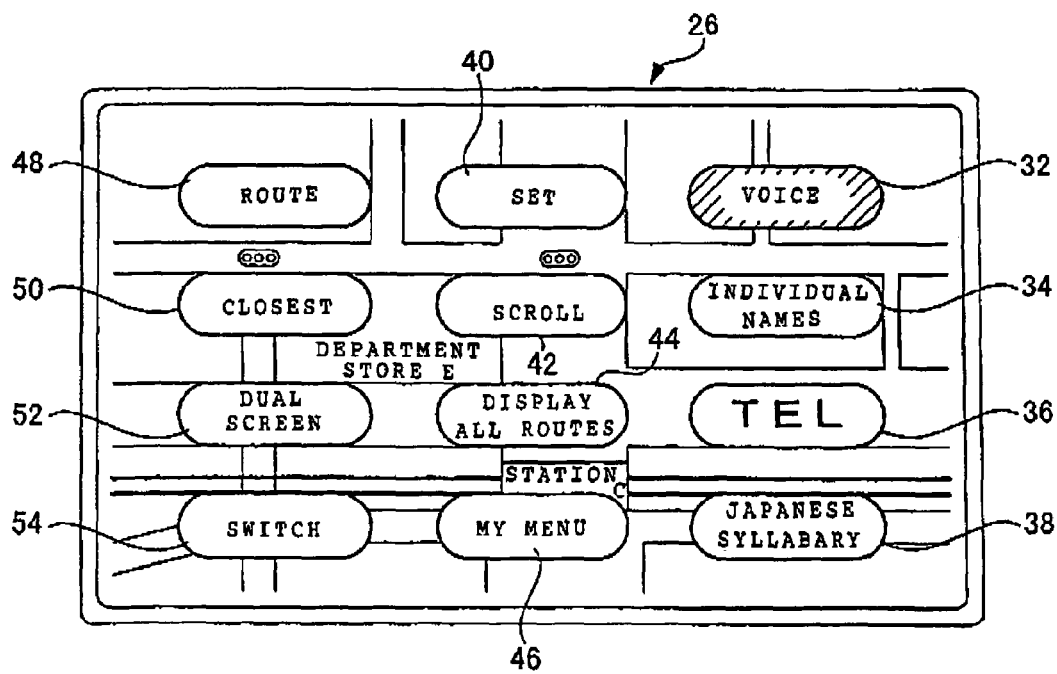
FIG. 16 is a screen example corresponding to FIG. 15, and shows a state at the time of tap menu mode processing, which is one specific processing, and in which touch signal processing has been carried out.

When it is judged in step 374 that 1 has been substituted in for the flag F4, touch signal processing is carried out in step 376. In the touch signal processing of this step 374, for example, if the touch signal which is finally received is a touch signal corresponding to the touch portion 154, the selection button 32 corresponding thereto is reverse-displayed (see FIG. 16).

Note that, although not shown in the flowchart of FIG. 14 in particular, if, at the time of this touch signal processing, one of the selection buttons 32-54 is already reverse-displayed and processing of the same selection button 32-54 (the selection button 32 in the state shown in FIG. 16) is to be carried out in the new touch signal processing as well, the routine proceeds as is to step 354 without carrying out the new touch signal processing.

Figure 17:
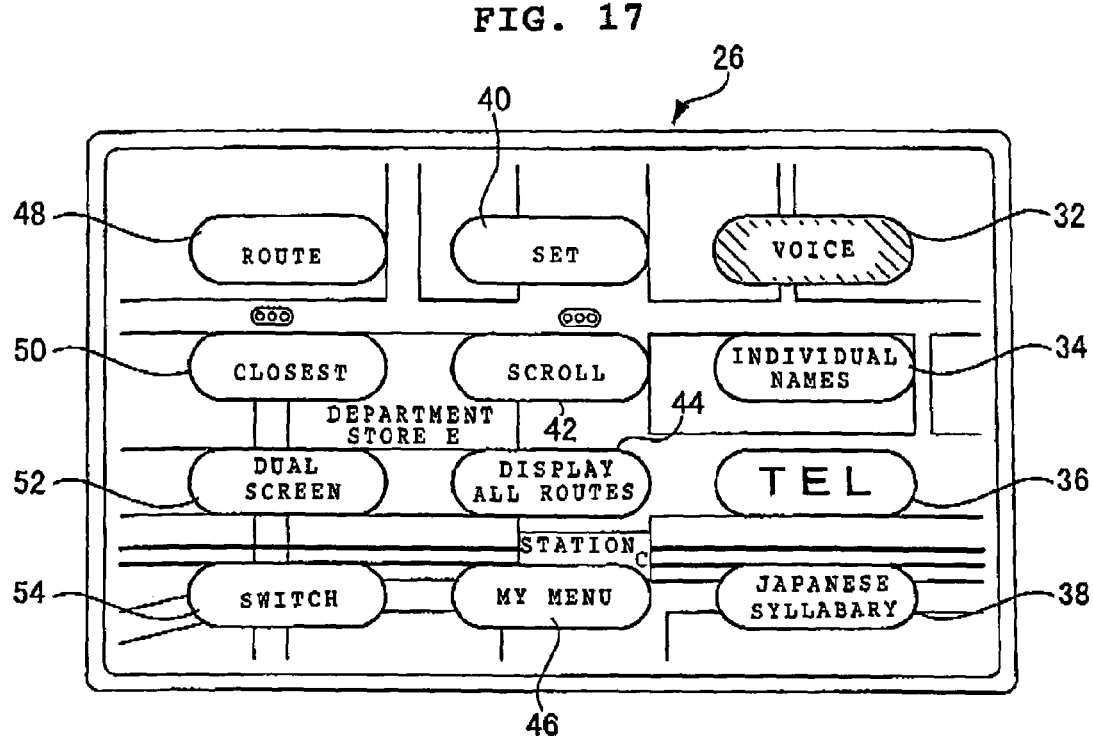
FIG. 17 is a screen example corresponding to FIG. 15, and shows a state at the time of tap menu mode processing, which is one specific processing, and in which click signal processing has been carried out.

On the other hand, if it is judged in step 372 that a click signal has been received, click signal processing is carried out in step 378. In the click signal processing in this step 378, for example, if the touch signal received immediately before receipt of the click signal is a touch signal corresponding to the touch portion 154, as shown in FIG. 17, the selection button 32 corresponding to the touch portion 154 is changed to a different color in both the usual state (see FIG. 15) and the state of being reverse-displayed (see FIG. 16).

Note that, in the present embodiment, changing of the color of the corresponding selection button 32-54 (the selection button 32 in the state of FIG. 17) is carried out in the click signal processing. However, for example, the selection buttons 34-54 other than the selection button 32 which is being reverse-displayed, and the labels displayed in correspondence with these selection buttons 34-54, may be deleted from the screen of the monitor device 26 in the click signal processing.

Next, in step 380, the processing corresponding to the label displayed at the corresponding selection button 32-54 (the selection button 32 in the state of FIG. 17) is executed, or the program of the function corresponding to the label is executed. Next, in step 382, the flag F3 is reset, and in step 384, the series of processings of the tap menu mode processing is ended, and the routine proceeds to step 316 shown in FIG. 13. In step 316, the respective flags F1, F2, F3 are reset, and in step 318, the series of processings is ended.

In contrast, when it is judged in step 372 that the flag F5 is still reset, and furthermore it is judged in step 374 that the flag F4 is still reset, i.e., when the control section 22 has not received either a touch signal or a click signal after the touch signal judged to be received in step 356 (in other words, when the sheet switch 110 has been touched instantaneously only one time), the routine proceeds to step 382 without going through steps 378, 380.

Namely, when the sheet switch 110 is touched instantaneously only one time before the timer starts in step 358, in a sense, the tap menu mode processing is cancelled, and the routine returns to the original processing shown in FIG. 13.

As described above, in the present embodiment, when the tap menu mode processing is executed, the first menu is displayed on the monitor device 26, and by this display of the first menu, the labels showing all of the processing or functions which can be carried out in the direct entry mode processing are displayed on the monitor device 26 together with the selection buttons 32-54. Thus, in the same way as in the usual trace mode processing, the desired processing or function can be selected reliably while looking at the first menu.

Moreover, in the first menu, the same display as the labels displayed on the sheet switch 110 is carried out on the monitor device 26. Therefore, operation can be carried out even without looking at the controller 70 (the sheet switch 110). In this way, by putting the tap menu processing to practical use, it is possible to grow accustomed to the direct entry mode processing.

Further, in the present embodiment, by touching the sheet switch 110 two times instantaneously with the finger, it is possible to move to the tap menu mode processing. Further, at the time of executing the tap menu mode processing, by touching the sheet switch 110 one time instantaneously with the finger, it is possible to cancel the tap menu mode processing.

Namely, in the same way as in the case of carrying out the direct entry mode processing and at the time of moving to the usual trace mode processing, it can be carried out merely by operating the sheet switch 110. Thus, the operability is good, and furthermore, even if such tap menu mode processings are added, it suffices to not add buttons or the like at the controller 70.

Note that the present embodiment was structured such that the tap menu mode processing is moved to by touching the sheet switch 110 two times instantaneously with the finger. However, the number of times of touching by the finger is not limited to two times.

Further, similarly, the number of times of touching the sheet switch 110 by the finger at the time of canceling the tap menu mode processing is not limited to one time.

Moreover, for example, a structure may be used in which a switch or button used exclusively for canceling is provided at the controller 70, and canceling is carried out by operating it. A structure may be used in which characters or symbols (including picture symbols) meaning cancel are displayed at one of the selection buttons 32-54 displayed in the first menu, and the tap menu mode processing is cancelled by the processings of steps 378, 380 being carried out in a state in which this selection button 32-54 is selected.

Further, the present embodiment is structured to judge in step 304 or step 360 that a touch signal has been received even if the touch signal is a touch signal which is different from the touch signal judged to be received in step 204 or step 356, regardless of which of the touch portions 150-172 the touch signal judged in step 304 or step 360 corresponds to.

However, a structure may be used in which, for example, a touch signal is judged to be received in step 304 or step 360 only in cases in which it is the same touch signal as the touch signal judged to be received in step 204 or step 356.

Further, the present embodiment was structured such that the tap mode menu processing is moved to and the first menu is displayed when the sheet switch 110 is touched two times instantaneously by the finger. However, in addition thereto, a structure may be used in which, when the sheet switch 110 is touched by a finger instantaneously by a predetermined number of times which is three or more times, for example, the tap menu mode processing is moved to, but a second menu which is different than the first menu is displayed.

Moreover, in the present embodiment, the set time TA basically is unchangeable. However, a structure may be used in which, for example, when there is a state in which no signal is received between the touch signal, which is judged to be received in step 204 or step 356, and the touch signal, which is judged to be received in step 304 or step 360, the period of time of the state of no receipt is also measured, and thereafter, the set time TA is automatically changed on the basis of the length thereof.

Third Embodiment

Next, a third embodiment of the present invention will be described.

Figure 18:
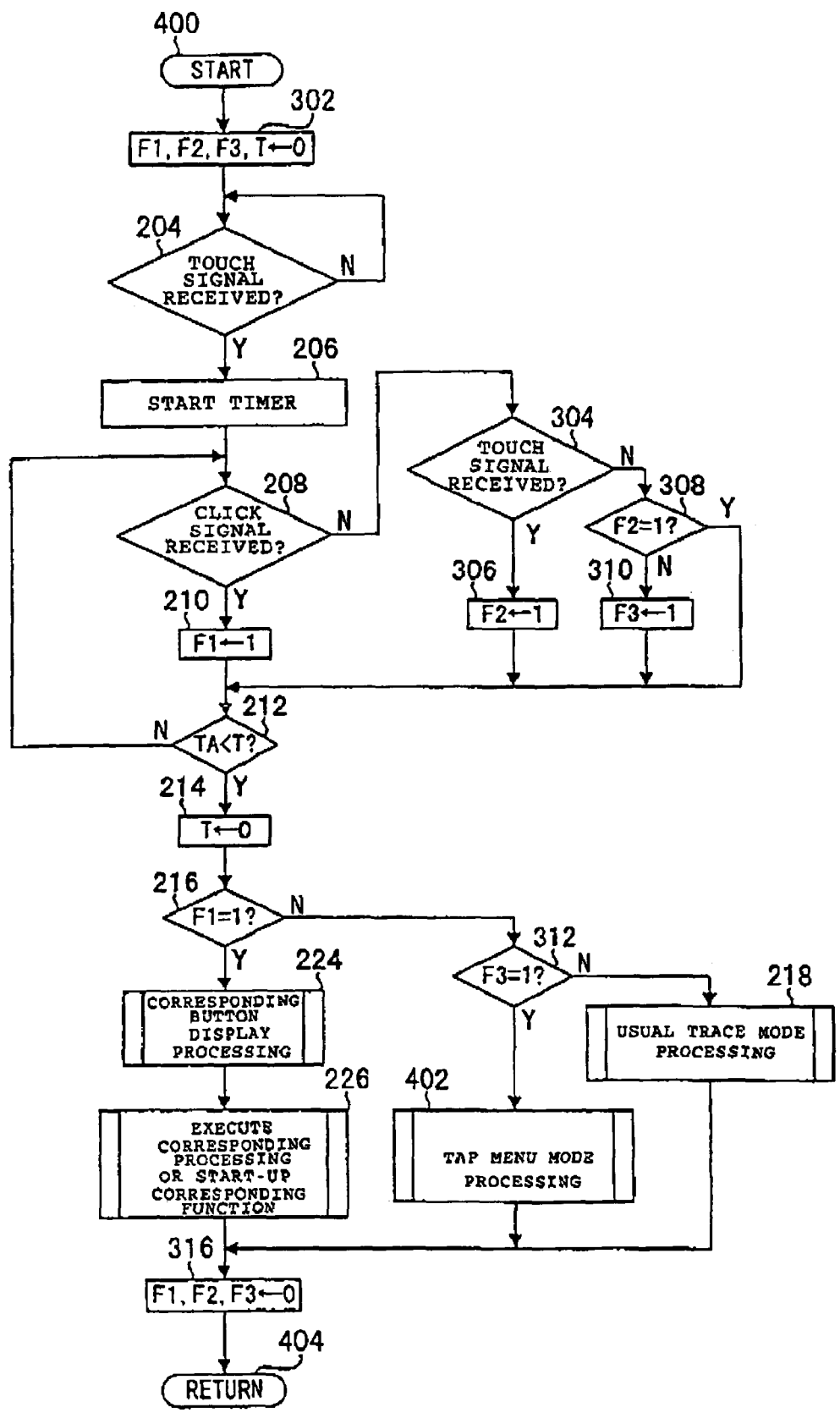
FIG. 18 is a flowchart showing the flow of control of a screen operating device for a vehicle relating to a third embodiment of the present invention.
Figure 19:
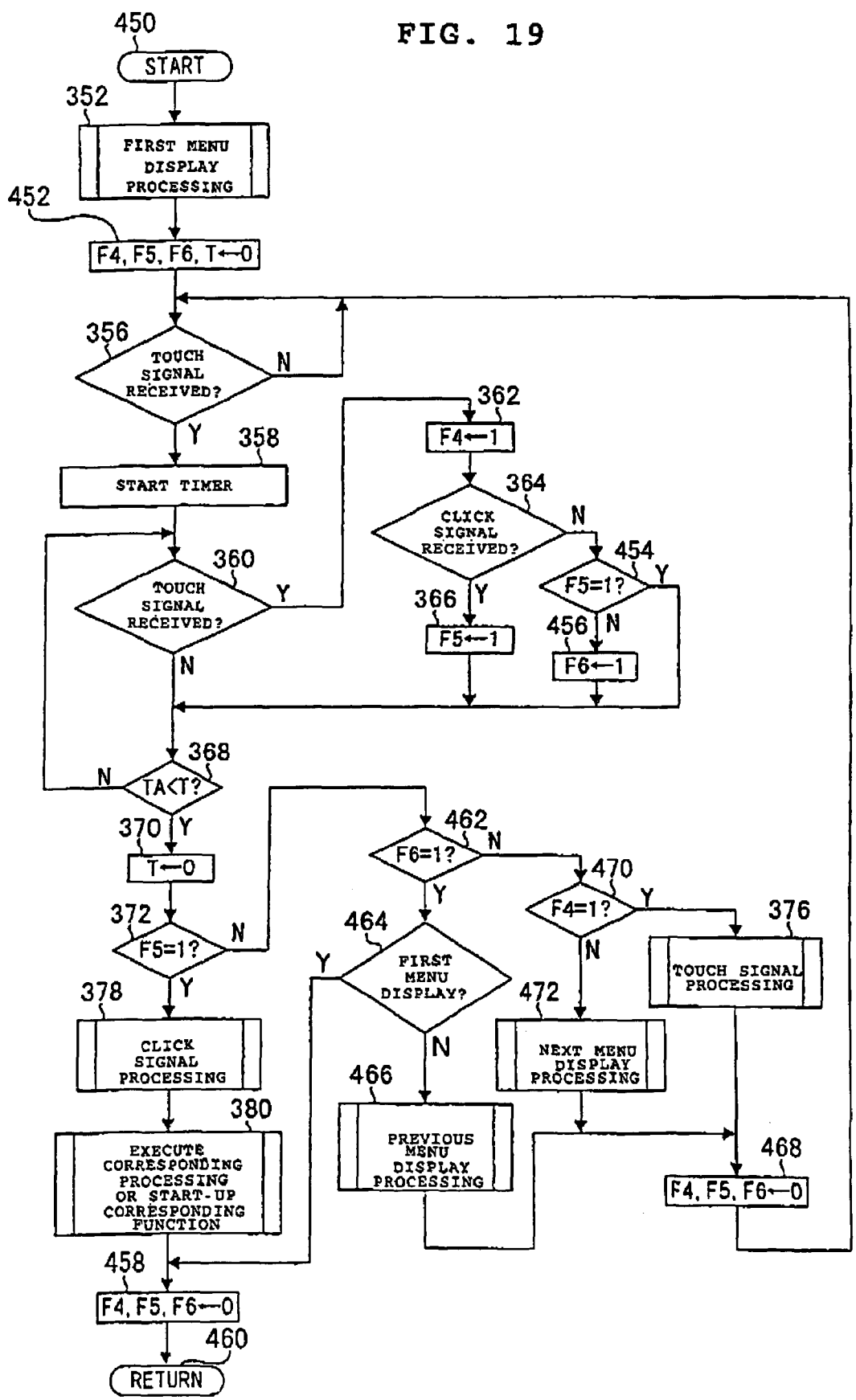
FIG. 19 is a flowchart showing the flow of tap menu mode processing in the third embodiment of the present invention.

Flowcharts showing the function selection processing in the present embodiment are shown in FIG. 18 and FIG. 19. The operation and effects of the present embodiment will be described on the basis of these figures.

In the present embodiment, when the car navigation program is executed in step 400, the same processings as in the above-described second embodiment up to step 312 are carried out. In step 312, when it is judged that 1 has been substituted in for the flag F3, the tap menu mode processing is carried out in step 402.

Here, the tap menu mode processing of the present embodiment is shown by the flowchart in FIG. 19. As is shown in this figure, when tap menu mode processing is executed in step 400, in the same way as in the above-described second embodiment, display processing of the first menu, which corresponds to one of what is called specific processings in the claims, is carried out in step 352.

Next, in step 452, the flags F4, F5, F6 are reset, and further, in step 356, it is judged whether or not an electrical signal from the infrared ray light-receiving portion 20 has been received. When it is judged in step 356 that a touch signal has been received, in step 358, the timer (timer program) is operated, and clocking is started.

Next, in step 360, it is judged whether or not a touch signal has been received again after the touch signal which was judged to be received in step 356. When it is judged that a touch signal has been received, in step 362, 1 is substituted in for the flag F4, and the routine proceeds to step 364. On the other hand, when it is judged in step 360 that a touch signal has not been received, the routine proceeds to step 368.

Further, in step 364, it is judged whether or not a click signal has been received after the touch signal judged to be received in step 356. When it is judged in step 364 that a click signal has been received, in step 366, 1 is substituted in for the flag F5, and thereafter, the routine proceeds to step 368.

On the other hand, when it is judged in step 364 that a click signal has not been received, in step 454, it is judged whether or not 1 has been substituted in for the flag F5. When it is judged in step 454 that the flag F5 is still reset, in step 456, 1 is substituted in for the flag F6. Further, when is it judged in step 454 that 1 has been substituted in for the flag F5, the routine proceeds to step 368 without going through step 456.

Namely, in the present embodiment, 1 is substituted in for the flag F5 if a click signal has not been received even once during the time until the elapsed time T from the start of the timer in step 358 has exceeded the set time TA.

Further, 1 is substituted in for the flag F6 in a state in which a state in which no touch signal has been received is interposed between the touch signal judged to be received in step 356 and the touch signal judged to be received in step 360, i.e., if the sheet switch 110 is touched two times instantaneously and the touch signal is received two times instantaneously. However, 1 is substituted in for the flag F5 in a case in which it is judged in step 356 as well that a touch signal has been received, due to the touch signal, which was judged to be received in step 356, being received continuously. Therefore, 1 is not substituted in for the flag F6.

After the above-described respective types of judgement processings and the like have been carried out, in step 368, it is judged whether or not the elapsed time T from the start of the timer clocking has exceeded the set time TA which was set in advance. Note that this set time TA is not particularly limited. However, basically, it suffices to set the set time TA to a length of an extent such that the operator will not experience a sense of unease such as an operation delay or the like. Empirically, this length is preferably about 0.2 to 0.4 seconds.

Further, the set time TA at the time of the present direct entry mode processing may be the same as or may be different from the set time TA before moving to the direct entry mode processing (the flowchart of FIG. 18).

When it is judged in step 368 that the elapsed time T has exceeded the set time TA, in step 370, the elapsed time T is reset once. Next, in step 372, it is judged whether or not 1 has been substituted in for the flag F5, i.e., whether or not a click signal has been received even one time during the period from the start of the timer in step 358 until the elapsed time T has exceeded the set time TA.

When it is judged in step 372 that the flag F5 is still reset, in the same way as in the above-described second embodiment, the processings of steps 378, 380 are carried out. In step 458, the flags F4, F5, F6 are reset, and the routine returns, via step 460, to the processings shown in FIG. 17.

On the other hand, when it is judged in step 372 that that flag F5 is still reset, in step 462, it is judged whether or not 1 has been substituted in for the flag F6. Here, if 1 is substituted in for the flag F6, i.e., if the sheet switch 110 has been touched two times instantaneously, in step 464, it is judged whether or not the current screen display of the monitor device 26 is the above-described first menu. When it is judged in step 464 that the current screen display of the monitor device 26 is the first menu, the routine proceeds to step 458.

Figure 15:
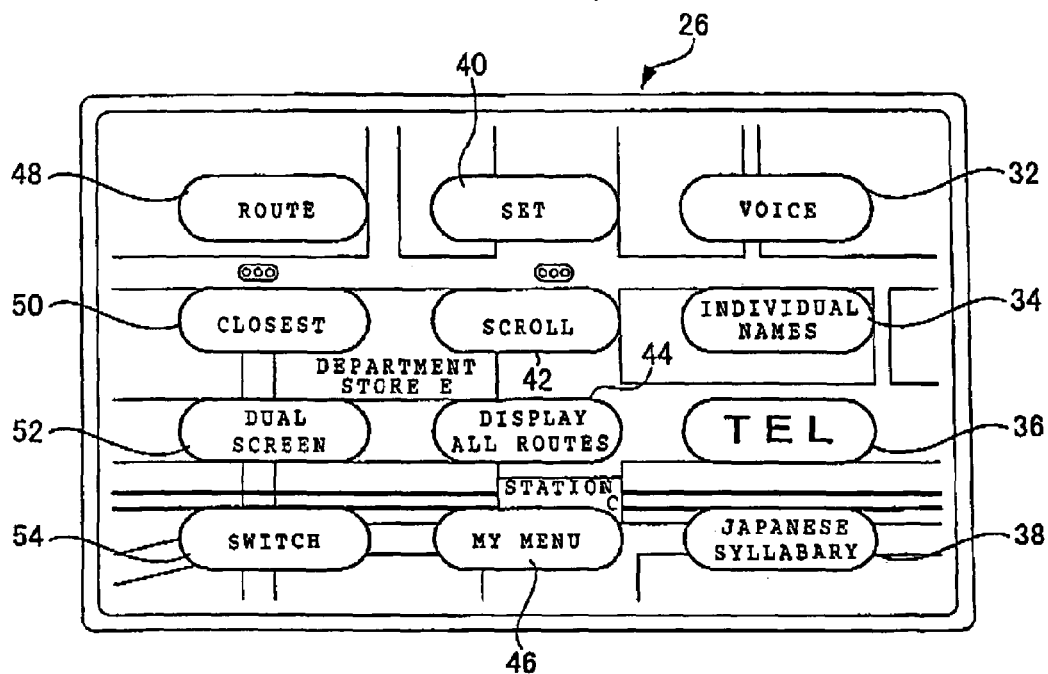
FIG. 15 is a screen example, corresponding to FIG. 8, in a first menu display state at the time of tap menu mode processing which is one specific processing.
Figure 20:
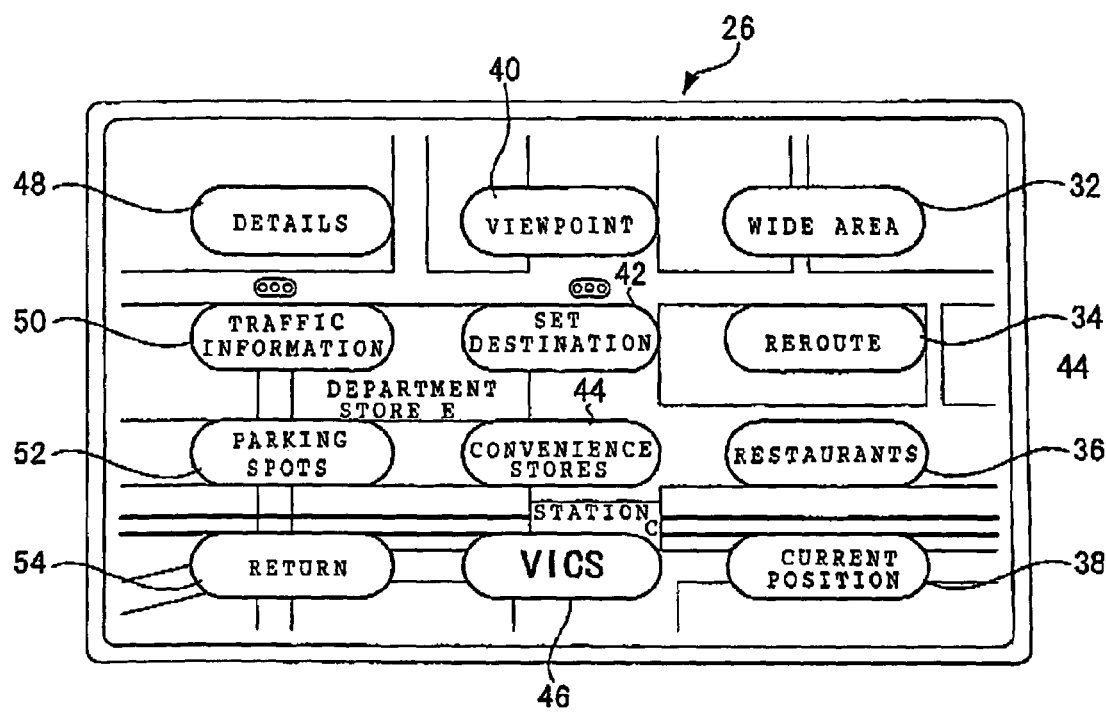
FIG. 20 is a screen example, corresponding to FIG. 8, in a second menu display state at the time of tap menu mode processing which is one specific processing.

In contrast, when it is judged in step 464 that the current screen display is not the first menu, in step 466, previous menu display processing, which corresponds to what is called a specific processing in the claims, is carried out, and the display is changed to a menu screen which is one stage before the menu screen which is currently being displayed (e.g., display is changed from the second menu of FIG. 20 to the first menu of FIG. 15).

This previous menu display processing is basically the same as the processing in above-described step 352, but the labels which are currently displayed are deleted, and labels (label data) which are different than the deleted labels are displayed. Next, in step 468, the respective flags F4, F5, F6 are reset, and the routine returns to step 356.

Further, when it is judged in step 462 that the flag F6 is still reset, the routine proceeds to step 470, and it is judged whether or not 1 has been substituted in for the flag F4.

In step 470, when 1 has not been substituted in for the flag F4, i.e., when the sheet switch 110 has been touched by a finger only one time instantaneously, in step 472, next menu display processing, which corresponds to what is called a specific processing in the claims, is carried out, and display is changed to a menu screen which is one stage after the menu screen which is currently being displayed (e.g., display changes from the first menu shown in FIG. 15 to the second menu shown in FIG. 20).

This next menu processing is basically the same as the processing of above-described step 352, and the labels which are currently displayed are deleted, and labels (label data) which are different than the deleted labels are displayed. Next, in step 468, the respective flags F4, F5, F6 are reset, and the routine returns to step 356.

On the other hand, when it is judged in step 470 that 1 has been substituted in for the flag F4, the routine proceeds to step 376 and touch signal processing is carried out, and the routine further proceeds to step 468.

As described above, in the present embodiment, in addition to effects which are the same as those of the above-described second embodiment, display of the second menu or the like continuing after the first menu is possible, and a larger number of various types of functions and various types of processings can be set.

Further, if the sheet switch 110 is touched one time instantaneously, display switches to the next menu, and if the sheet switch 110 is touched two times instantaneously, display returns to the previous menu. Thus, it suffices to not provide at the controller 70 a special switch or button for such menu feeding.

Fourth Embodiment

Next, a fourth embodiment of the present invention will be described.

Figure 21:
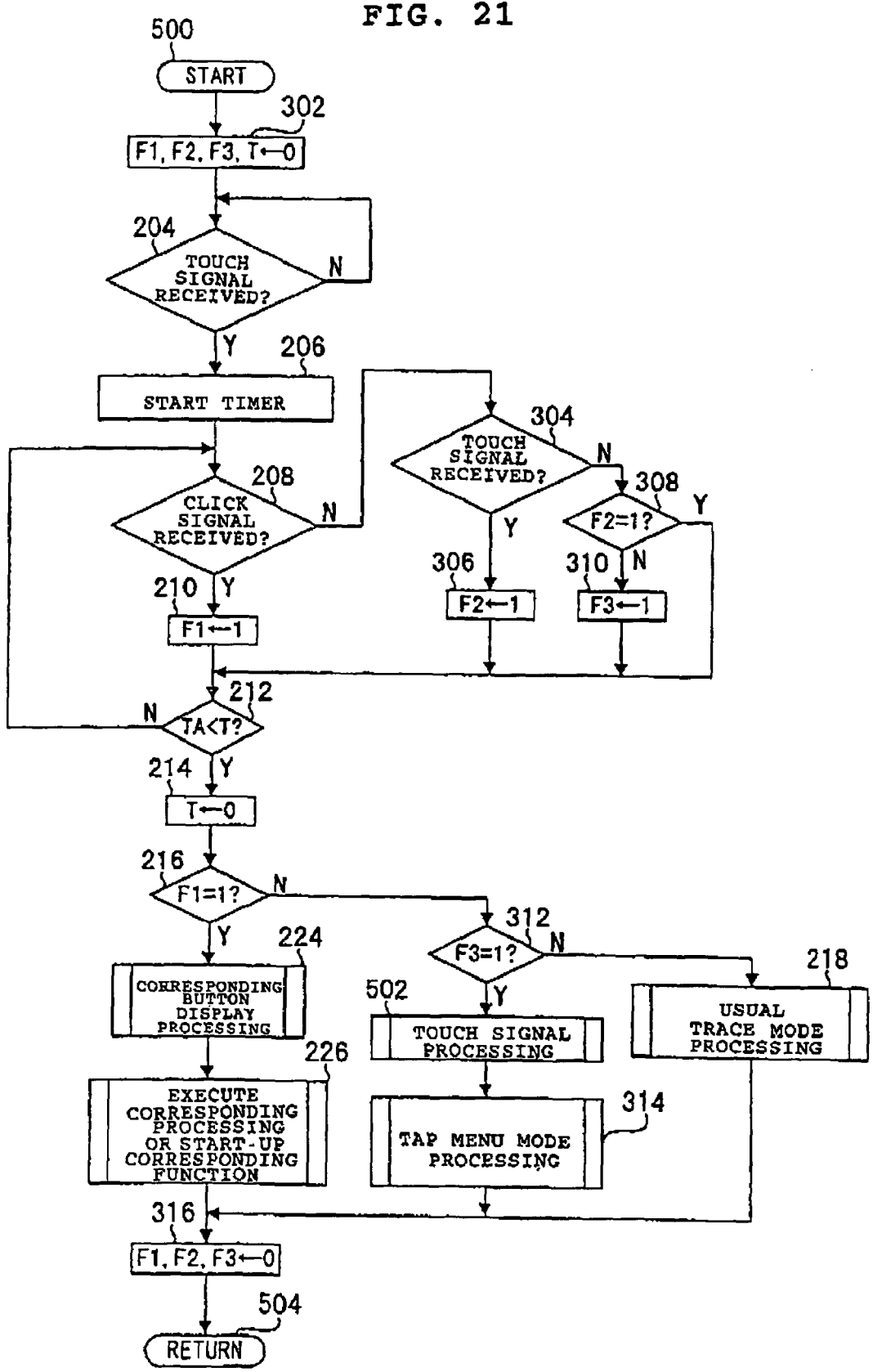
FIG. 21 is a flowchart showing the flow of control of a screen operating device for a vehicle relating to a fourth embodiment of the present invention.

As shown in FIG. 21, in the function selection processing in the present embodiment, when the car navigation program is executed in step 500, thereafter, processings which are basically the same as the above-described second embodiment are carried out.

However, in the present embodiment, when it is judged in step 312 that 1 has been substituted in for the flag F3, the routine proceeds to step 502 and processing of the touch signal is carried out.

In the processing of the touch signal in step 502, the touch signals at the times when ones of the line terminals 122-128, 132-136 are continuous are differentiated, and a first menu which is based on the results of this differentiation is displayed on the monitor device 26.

Namely, the present embodiment is structured such that it is possible to display first menus which differ in accordance with the type of the touch signal at the time of moving to the tap menu mode. In this way, the first menus of various types of functions can be called up immediately, and the operability can be improved, and in addition, an even larger number of various types of functions and various types of processings can be set.

Further, by combining the present embodiment and the above-described third embodiment, an even larger number of various types of functions and various types of processings can be set.

Figure 22:
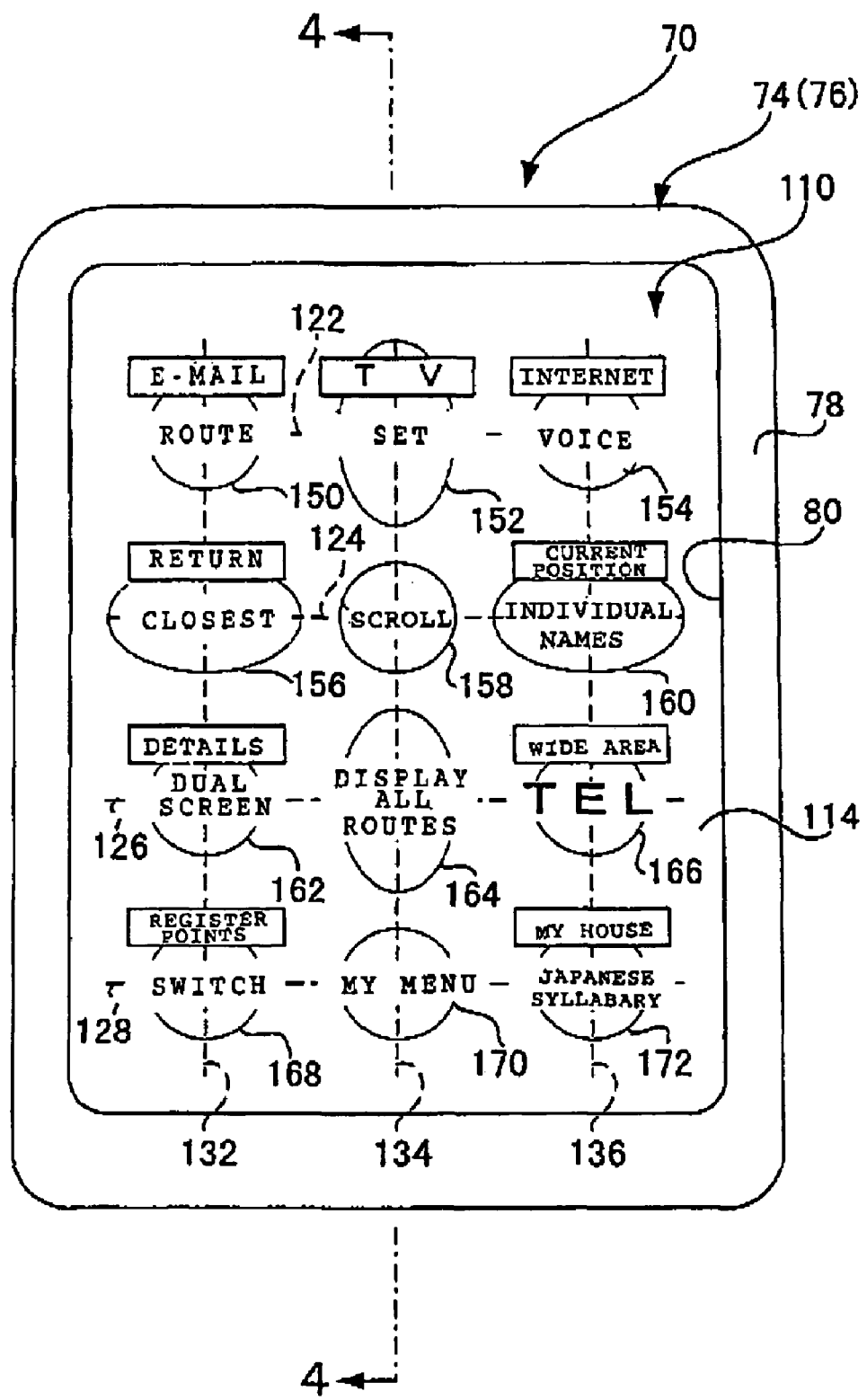
FIG. 22 is a plan view of a controller, corresponding to FIG. 3, to which labeling of the tap menu mode has been applied.

Moreover, for example, as shown in FIG. 22, by applying labels for the direct trace mode to the touch portions 150-172 of the controller 70, the first menu of which function (e.g., the first menu of the E-mail function or the television function, or the internet function) will be displayed by touching which portion can be easily identified. Further, as shown in FIG. 22, by enclosing the labels for the tap menu by rectangles, they can be differentiated from the labels for direct entry, and confusion can be prevented.

Note that the present embodiment was structured such that first menus of various types of functions are displayed by touching the sheet switch 110 two times instantaneously. However, for example, a structure may be used in which, by touching the sheet switch 110 two times instantaneously, the first menu is not displayed but the corresponding processing is directly executed.

This is the same as the direct entry mode processing described until now in that the corresponding processing is executed directly, although the conditions for moving which are "whether or not a click signal has been received even one time during the period until the elapsed time T exceeds the set time TA" and "whether or not the sheet switch 110 has been touched two times instantaneously" are different.

By carrying out setting in this way, an even larger number of direct enter processings can be set, and the operability can be improved. To further elucidate on this point, aspects which directly execute certain processings on the basis of specific conditions not limited to conditions such as "whether or not a click signal has been received even one time during the period until the elapsed time T exceeds the set time TA" or "whether or not the sheet switch 110 has been touched two times instantaneously" or the like, can be defined as "direct enter processings", and aspects which display the first menu and the like of certain functions on the basis of other specific conditions can be defined as "tap menu processings".

Fifth Embodiment

Next, a fifth embodiment of the present invention will be described. Note that the first through fourth embodiments which were described until now were structures in which the present invention is applied to a car navigation device. However, the present embodiment is structured such that the present invention is applied to a center control unit for controlling not only car navigation functions, but also an air conditioning device and an audio device for a vehicle as well as a device for confirming the state of the vehicle.

Figure 25:
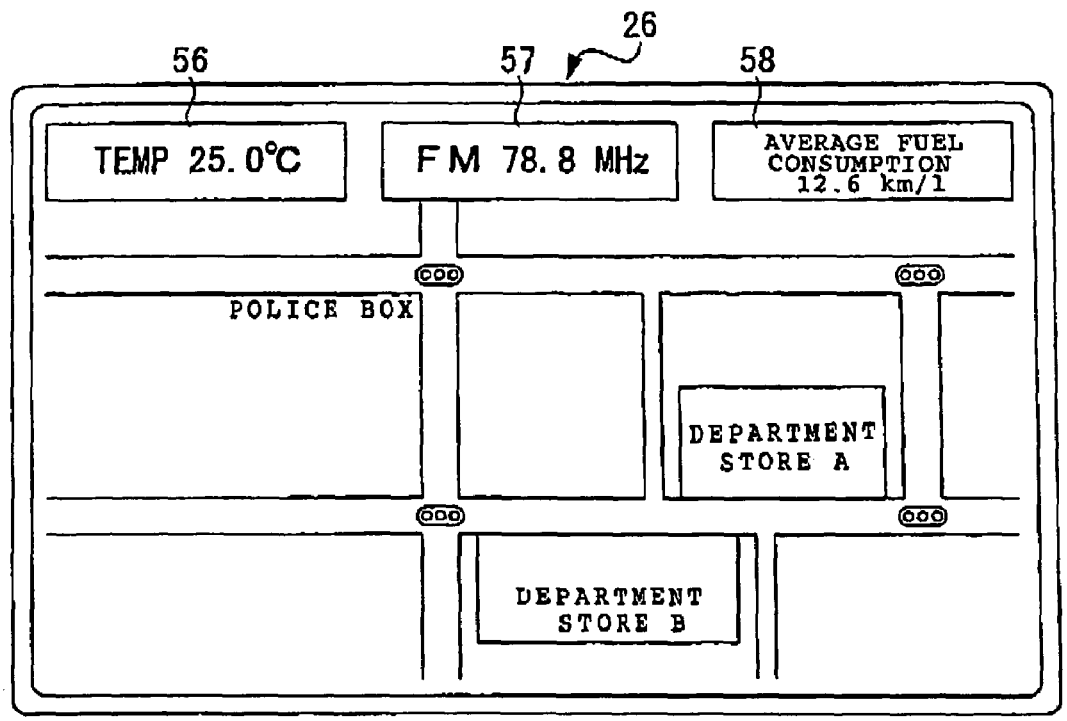
FIG. 25 is a screen example of a map display screen serving as a first screen.

Accordingly, when the control section 22 reads the car navigation program from the storage medium 24, as shown in FIG. 25, the control section 22 expands map data or the like as a main screen, and displays function switching buttons 56, 57, 58 on the monitor device 26.

Figure 28:
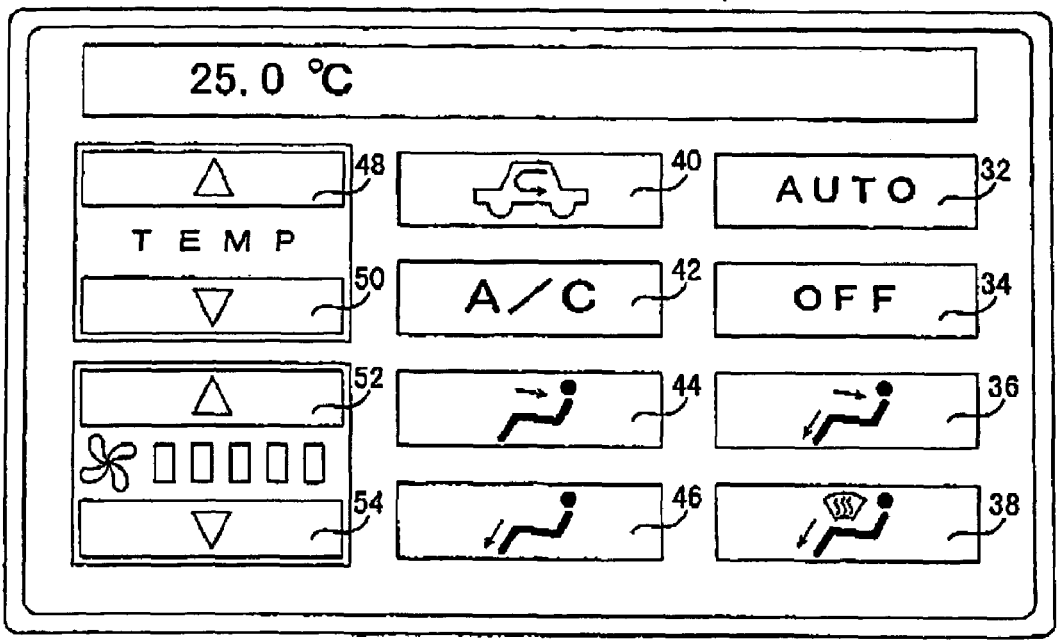
FIG. 28 is a screen example of an air conditioning operation screen serving as a second screen.

Further, when the control section 22 reads an air conditioning operation program from the storage medium 24, as shown in FIG. 28, the plurality of selection buttons 32-54, at which are noted the names of the respective types of functions which an air conditioning device (not shown) mounted in the vehicle has, are displayed in a matrix form (four lines and three columns in the present embodiment).

Figure 31:
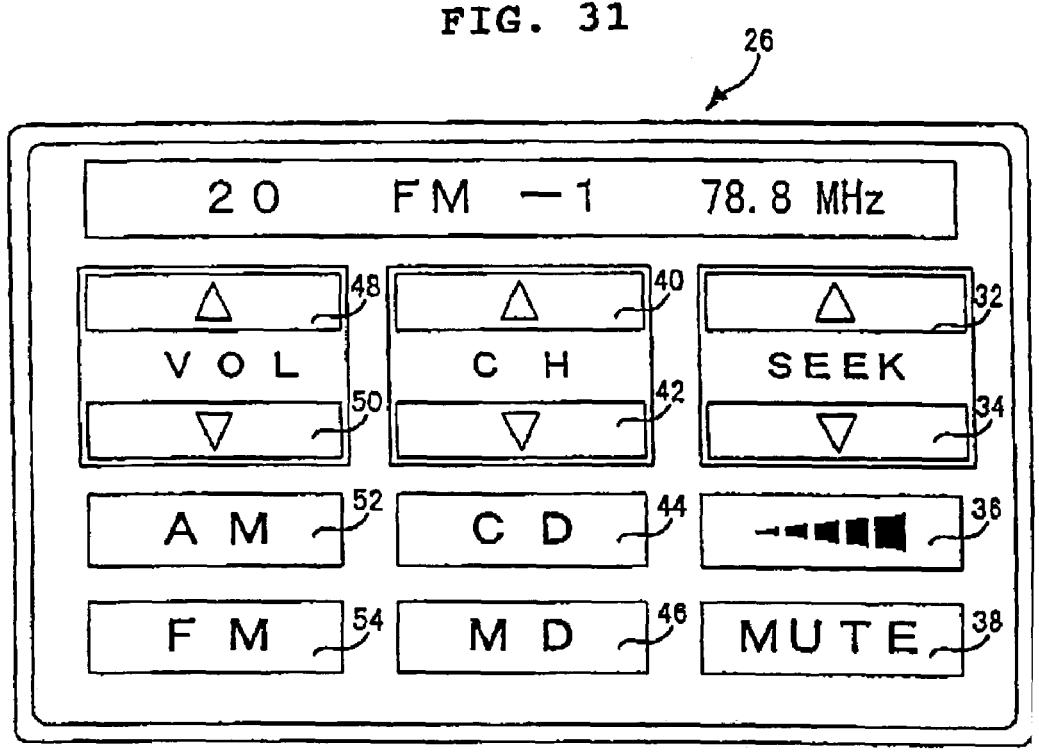
FIG. 31 is a screen example of an audio operation screen serving as a second screen.

Further, when the control section 22 reads an audio operation program from the storage medium 24, as shown in FIG. 31, the plurality of selection buttons 32-54, at which are noted the names of the respective types of functions which an audio device (not shown) mounted in the vehicle has, are displayed in a matrix form (four lines and three columns in the present embodiment).

Figure 34:
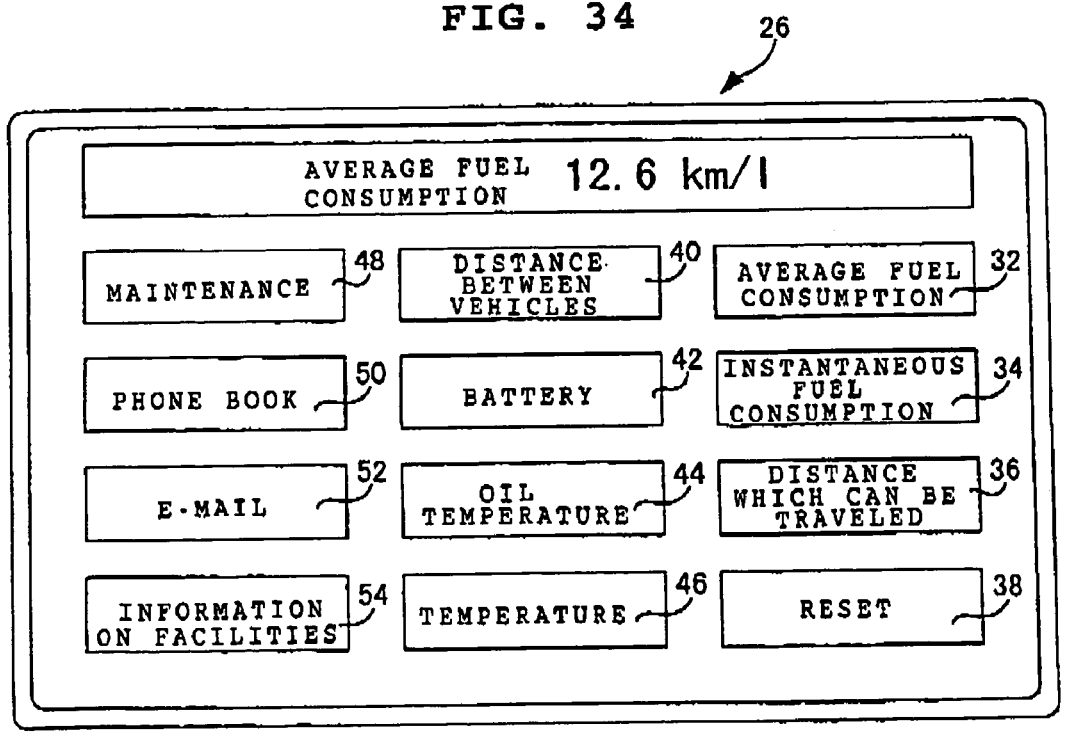
FIG. 34 is a screen example of a vehicle state confirmation screen serving as a second screen.

Moreover, when the control section 22 reads a vehicle state confirmation program from the storage medium 24, as shown in FIG. 34, the plurality of selection buttons 32-54, at which are noted the names of the respective types of functions which this program mounted in the vehicle has, are displayed in a matrix form (four lines and three columns in the present embodiment).

Next, the operation and effects relating to screen switching in the embodiment of the present invention will be described on the basis of the flowchart of FIG. 24.

Figure 24:
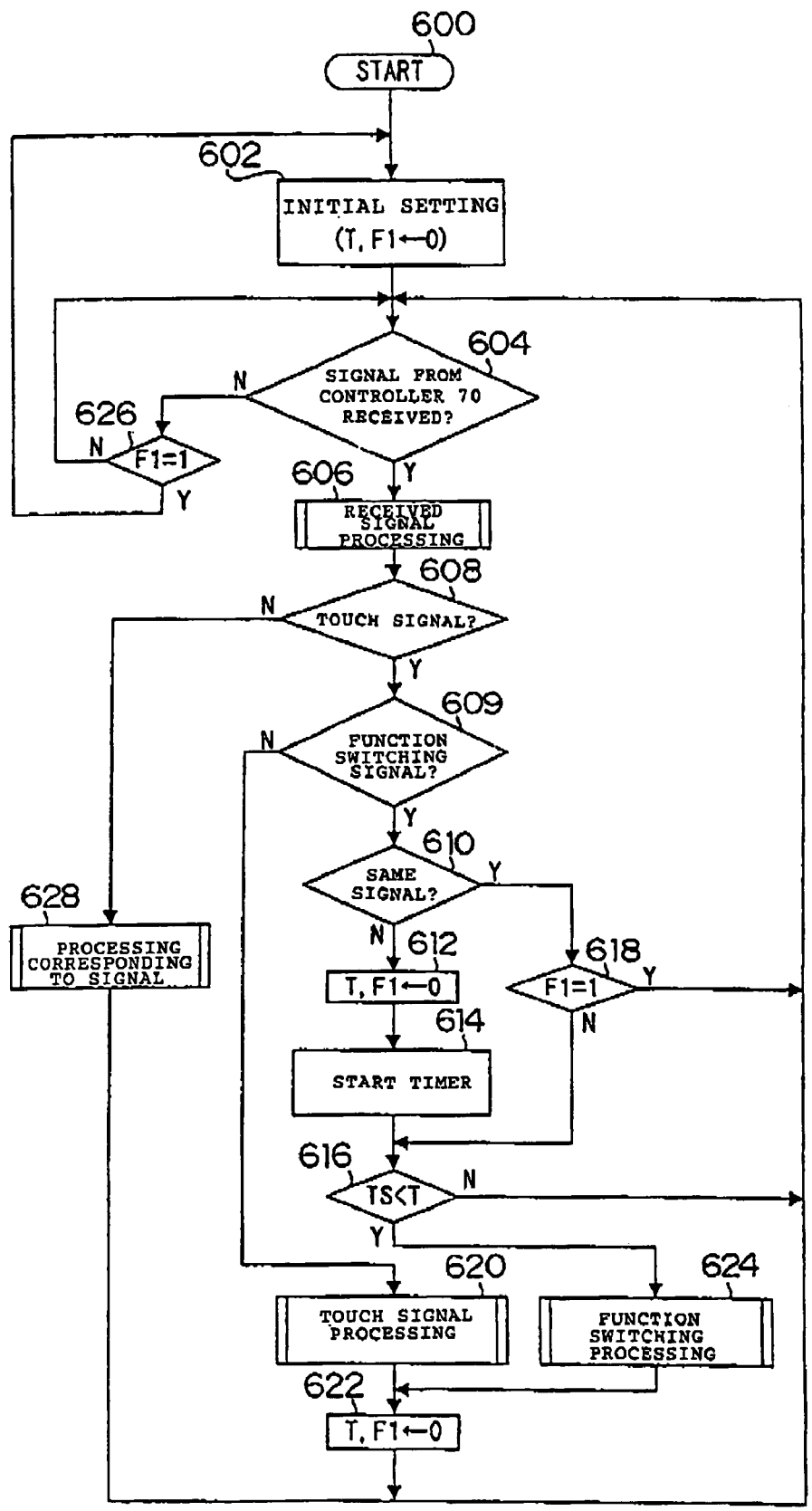
FIG. 24 is a flowchart showing the flow of control of the screen operating device for a vehicle relating to the fifth embodiment of the present invention.

First, as shown in FIG. 24, in step 600, when the control section 22 reads the car navigation program from the storage medium 24 and the car navigation program is started-up, initial setting processing is carried out in step 602. In this initial setting processing, the flag F1 and the timer (timer program) are reset. Further, in this state, the car navigation program, which corresponds to what is called a "special function" in the claims, is executed in parallel, and a map screen serving as a first screen based on the car navigation program is displayed on the monitor device 26, and the function switching buttons 56-60 are displayed at positions corresponding to the touch portions 150-154 on the sheet switch 110.

Next, in step 604, it is judged whether or not the control section 22 has received an electrical signal from the infrared ray light-receiving section 20. If the control section 22 has not received (has not had inputted thereto) either a touch signal or a click signal, the routine proceeds to step 626, and it is judged whether or not 1 has been substituted in for the flag F1. However, if it is immediately after the present car navigation program has started from step 600, it is a state in which the flag F1 is still reset, and therefore, the routine returns to step 604.

In contrast, for example, when the control section 22 receives a touch signal, the routine proceeds from step 604 to step 606, and the electrical signal from the infrared ray light-receiving portion 20 is processed. Next, in step 608, it is judged whether or not the electrical signal processed in step 606 is a touch signal.

In this case, because the received signal is a touch signal, the routine proceeds from step 608 to step 609. In step 609, it is judged whether or not the touch signal is a function switching signal.

Here, the functions for moving to the operation selection screens while the respective programs which are the audio operation program, the air conditioning operation program, and the vehicle state confirmation program are being started-up, are allotted to the respective function switching buttons 56 58. When the touch signal corresponding to these function switching buttons 56 58, i.e., the touch signal when one of the touch portions 150 154 is touched in this state, the touch signal is inputted to the control section 22, the control section 22 recognizes the touch signal at this time to be a function switching signal, and the routine proceeds to step 624. In contrast, when it is judged that a touch signal, which is other than a touch signal corresponding to the function switching buttons 56-58 (i.e., a function switching signal), has been received in the state in which the screen shown in FIG. 25 is displayed on the monitor device 26, the routine proceeds as is to step 620, and processing of the touch signal is carried out.

Figure 26:
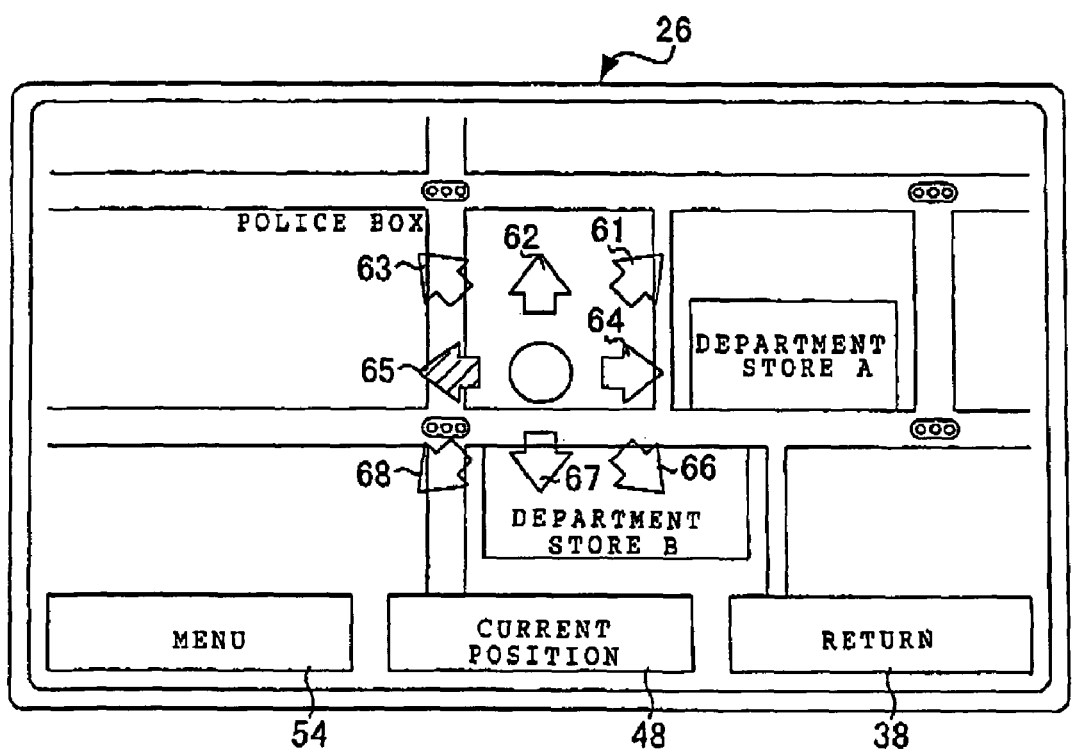
FIG. 26 is an example of the map display screen in a case in which a region other than a function switching portion is selected.

For example, in the state shown in FIG. 25, when the control section 22 receives the touch signal corresponding to the touch portion 156, as shown in FIG. 26, a plurality of arrow marks 61-68, which are directed radially in respectively different directions, are displayed on the map screen, and the three selection buttons 38, 46, 54 are displayed beneath these arrow marks 61-68.

The arrow marks 61-68 are displayed in approximately three lines and three columns, including a circle mark displayed at the center thereof, and correspond to the touch portions 150-166. Further, the selection buttons 38, 46, 54 correspond to the touch portions 168-172 from the left side (i.e., from the selection button 54).

Further, in the state in which these arrow marks 61-68 and selection buttons 38, 46, 54 are displayed, because the touch signal which the control section 22 received immediately therebefore corresponds to the touch signal of the touch portion 156, the arrow mark 65 corresponding to this touch portion 156 is reverse-displayed, and it is shown that the arrow mark 65 is in a selected state.

When the above-described processings (the touch signal processings in this state) are completed, in step 624, 1 is substituted in for the flag F1, and the routine returns to step 604.

Thereafter, if a click signal and another touch signal are not received, the routine returns from step 618 to step 604 as is, and a standby state for another touch signal or click signal arises.

In this state, when a click signal is inputted to the control section 22 due to the panel 84 being pressed, the routine proceeds from step 608 to step 628. On the basis of the arrow mark 65 which is in a selected state, the map data structuring the map screen is moved on the whole in the direction opposite the direction of the arrow mark 65, and apparently, the screen on the monitor device 26 is moved in substantially the same direction as the arrow mark 65 with respect to the displayed map screen.

Figure 27:
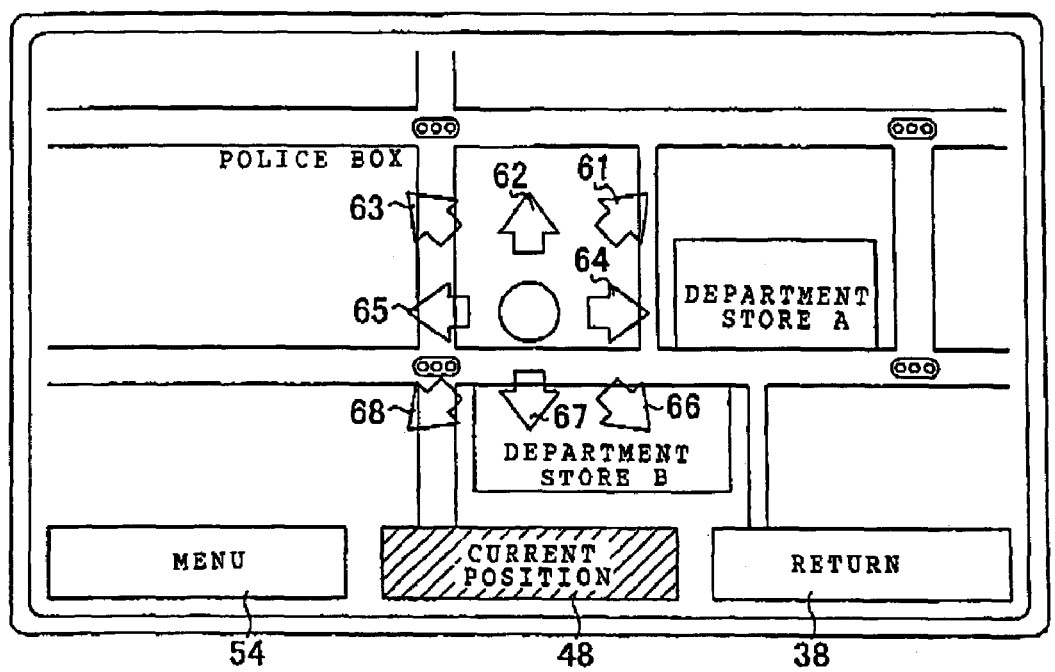
FIG. 27 is an example of the map display screen in a state in which a selection portion is selected after a region other than a function switching portion has been selected.

In contrast, on the sheet switch 110, for example, when a finger slides toward the touch portion 170 and the control section 22 receives a touch signal corresponding to the touch portion 170 with a set time TS being exceeded, in step 620, as shown in FIG. 27, the reverse-display of the arrow mark 65 is cancelled, and the selection button 46 corresponding to the touch portion 170 is reverse-displayed, and it shows that the selection button 46 is in a selected state.

In this state, when a click signal is inputted to the control section 22 due to the panel 84 being pressed, the routine proceeds from step 608 to step 628. Processing based on the display contents of the selection button 46 which is in a selected state (in the present embodiment, map screen display centered around the current position) is carried out.

On the other hand, after the touch signal processing in step 622 or the processing based on the signal in step 628 has been carried out, when a touch signal or a click signal is no longer inputted to the control section 22 due to, for example, the finger being moved away from the sheet switch 110 or the like (i.e., when output of a touch signal or a click signal is stopped), the routine proceeds from step 604 to step 626. As described above, in step 626, it is judged whether or not 1 has been substituted in for the flag F1. However, after the touch signal processing is carried out one time in step 620, 1 is substituted in for the flag F1 in step 622. Therefore, in this state, the routine returns from step 626 to step 602, and the initial state shown in FIG. 25 arises again.

Then, when, in the first initial state, one of the touch portions 150-154 is touched by a finger and the control section 22 receives the touch signal corresponding to this one of the touch portions 150-154, in step 609, it is judged that it is a function switching signal, and the routine proceeds to step 610. In step 610 it is judged whether or not the function switching signal is the same signal as the signal which was received immediately therebefore.

If the present car navigation program is immediately after the start from step 600, there is no signal which was received therebefore. Thus, the routine proceeds to step 612, and the elapsed time T of the timer (timer program) is reset. In step 614, the timer (timer program) is started-up.

Next, in step 616, it is judged whether or not the elapsed time T has exceeded the set time TS which was set in advance. If it is the first initial state, at that point in time, the elapsed time T has not exceeded the set time TS, and therefore, the routine returns to step 604.

On the other hand, if the set time TS has been exceeded, and further, the same function switching signal has been received, the routine proceeds from step 616 to step 624, and function switching processing is carried out.

If the function switching signal (touch signal) at this time is the function switching signal corresponding to the touch portion 150, in step 624, an air conditioning operation program, which serves as what is called another function in the claims, is executed, and an air conditioning operation screen, which includes the plurality of selection buttons 32-54 and serves as what is called a second screen in the claims, is displayed on the monitor device 26. These selection buttons 32-54 are lined up on the whole in a matrix form of four lines and three columns, and respectively correspond to the touch portions 150-172.

Figure 29:
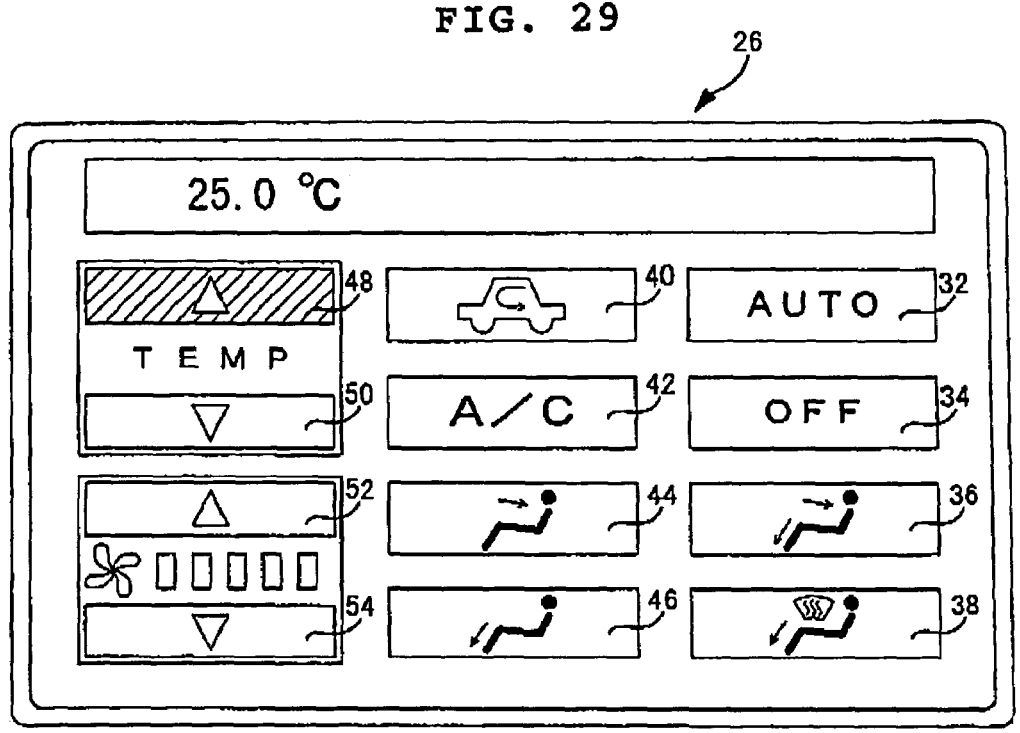
FIG. 29 is a screen example of the air conditioning operation screen in a state in which a selection portion, which corresponds to the function switching portion which was selected in the first screen, is reversed.

Further, in the state in which this air conditioning operation screen is displayed, the touch signal which was inputted to the control section 22 immediately therebefore corresponds to the touch portion 150. Therefore, as shown in FIG. 29, the selection portion 48 corresponding to this touch portion 150 is reverse-displayed, and it shows that the selection portion 48 is in a selected state.

Thereafter, if a click signal and another touch signal are not received, the routine returns as is from step 618 to step 604, and a standby state for another touch signal or click signal arises.

In this state, when a click signal is inputted to the control section 22 due to the panel 84 being pressed, the routine proceeds from step 608 to step 628, and processing based on the display contents of the selection button 48 which is in the selected state (in the present embodiment, raising of the set temperature) is carried out.

Figure 30:
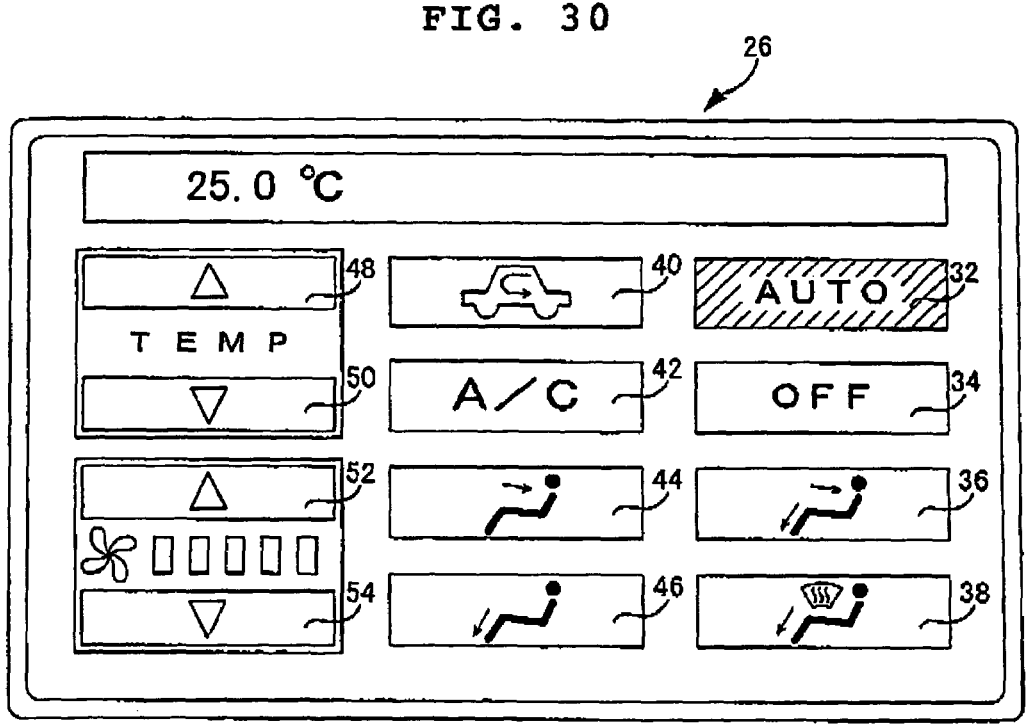
FIG. 30 is a screen example of the air conditioning operation screen in a state in which another selection portion is selected.

In contrast, when a finger slides on the sheet switch 110 toward, for example, the touch portion 154 and the control section 22 receives the function switching signal (touch signal) corresponding to the touch portion 154 with the set time TS being exceeded, in step 620, as shown in FIG. 30, the reverse-display of the selection button 48 is cancelled, and the selection button 32 corresponding to the touch portion 154 is reverse-displayed, and it shows that the selection button 32 is in a selected state.

In this state, when the control section 22 receives a click signal due to the panel 84 being pressed, the routine proceeds from step 608 to step 628, and processing based on the display contents of the selection button 32 which is in the selected state (in the present embodiment, automatic adjustment of the wind speed or the like) is carried out.

On the other hand, after the touch signal processing in step 622 or the processing based on the signal in step 628 has been carried out, when a touch signal or a click signal is no longer received by the control section 22 due to, for example, the finger moving away from the sheet switch 110 or the like, the routine proceeds from step 604 to step 626. As described above, in step 626, it is judged whether or not 1 has been substituted in for the flag F1. However, after the touch signal processing is carried out one time in step 620, 1 is substituted in for the flag F1 in step 622. Therefore, in this state, the routine returns from step 626 to step 602, and the initial state shown in FIG. 25 arises again.

In contrast, in the first initial state, when the control section 22 receives a function switching signal (touch signal) corresponding to the touch portion 152, in step 624, an audio operation program, which serves as what is called another function in the claims, is executed, and an audio operation screen, which includes the plurality of selection buttons 32-54 and serves as what is called a second screen in the claims, is displayed on the monitor device 26.

Figure 32:
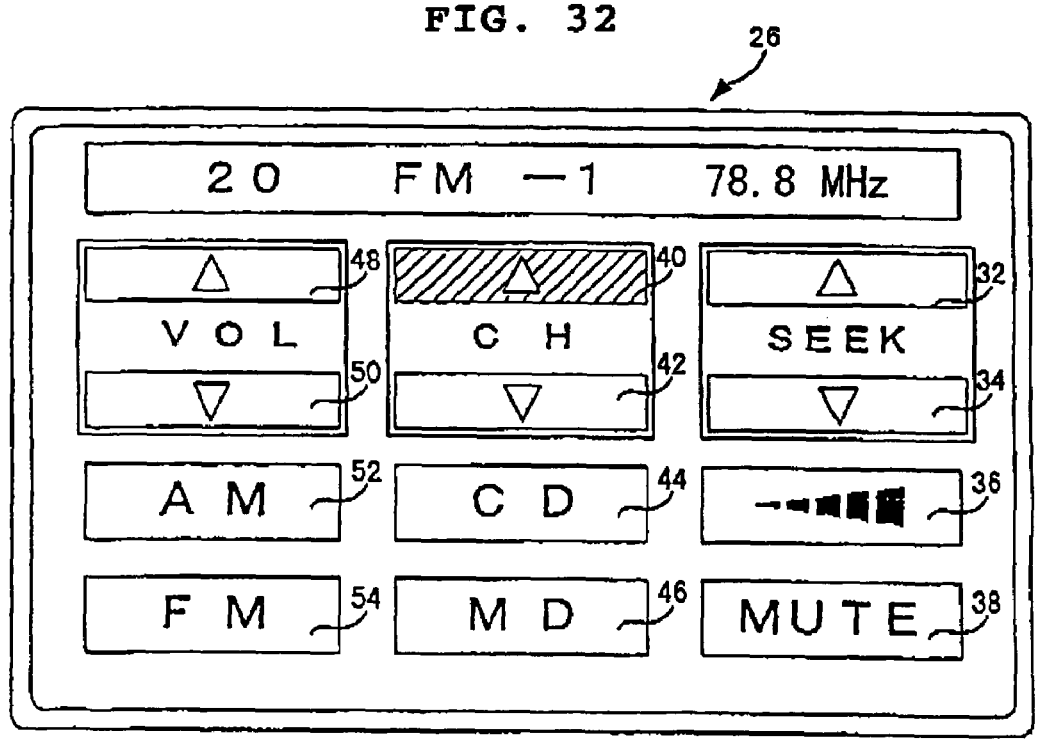
FIG. 32 is a screen example of the audio operation screen in a state in which a selection portion, which corresponds to the function switching portion which was selected in the first screen, is reversed.

In the state in which this audio operation screen is displayed, the touch signal, which was inputted to the control section 22 immediately therebefore, corresponds to the touch portion 152 shown in FIG. 23. Therefore, as shown in FIG. 32, the selection button 40 corresponding to this touch portion 152 is reverse-displayed, and it shows that the selection button 40 is in a selected state.

Thereafter, if a click signal and another touch signal are not received, the routine returns from step 618 to step 604 as is, and a standby state for another touch signal or click signal arises.

In this state, when a click signal is inputted to the control section 22 due to the panel 84 being pressed, the routine proceeds from step 608 to step 628, and processing based on the display contents on the selection button 40 which is in the selected state (in the present embodiment, raising and changing the FM channel) is carried out.

Figure 33:
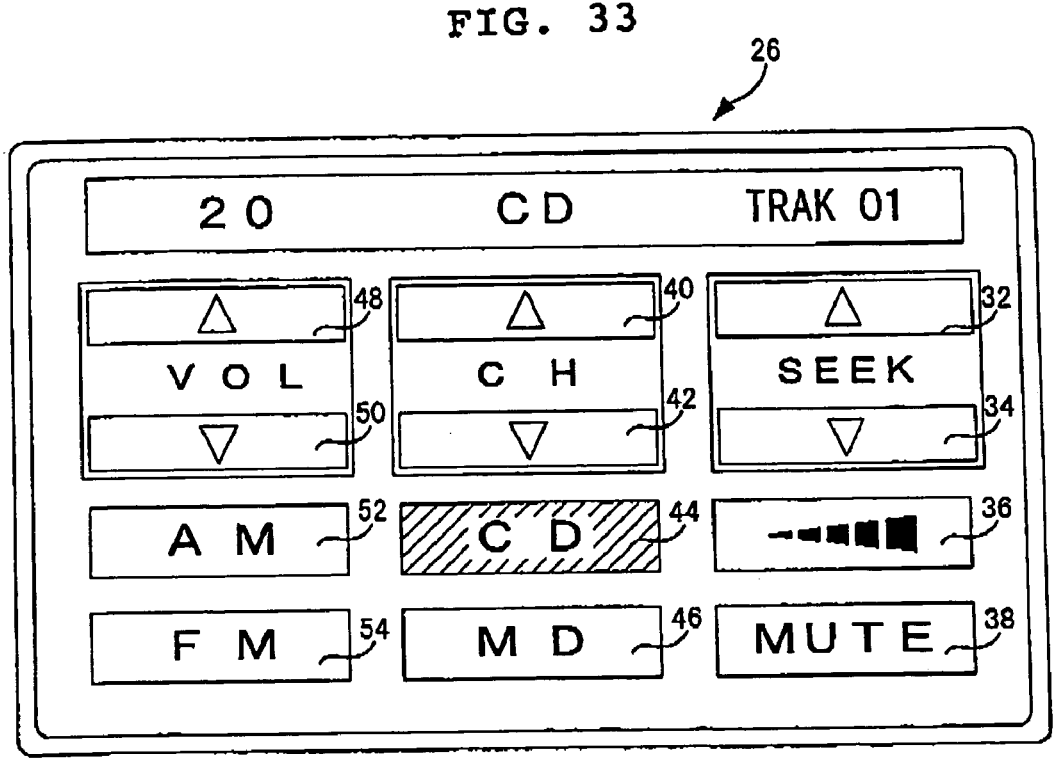
FIG. 33 is a screen example of the audio operation screen in a state in which another selection portion is selected.

In contrast, when a finger slides on the sheet switch 110 toward, for example, the touch portion 164 and the control section 22 receives a touch signal corresponding to the touch portion 164 with the set time TS being exceeded, in step 620, as shown in FIG. 33, the reverse-display of the selection button 40 is cancelled, and the selection button 44 corresponding to the touch portion 154 is reverse-displayed, and it shows that the selection button 44 is in a selected state.

In this state, when a click signal is inputted to the control section 22 due to the panel 84 being pressed, the routine proceeds from step 608 to step 628, and processing based on the display contents of the selection button 44 which is in the selected state (in the present embodiment, compact disc play starting mode) is carried out.

On the other hand, after the touch signal processing in step 622 or the processing based on the signal in step 628 has been carried out, when a touch signal or a click signal is no longer received by the control section 22 due to, for example, the finger moving away from the sheet switch 110 or the like, the routine proceeds from step 604 to step 626. As described above, in step 626, it is judged whether or not 1 has been substituted in for the flag F1. However, after the touch signal processing is carried out one time in step 620, 1 is substituted in for the flag F1 in step 622. Therefore, in this state, the routine returns from step 626 to step 602, and the initial state shown in FIG. 25 arises again.

Further, in the first initial state, when the control section 22 receives a function switching signal (a touch signal) corresponding to the touch portion 154, in step 624, a vehicle state confirmation program, which serves as what is called another function in the claims, is executed, and a vehicle state confirmation screen, which includes the plurality of selection buttons 32-54 and serves as what is called a second screen in the claims, is displayed on the monitor device 26. These selection buttons 32-54 are lined up on the whole in a matrix form of four lines and three columns, and respectively correspond to the touch portions 150-172.

Figure 35:
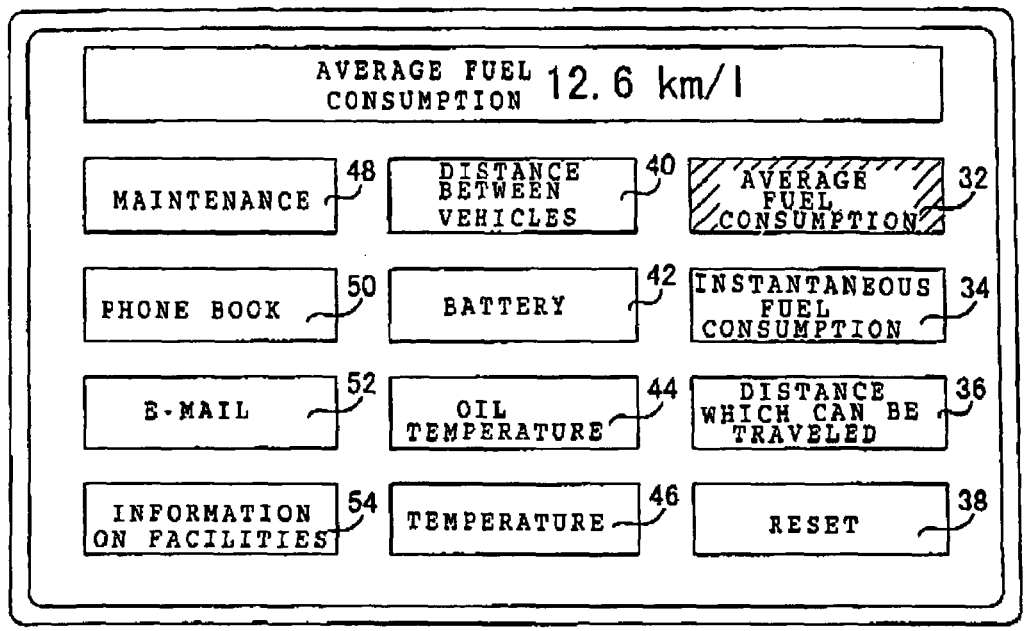
FIG. 35 is a screen example of the vehicle state confirmation screen in a state in which a selection portion, which corresponds to the function switching portion which was selected in the first screen, is reversed.

Further, in the state in which this vehicle state confirmation screen is displayed, the touch signal, which the control section 22 received immediately therebefore, corresponds to the touch portion 154. Therefore, as shown in FIG. 35, the selection button 32 corresponding to the touch portion 154 is reverse-displayed, and it shows that the selection button 32 is in a selected state.

Thereafter, if a click signal and another touch signal are not received, the routine returns from step 618 to step 604 as is, and a standby state for another touch signal or click signal arises.

In this state, when a click signal is inputted to the control section 22 due to the panel 84 being pressed, the routine proceeds from step 608 to step 628, and processing based on the display contents on the selection button 32 which is in the selected state (in the present embodiment, average fuel consumption display) is carried out.

Figure 36:
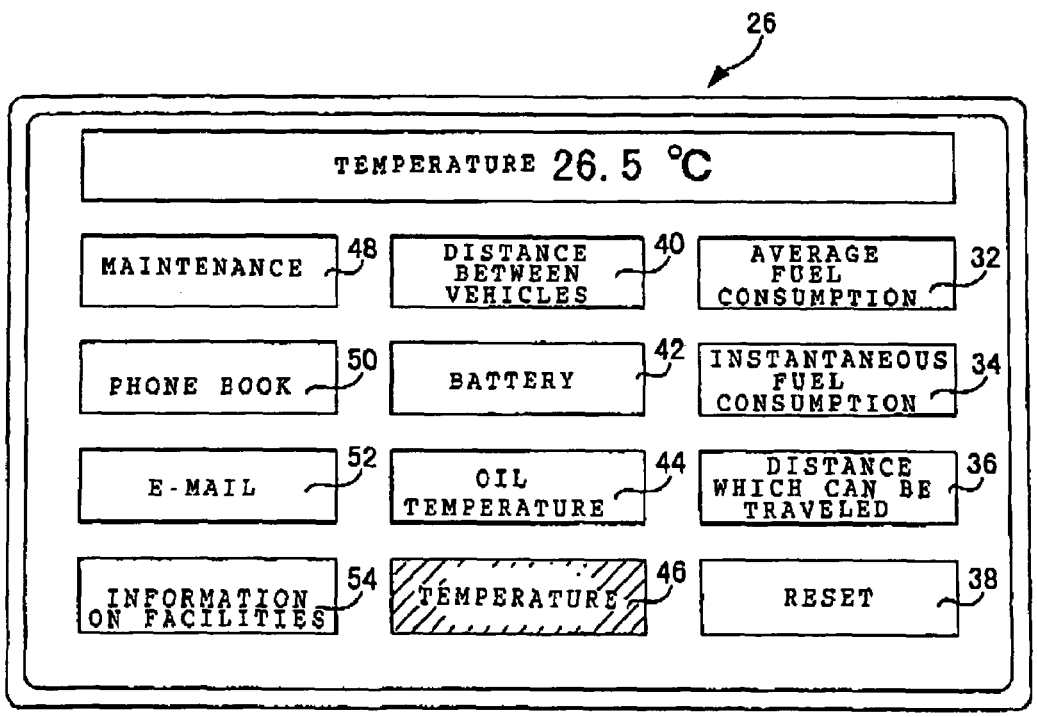
FIG. 36 is a screen example of the vehicle state confirmation screen in a state in which another selection portion is selected.

In contrast, when a finger slides on the sheet switch 110 toward, for example, the touch portion 170 and the control section 22 receives a touch signal corresponding to the touch portion 170 with the set time TS being exceeded, in step 620, as shown in FIG. 36, the reverse-display of the selection button 32 is cancelled, and the selection button 46 corresponding to the touch portion 170 is reverse-displayed, and it shows that the selection button 46 is in a selected state.

In this state, when a click signal is inputted to the control section 22 due to the panel 84 being pressed, the routine proceeds from step 608 to step 628, and processing based on the display contents of the selection button 44 which is in the selected state (in the present embodiment, outside temperature display) is carried out.

On the other hand, after the touch signal processing in step 622 or the processing based on the signal in step 628 has been carried out, when a touch signal or a click signal is no longer received by the control section 22 due to, for example, the finger moving away from the sheet switch 110 or the like, the routine proceeds from step 604 to step 626. As described above, in step 626, it is judged whether or not 1 has been substituted in for the flag F1. However, after the touch signal processing is carried out one time in step 620, 1 is substituted in for the flag F1 in step 622. Therefore, in this state, the routine returns from step 626 to step 602, and the initial state shown in FIG. 25 arises again.

As described above, in the present embodiment, even if the map display screen shown in FIG. 25 is displayed, due to the function switching buttons 56-58 being displayed in the map display screen, and further, the control section 22 receiving the touch signal corresponding to one of these function switching buttons 56-58, it is possible to switch to the screen corresponding to the program of one of air conditioning operation, audio operation, and vehicle state confirmation. Thus, the operability of the respective operations (work) belonging to the air conditioning operation, audio operation, and vehicle state confirmation and the like, can be improved.

Further, in the present embodiment, in the state in which display has been switched to the screen corresponding to the program of one of the air conditioning operation, audio operation, and vehicle state confirmation, due to the finger being moved away from the sheet switch 110 such that a state in which the control section 22 does not receive a signal arises, display returns to the initial screen shown in FIG. 25. Thus, a special operation for returning to the initial screen is unnecessary. Accordingly, in this sense as well, the operability improves.

Moreover, in the present embodiment, display, which is the same as or corresponds to the selection buttons 48, 40, 32 which are reverse-displayed immediately after screen switching corresponding to the function switching buttons 56-58, is carried out. Therefore, when the control section 22 receives a click signal immediately after screen switching, it can be recognized, in the state before screen switching, which type of operation is to be carried out. Furthermore, if it is operation contents displayed on the function switching buttons 56-59, there is no need to again select the selection buttons 32-54 after the screen switching. Thus, in this sense as well, the operability improves.

Note that further improvement in operability is possible by displaying the operation contents having the highest frequencies of use at the time of execution of the respective programs on the function switching buttons 56-58, and allocating these operation contents having high frequencies of use to the corresponding selection buttons 48, 40, 32 after screen switching, although setting was not particularly carried out in the present embodiment.

Further, in the present embodiment, the display contents of the function switching buttons 56-58 were basically constant. However, the display contents of the function switching buttons 56-58 may be changed appropriately.

Figure 37:
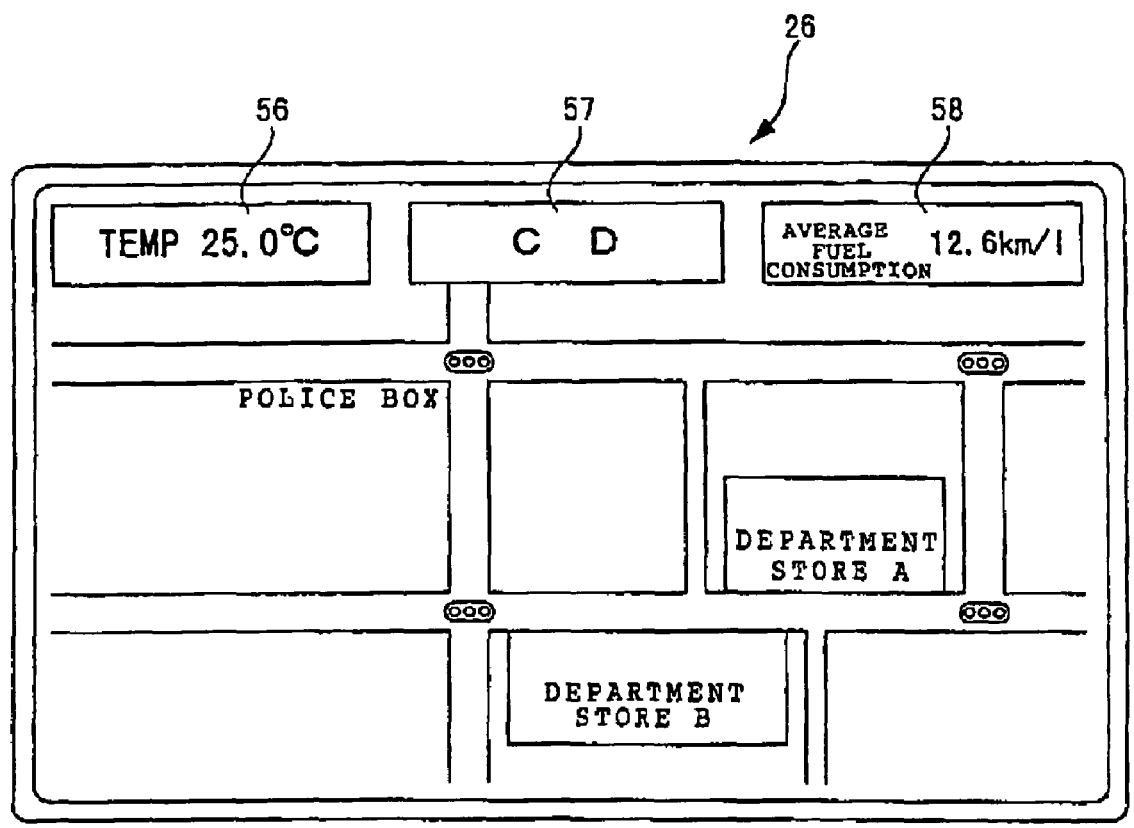
FIG. 37 is a screen example corresponding to FIG. 25, and showing a modified example of the present embodiment.

Namely, for example, when the main menu is returned to in a state in which execution of the audio operation program has selected compact disc playing as shown in FIG. 33, the display "CD", which is displayed on the selection button 44 in FIG. 33 on the function selection button 57 thereafter, may be structured so as to be displayed on the function selection button 57 as shown in FIG. 37. When the finger touches the touch portion 152 corresponding to this function switching button 57 and the panel 84 is pressed (i.e., a click signal is transmitted) within a predetermined period of time (before the aforementioned elapsed time T exceeds the set time TS), the function in the case of selecting the selection button 44, i.e., compact disk playing, may be carried out immediately.

In the case of such a structure, the function which was used the previous time can be selected immediately even if the selection buttons 32 54 are not selected. Thus, it is possible to aim for a reduction in hierarchical operations and selection operations, and the operability can be improved.

Sixth Embodiment

Next, a sixth embodiment of the present invention will be described.

In the car navigation device to which the screen operating device for the vehicle relating to the present embodiment is applied, when the map screen display program is executed for example, the map data is expanded by the control section 22. Among the expanded map data, data, which is set in advance and which can be displayed in a display region R (within the one-dot chain line R of FIG. 41) of the monitor device 26, is displayed in the display region R of the monitor device 26 (see FIG. 41).

Note that, in each drawing, the display region R is shown by a one-dot chain line within the screen of the monitor device 26. However, this is shown for convenience in explaining the present embodiment, and in actuality, the display region R of such a one-dot chain line is not shown on the screen.

Figure 44:
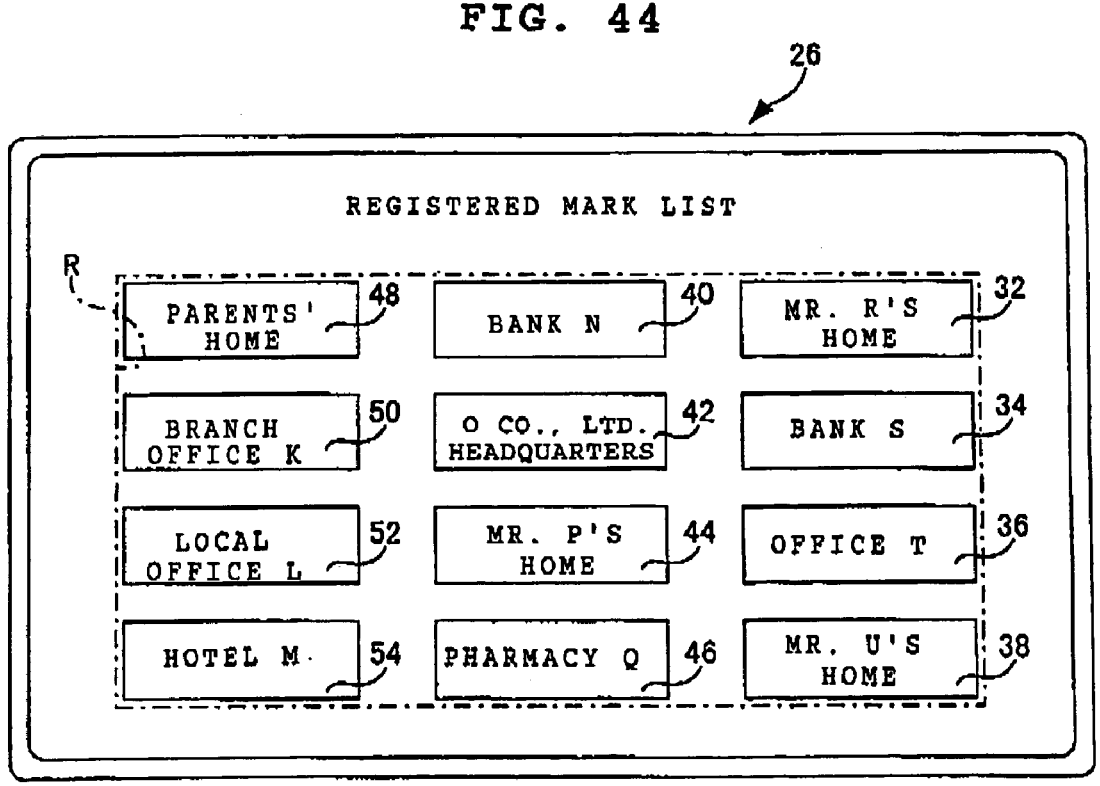
FIG. 44 is a screen example at the time of starting-up a registered mark search program.

Further, when a registered mark search program is executed, as shown in FIG. 44, the plurality of selection buttons 32-54 are displayed in a matrix form (in the present embodiment, in four lines and three columns) in the display region R of the monitor device 26, and registered mark data which the user or the like registered in advance (i.e., stored in the storage medium 24 by a predetermined registration operation) is expanded. Labels (names of points) of the registered mark data which can be displayed in a preset order and in the display region R (i.e., registered mark data within the display region R) are displayed within the respective selection buttons 32-54.

Figure 46:
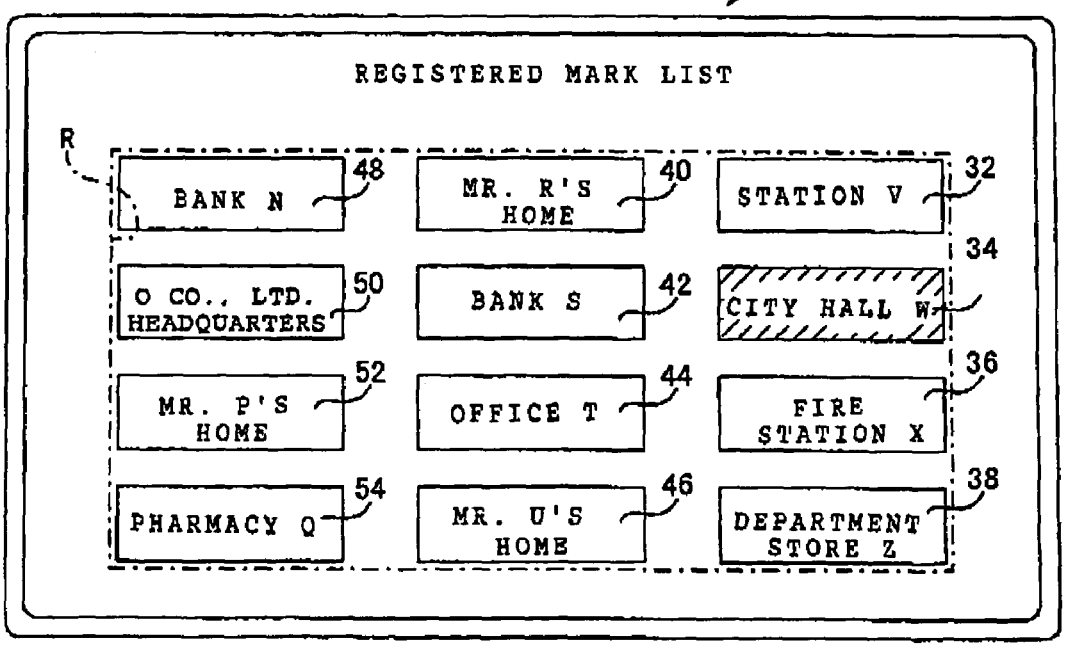
FIG. 46 is a screen example in a case in which usual scrolling has been carried out at the time of starting-up the registered mark search program.
Figure 47:
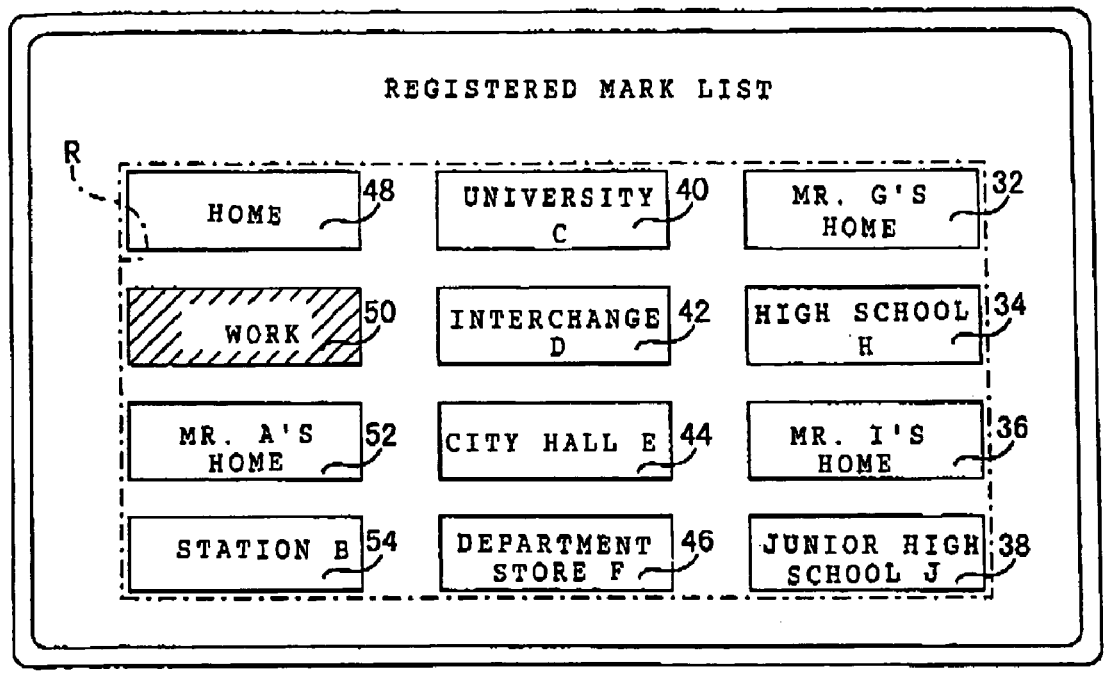
FIG. 47 is a screen example at the time of data movement (high speed scrolling) at the time of starting-up the registered mark search program.

Further, when the number of registered mark data is greater than the number of the selection buttons 32-54, i.e., when there exist registered mark data which cannot be label-displayed within the display region R, by switching screens by a predetermined operation which will be described later, the labels of other registered mark data can be displayed on the respective selection buttons 32-54 as shown in FIG. 46 and FIG. 47.

Figure 48:
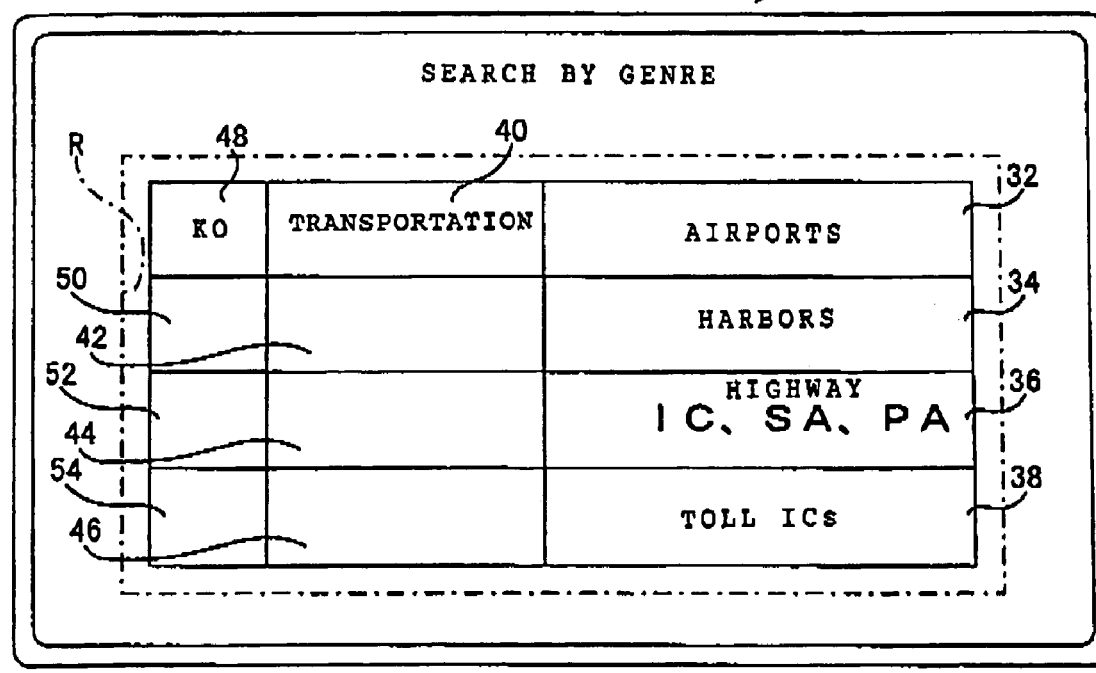
FIG. 48 is a screen example at the time of starting-up a search-by-genre program.

Moreover, when a search-for-target-place-by-genre program is executed, as shown in FIG. 48, the plurality of selection buttons 32-54 are displayed in a matrix form (in the present embodiment, four lines and three columns) in the display region R of the monitor device 26. Large classification data, intermediate classification data, and small classification data of the target places, which are stored in the storage medium 24 in advance, are expanded. The respective classification data which can be displayed in a preset order and in the display region R (i.e., respective classification data within the display region R) are displayed within the respective selection buttons 32-54.

Figure 51:
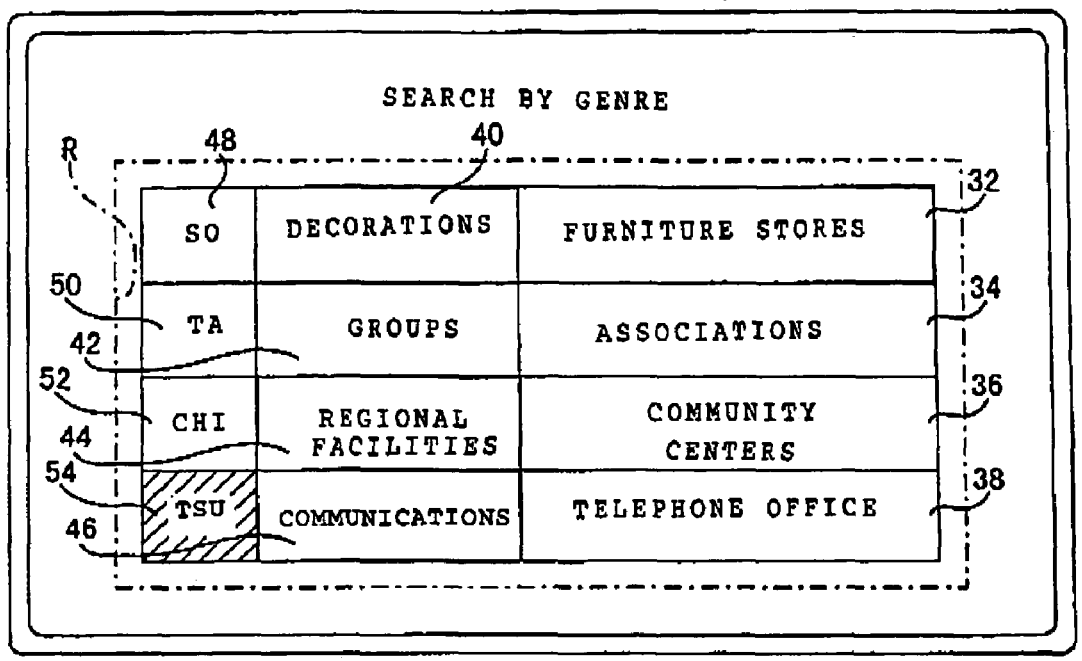
FIG. 51 is a screen example after the start of data movement (high speed scrolling) of the large classification data.
Figure 53:
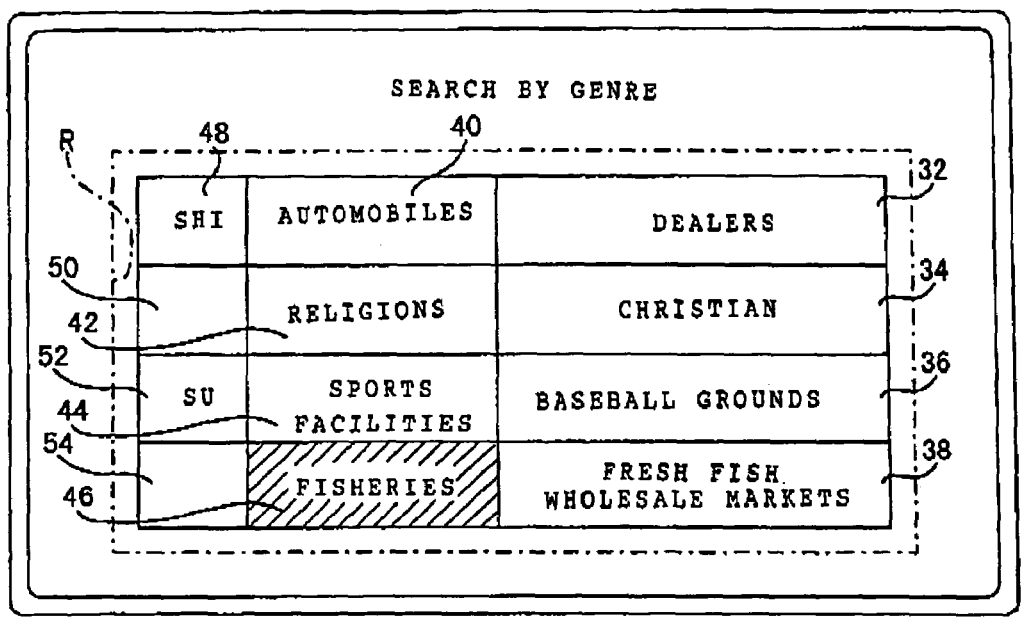
FIG. 53 is a screen example after the start of data movement (high speed scrolling) of the intermediate classification data.

Further, when the number of classification data is greater than the number of the selection buttons 32-54, i.e., when there exist classification data which cannot be displayed within the display region R, by switching screens by a predetermined operation which will be described later, the names of other registered places can be displayed at the respective selection buttons 32-54 as shown in FIG. 51, FIG. 53, and FIG. 55.

(Operation and Effects of the Present Embodiment at the Time of Starting-Up the Map Screen Display Program)

Next, the operation and effects relating to screen switching (i.e., usual scrolling as usual switching, high-speed scrolling as high-speed switching, and decelerated scrolling as changed-speed switching) in the present car navigation device 10 will be described on the basis of the flowcharts of FIG. 38 and FIG. 40, by using, as examples, a case in which a map screen display program is started-up, a case in which a registered mark search program is started-up and a case in which a place name search program is started-up.

Figure 38:
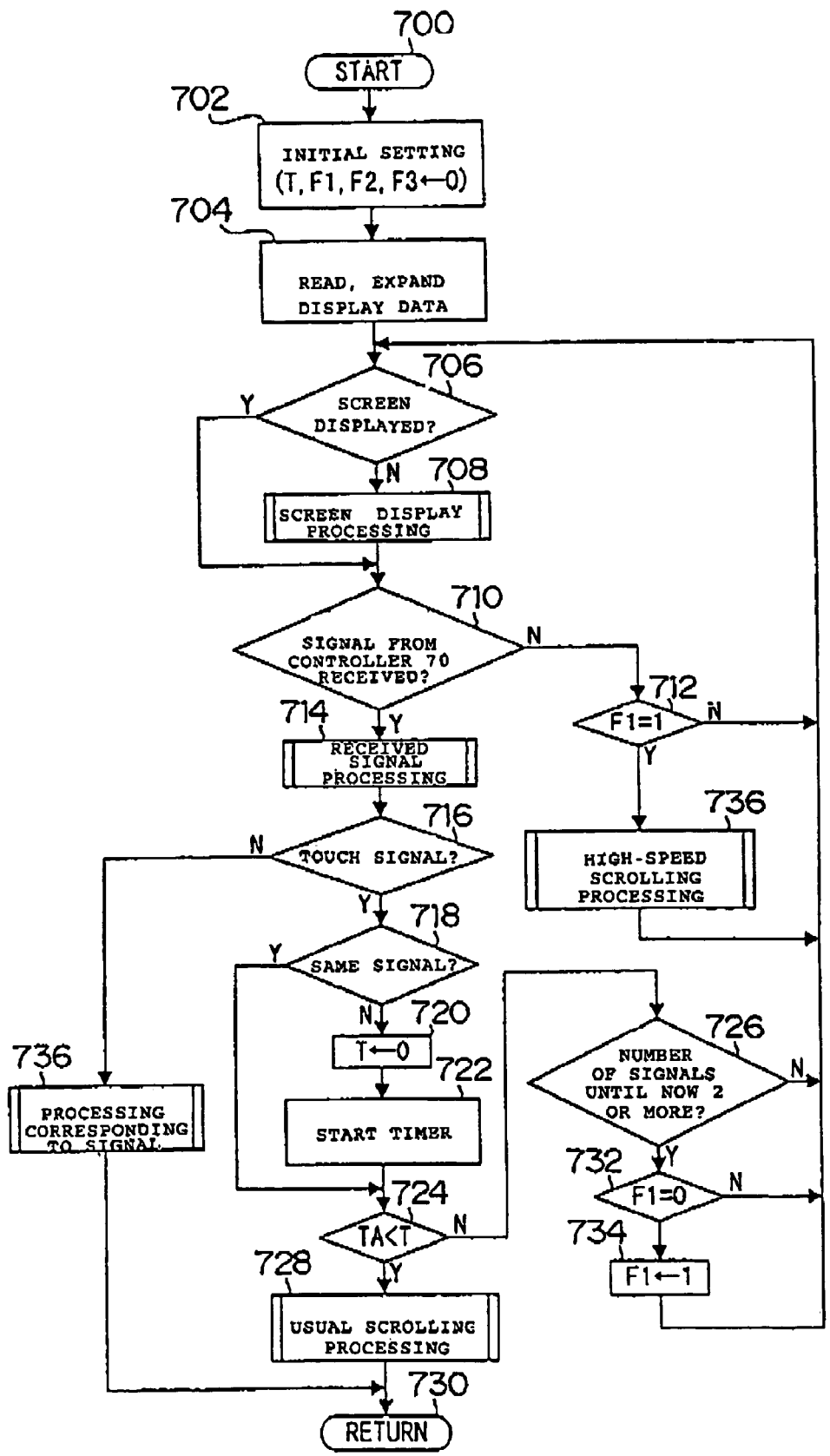
FIG. 38 is a flowchart showing the flow of control of a screen operating device for a vehicle relating to a sixth embodiment of the present invention.

First, as shown in FIG. 38, in step 700, when the control section 22 reads the map screen display program from the storage medium 24 and the map screen display program is started-up, in step 702, the flags F1, F2, F3 and the timer (the timer program) are reset. Next, in step 704, the map data, which is the display data at the time of starting-up the map screen display program, is read from the storage medium 24 and expanded.

Figure 41:
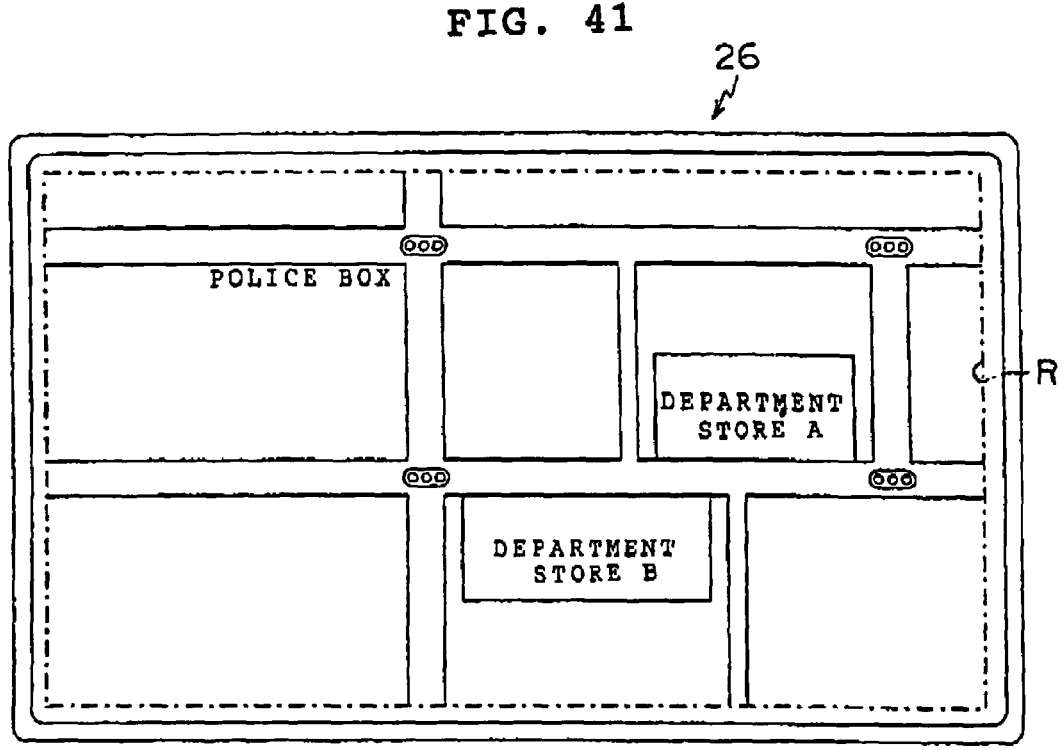
FIG. 41 is a screen example at the time of starting-up a map display program.

Thereafter, in step 706, it is judged whether or not a predetermined map data is displayed in the display region R of the screen of the monitor device 26. If the predetermined map data is not displayed, in step 708, screen display processing is carried out. Among the expanded map data, the map data corresponding to the display region R is displayed on the screen of the monitor device 26 as shown in FIG. 41, and the routine proceeds to step 710.

Note that, if it is judged in step 706 that the map data corresponding to the display region R is already displayed, the routine proceeds to step 710 as is without advancing to step 708.

Next, a judgement as to whether or not an electrical signal has been received from the infrared ray light-receiving portion 20 is carried out. Here, if a touch signal or a click signal has not been inputted to the control section 22, the routine proceeds to step 712, and it is judged whether or not 1 has been substituted in for the flag F1. Further, in this state, if it is immediately after the present map screen display program started from step 700, there is a state in which F1 is still reset, and thus, the routine returns to step 706 again.

In contrast, when the line terminal 124 and the line terminal 136 are made continuous by the finger of an operator touching the aforementioned touch portion 160, and the control section 22 receives the touch signal in this state from the infrared ray light-receiving portion 20, the routine proceeds from step 710 to step 714. In step 714, the electrical signal from the infrared ray light-receiving portion 20 is processed.

Next, in step 716, it is judged whether or not the electrical signal processed in step 714 is a touch signal. In this case, because the received signal is a touch signal, the routine proceeds from step 716 to step 718, and it is judged whether or not this touch signal is the same signal as the signal which was received immediately therebefore. If it is immediately after the present map screen display program started from step 700, there is no signal which was received therebefore. Thus, the routine proceeds to step 720, and the elapsed time T of the timer (timer program) is reset. In step 722, the timer (timer program) is started-up.

Next, in step 724, it is judged whether or not the elapsed time T has exceeded the set time TA which was set in advance. In this state, for example, if it is a case in which the control section 22 has not received the same signal from the infrared ray light-receiving portion 20 previously such as a case in which it is immediately after the present map screen display program started from step 700 or the like, the elapsed time T has not exceeded the set time TA at this point in time. Therefore, the routine proceeds to step 726.

In step 726, it is judged whether or not the number of signals of the touch signals received until then is 2 or more (the number of signals including the present signal is three or more). If it is the initial signal as described above, the routine returns to step 706.

When the operator continuously touches the same region of the sheet switch 110, e.g., the touch portion 160, the routine directly proceeds from step 718 to step 724. Namely, if the operator continuously touches the same region of the sheet switch 110, e.g., the touch portion 160, the routine continues circling through the processes described up until now. However, when, in the midst thereof, the elapsed time T exceeds the set time TA, the routine proceeds from step 724 to step 728, and in step 728, usual scrolling processing is carried out.

In this usual scrolling processing, the screen moves in a predetermined direction on the basis of the finger position of the operator on the sheet switch 110 (on the panel 84) (i.e., on the basis of the touch signal).

Namely, when the finger touches the touch portion 160 for example, because the touch portion 160 is positioned to the approximate right of the center of the panel 84, in step 728, the expanded map data is moved on the whole toward the left with respect to the display region R. In this way, the display moves from the map data positioned at the left end portion side of the display region R toward the outer left side of the display region R. Accompanying this, the map data, which until then was positioned at the outer right side of the display region R and was not displayed, is positioned within the display region R and is displayed on the screen of the monitor device 26.

In this way, by continuously touching the touch portion 160 with the finger, the display region R moves relatively toward the right. Accordingly, by continuously touching the panel 84 (the sheet switch 110) until the desired map data is positioned within the display region R, the desired map data can be displayed on the screen of the monitor device 26.

Note that, although it will not particularly be described by using the flowcharts, this usual scrolling processing is ended by the same touch signal ending, i.e., either the finger moving away from the sheet switch 110 or the finger moving on the sheet switch 110. When this usual scrolling processing ends, the routine proceeds to step 730 and returns to step 700.

On the other hand, for example, when, while the finger continues to touch the sheet switch 110, the finger is slid on the sheet switch 110 from the touch portion 160 to the touch portion 156 via the touch portion 158 before the elapsed time T has exceeded the set time TA (i.e., when the finger moves toward the left in FIG. 3), first, the line terminal 124 and the line terminal 134 become continuous when the finger passes on the touch portion 158.

In this way, a touch signal, which is different from the touch signal before then, is sent from the infrared ray light-receiving portion 20 to the control section 22. Accordingly, in this case, the routine proceeds from step 718 to step 720, and the elapsed time T of the timer is reset, and in step 722, the timer is started-up again. Moreover, if the elapsed time T has not exceeded the set time TA, the routine proceeds from step 724 to step 726. In this state, because there is one touch signal till now before the present signal (there are two including the present signal), the routine returns to step 706 as is.

Next, when, before the elapsed time T exceeds the set time TA, the finger moves from the touch portion 158 to the touch portion 156 and the line terminal 124 and the line terminal 132 become continuous, a touch signal, which is different than the touch signal before then, is sent from the infrared ray light-receiving portion 20 to the control section 22. Accordingly, in this case, the routine proceeds from step 718 to step 720, and the elapsed time T of the timer is reset, and in step 722, the timer is started-up again.

Moreover, if the elapsed time T has not exceeded the set time TA, the routine proceeds from step 724 to step 726. Here, if the finger slides from the touch portion 160 to the touch portion 156 via the touch portion 158 in an extremely short period of time, two touch signals which are the touch signal at the touch portion 160 and the touch signal at the touch portion 158 (i.e., three touch signals including the touch signal at the touch portion 156) are received before the present signal. Thus, the routine proceeds from step 724 to step 726, and thereafter, proceeds to step 732 and it is judged whether or not 1 has been substituted in for the flag F1. In this state, if the flag F1 is reset, the routine proceeds to step 734 where 1 is substituted in for the flag F1.

Next, after the finger has reached the touch portion 156, before the elapsed time T of the timer has exceeded the set time TA, when the finger moves apart from the sheet switch 110 for example, the routine proceeds from step 710 to step 712. However, in this state, because 1 has been substituted in for the flag F1, the routine proceeds to step 736 and high-speed scrolling processing is executed.

Figure 39:
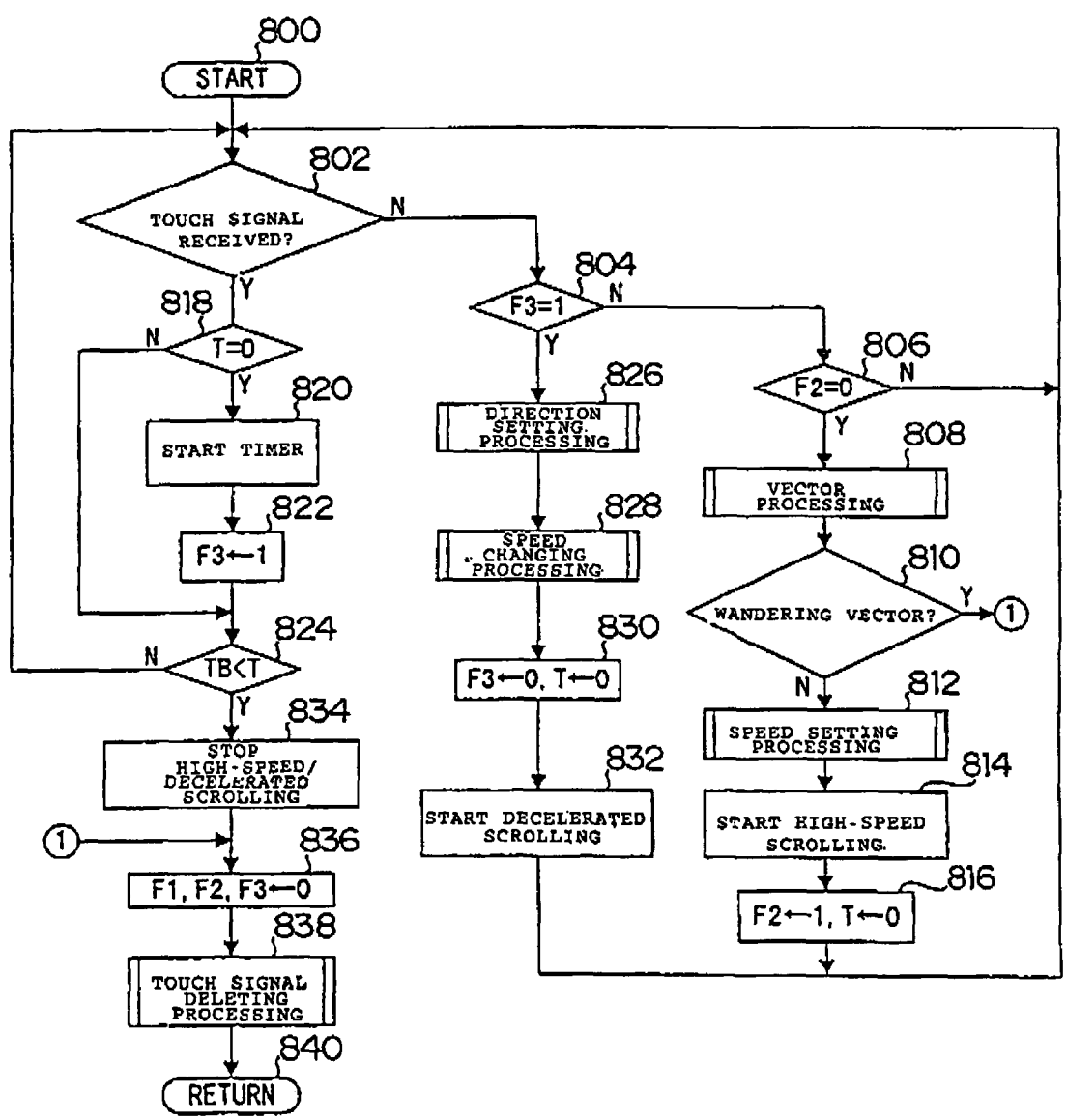
FIG. 39 is a flowchart at the time of data movement (high speed scrolling) processing.

As shown in the flowchart of FIG. 39, in step 800, when the high-speed scrolling processing is started, in step 802, it is judged whether or not the control section 22 has received a touch signal from the infrared ray light-receiving portion 20. However, as described above, immediately before the high-speed scrolling processing is carried out, the finger is moved apart from the sheet switch 110. Therefore, the control section 22 does not receive the touch signal from the infrared ray light-receiving portion 20, and the routine proceeds to step 804.

In step 804, it is judged whether or not 1 has been substituted in for the flag F3. Because 1 is not substituted in for the flag F3 immediately before the high-speed scrolling processing is started, the routine proceeds to step 806. In step 806, it is judged whether or not 1 has been substituted in for the flag F2. However, in the same way as the flag F3, 1 is not substituted in for the flag F2 immediately before the high-speed scrolling processing is started. Therefore, the routine proceeds to step 808.

In step 808, the direction of scrolling is calculated on the basis of the three or more touch signals which have been received up until the high-speed scrolling processing started. As the method of calculating the scrolling direction at this time, for example, there is a method in which a vector starting end position is determined on the basis of the final touch signal when the line terminal 124 and the line terminal 132 became continuous, and a vector intermediate position is determined on the basis of the next touch signal when the line terminal 124 and the line terminal 134 became continuous, and a vector final end position is determined on the basis of the initial touch signal when the line terminal 124 and the line terminal 136 became continuous; and a method in which a vector starting end position is determined on the basis of the final touch signal when the line terminal 124 and the line terminal 132 became continuous, and a vector final end position is determined on the basis of the initial touch signal when the line terminal 124 and the line terminal 136 became continuous; and the like. The former determines the intermediate position, whereas the latter does not determine the intermediate position. Therefore, at this point in time, the direction of the vector determined by the former method and the direction of the vector determined by the latter method are not always the same. However, in either case, the direction of the vector determined at this point in time corresponds to a direction which is approximately opposite the sliding direction of the finger on the sheet switch 110.

Next, in step 810, it is judged whether or not the vector determined in step 808 is a wandering vector. A wandering vector is, for example, a case in which a vector passing through an intermediate point which is based on, for example, the next (second) touch signal when the line terminal 124 and the line terminal 134 became continuous, greatly differs with respect to a straight line connecting the vector starting end position and the vector final end position (namely, a case in which the intermediate point is greatly separated from a straight line connecting the vector starting end position and the vector final end position). For example, in cases in which the operator is confused as to which operation to carry out and the finger is moving without having any particular directionality, the aforementioned vector may be a wandering vector.

In step 810, it is judged whether or not the vector computed in step 808 is a wandering vector, i.e., in a case in which the vector is computed in step 808 so as to include the intermediate position, whether or not the computed vector differs greatly from a straight line connecting the vector starting end position and the vector final end position, or, in a case in which only the starting end position and the final end position of the vector are computed in step 808, whether or not an intermediate point which is based on the next (second) touch signal when the line terminal 124 and the line terminal 134 became continuous is greatly separated from the vector computed in step 808.

If it is judged in step 810 that the vector is not a wandering vector, the routine proceeds to step 812. In step 812, the speed of scrolling is set on the basis of the respective elapsed times T in the states in which the finger was positioned at the respective touch portions 160, 158, 156. For example, if the sum of the respective elapsed times T is small, the scrolling speed is set to be relatively fast, and if the sum of the respective elapsed times T is large, the scrolling speed is set to be relatively slow.

Figure 42:
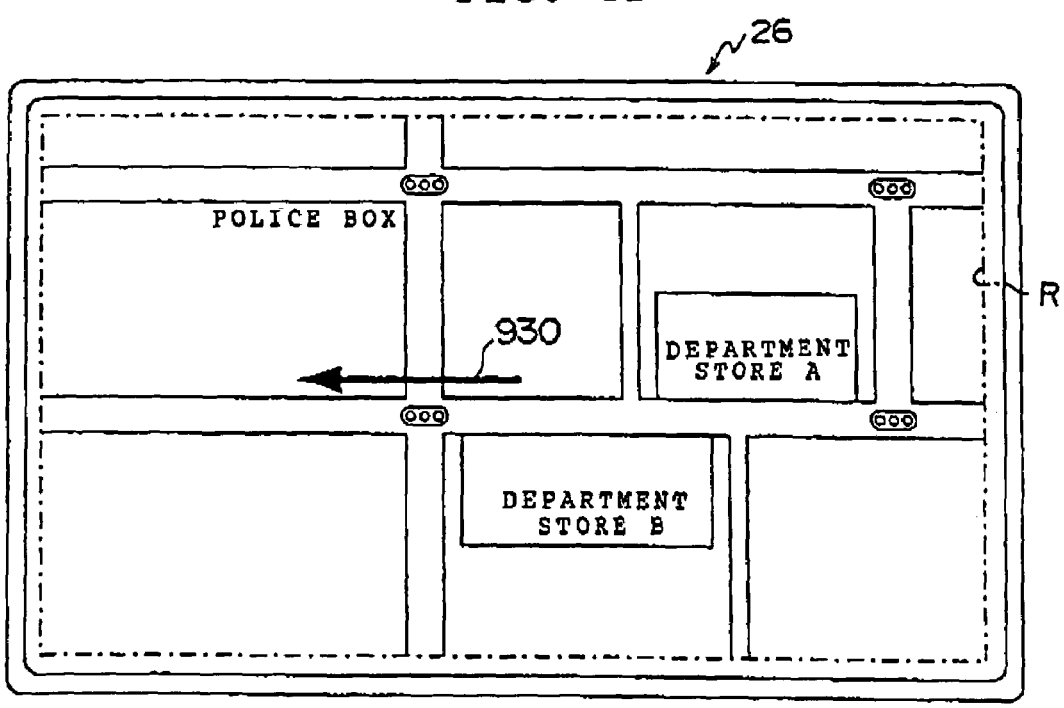
FIG. 42 is a screen example at the time of data movement (high speed scrolling) at the time of starting-up the map display program.

Next, in step 814, the map data is high-speed moved with respect to the display region R at the speed set in step 812 in the direction determined in step 808 (i.e., is moved sufficiently quickly as compared with the above-described usual scrolling), and an arrow mark 930, in the direction opposite to the direction determined in step 808 and of a length corresponding to the speed set in step 812, is displayed on the screen of the monitor device 26 (see FIG. 42). Namely, as described above, the direction of the vector computed in step 808 corresponds, in a sense, to the direction opposite to the sliding direction of the finger on the sheet switch 100. Thus, by high-speed moving the map data in this direction with respect to the display region R, it appears as if the display region R is high-speed moving in the sliding direction of the finger on the sheet switch 110.

In this way, in the present embodiment, by sliding the finger on the sheet switch 110 (i.e., the panel 84), the display region R can apparently be moved at high speed in the direction corresponding to the sliding direction and at a speed which corresponds to the sliding speed and is sufficiently faster than the usual scrolling. In this way, the operation sensation and the direction and speed of the scrolling can be made to conform.

Next, in step 816, 1 is substituted in for the flag F2, and 0 is substituted in for the elapsed time T of the timer (i.e., reset), and the routine returns to step 802. In this state, if a touch signal is not received in particular (strictly speaking, if a touch signal is not received after the aforementioned final touch signal), the routine proceeds to step 804, and then proceeds to step 806. Here, in this state, because 1 is substituted in for the flag F2 in step 816, the routine returns to step 802 without advancing to step 808.

Note that, in this state, the high-speed scrolling is continued. Namely, in this state, the high-speed scrolling is continued without the operator carrying out a special operation or continuing some type of operation. Thus, while the desired map (i.e., the map for which display is desired) approaches or up to the time when it is displayed, the operator is free from operation. Accordingly, in this state, the operability improves, such as it is possible for operations or the like of other than the present car navigation device 10 to be carried out by the operator or the like.

Further, as described above, as the condition for carrying out high-speed scrolling, there is separation of the finger from the sheet switch 110 after the set time TA and the sliding have ended. When this set time TA is exceeded and the control section 22 receives the same touch signal, high-speed scrolling is not carried out.

Accordingly, in order to carry out high-speed scrolling, the finger must intentionally quickly be slid and the finger must be moved away from the sheet switch 110. In this way, unintentional (inadvertent) high-speed scrolling of map data can be prevented or suppressed.

Next, while the processings are carried out in the loop which circles steps 802, 804, 806, 802, when, for example, the finger of the operator touches the touch portion 154 of the sheet switch 110 and the line terminal 122 and the line terminal 136 are thereby made continuous and the touch signal accompanying this is sent from the infrared ray light-receiving portion 20 to the control section 22, the routine proceeds from step 802 to step 818, and it is judged whether or not the elapsed time T of the timer (the timer program) is 0.

Here, in this state, because the elapsed time T is reset in step 816, the routine proceeds to step 820 and the timer (timer program) is started-up. Next, after 1 is substituted in for the flag F3 in step 822, the routine proceeds to step 824. In step 824, it is judged whether or not the elapsed time T has exceeded a set time TB which is set in advance. If the elapsed time T has not exceeded the set time TB, the routine returns to step 802.

For example, when the receipt of the touch signal is cancelled before the set time TB has been exceeded such as in a case in which the finger is instantaneously moved away from the sheet switch 110 after the touch portion 154 has been touched or the like, the routine proceeds from step 802 to step 804. Here, as described above, because 1 is substituted in for the flag F3 at step 822, the routine proceeds from step 804 to step 826, and direction setting processing is carried out.

This direction setting processing in step 826 is different from the vector processing of step 808. For example, the position of the touch portion 154 is computed from the touch signal which is based on the continuity signal of the line terminal 122 and the line terminal 136, and further, the direction corresponding to the touch portion 154 at the display region R from the center of the display region R is computed.

Figure 43:
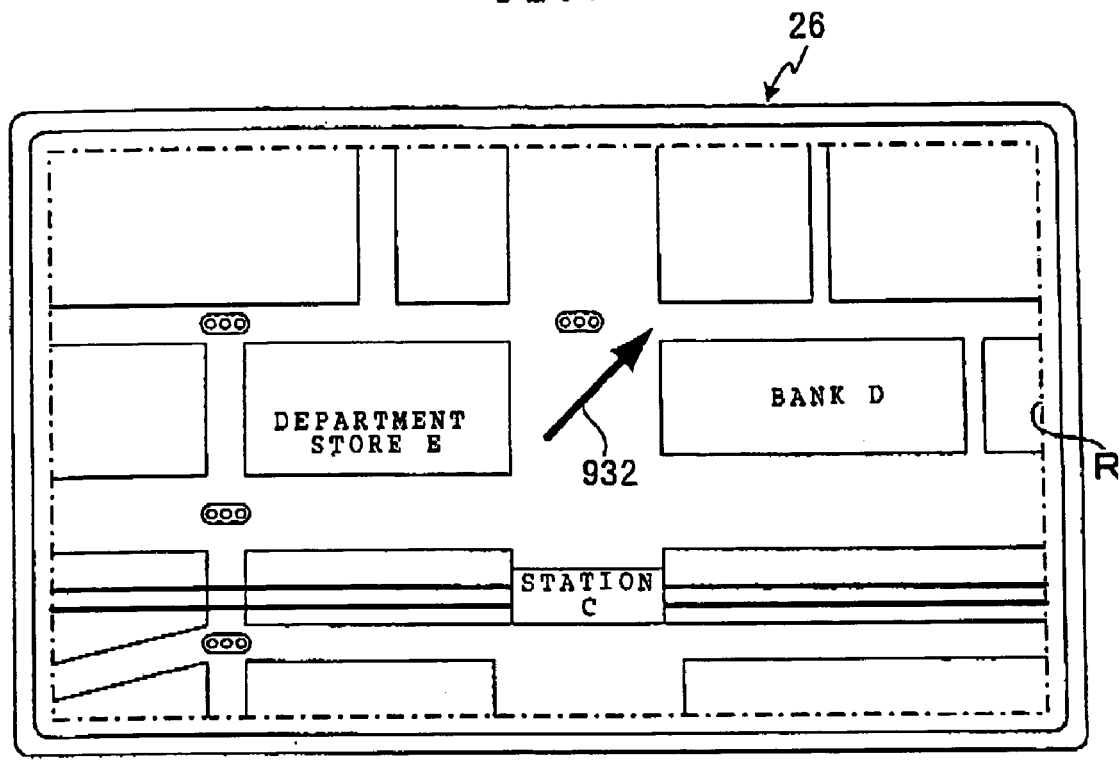
FIG. 43 is a screen example at the time of decelerated scrolling at the time of starting-up the map display program.

Next, in step 828, the scrolling speed is set to a speed which is a preset proportion (e.g., one level) slower than the scrolling speed up until now. Further, after 0 has been substituted in for each of the flag F3 and the elapsed time T (i.e., reset) in step 830, in step 832, the map data is moved with respect to the display region R at the speed set in step 828 in the direction opposite the direction computed in step 826. Moreover, an arrow mark 932, of the direction computed in step 826 and of a length corresponding to the speed which has been decelerated by one level, is displayed on the screen of the monitor device 26 (see FIG. 43), and the routine returns to step 802.

In this state, after the routine has returned to step 802, the loop of steps 802, 804, 806, 802 is circled until the next touch signal is received. In this state, the above-described decelerated scrolling is continuous.

Thereafter, each time a touch signal, which has not exceeded the set time TB, is received again, scrolling is carried out decelerated by one more level in the direction based on that touch signal. In this way, by moving the map data with respect to the display region R by the initial high-speed scrolling up to a rough position, and thereafter, repeating the decelerated scrolling, for example, the target map data can be displayed quickly and reliably at the substantial center of the display region R.

On the other hand, when the same touch signal is received continuously until the set time TB is exceeded, the routine proceeds from step 824 to step 834. In step 834, the high-speed scrolling and decelerated scrolling up until then are stopped. Then, in step 836, all of the flags F1-F3 are reset.

Next, in step 838, the touch signals received until then are deleted from the memory or the like which stored them, except for the touch signal which was received last (in other words, by going through this step 814, the touch signal which was received last becomes the touch signal which was received first).

Moreover, after going through this step 838, the routine returns to step 706 of FIG. 38 via step 840. Note that even when it is judged in step 810 that the vector computed in step 808 is a wandering vector, the routine proceeds to step 836, and returns to step 706 of FIG. 38 via steps 838, 840.

Next, after returning to step 706, if a click signal is received for example, the routine proceeds from step 716 to step 738, and various types of processings based on the touch signal received immediately therebefore and the received click signal are carried out.

As described above, at the time of starting-up the map screen program in the present embodiment, the desired map data can reliably be displayed in the display region R at a speed corresponding to the intent of the user, by using the high-speed scrolling, the decelerated scrolling, and the usual scrolling.

(Operation and Effects of the Present Embodiment at the Time of Starting-Up the Registered Mark Search Program)

Next, the operation and effects relating to screen switching (i.e., usual scrolling as usual switching, high-speed scrolling as high-speed switching, and decelerated scrolling as changed-speed switching) at the time of starting-up the registered mark search program, will be described.

Note that the time of starting-up the registered mark search program and the time of starting-up the place name search program which will be described next will be described on the basis of the flowchart of FIG. 40 instead of the flowchart of FIG. 38. However, they are basically the same as the above-described time of starting-up the map screen program, and the basic operation and effects are also the same. Therefore, hereinafter, description centered around the differences from the time of starting-up the map screen program will be carried out, and detailed description relating to basically the same processings will be omitted.

Figure 40:
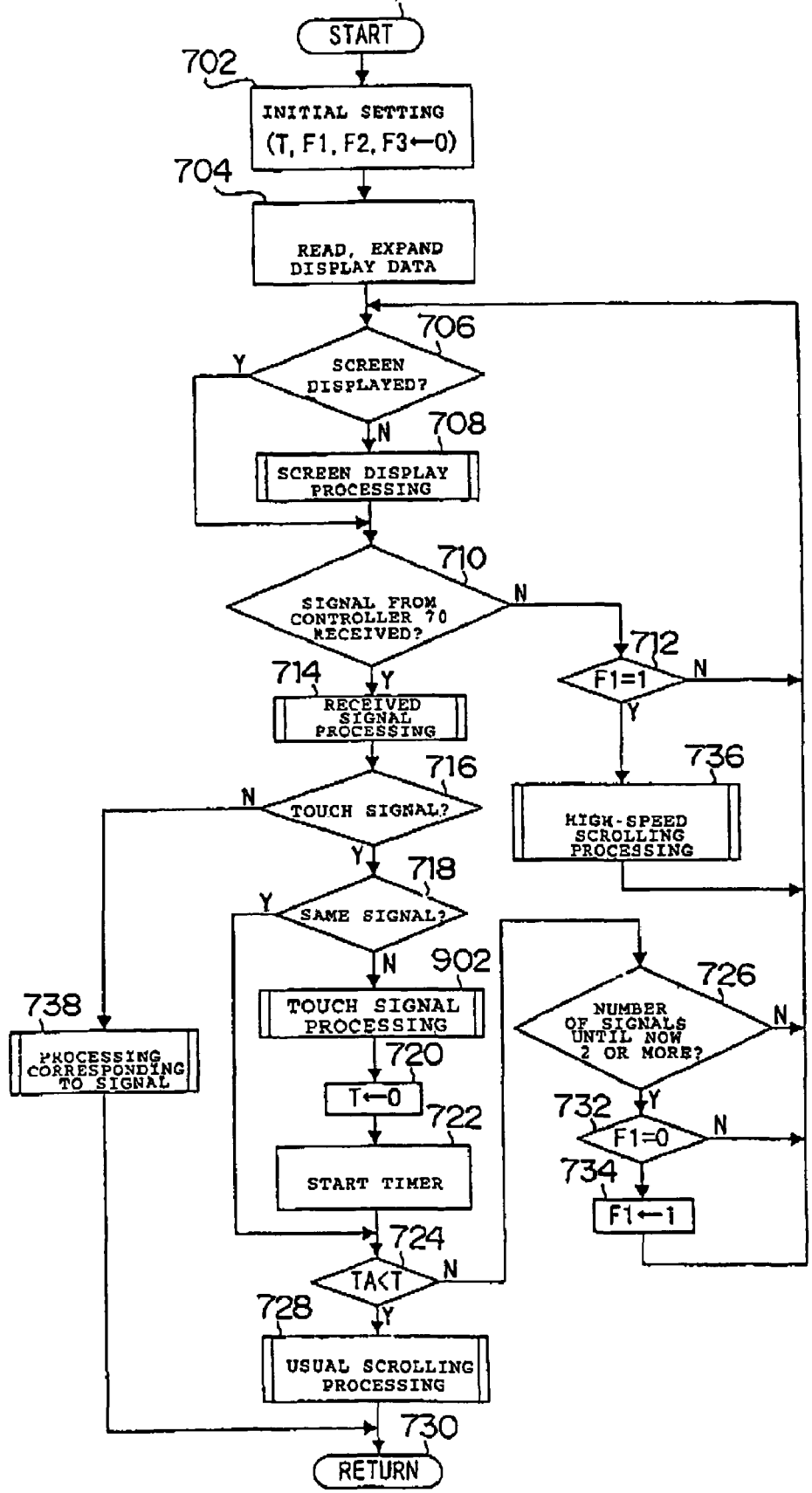
FIG. 40 is a flowchart showing a flow modified example of control of the screen operating device for a vehicle relating to the sixth embodiment of the present invention.

At the time of starting-up the registered mark search program, first, as shown in FIG. 40, when the registered mark search program is started-up in step 700, the routine goes through step 702, and in step 704, the data of the selection buttons 32-54 (see FIG. 44) is read from the storage medium 24. Further, the registered mark data, which is the display data at the time of starting-up the registered mark search program, is read and expanded into matrix form. However, in the present embodiment, although the registered mark data are expanded into matrix form, the number of lines of the expanded registered mark data are equal to the number of lines (i.e., four lines) of the selection buttons 32-54 shown in FIG. 44, and the number of columns corresponds to the number obtained by dividing the number of data of the registered marks by the number of lines.

Thereafter, in step 706, it is judged whether or not predetermined registered mark data are displayed in the display region R of the screen of the monitor device 26. If the predetermined registered mark data are not displayed, in step 708, screen display processing is carried out. Among the expanded registered mark data, the labels of the registered mark data corresponding to the display region R are displayed on the screen of the monitor device 26 as shown in FIG. 44, and the routine proceeds to step 710.

Note that, hereinafter, only with regard to the explanation of the time of starting-up the registered mark search program, the registered mark data of the number of lines and number of columns which can be displayed on the screen of the monitor device 26 (i.e., which can be moved to the display region R) (namely, in the present embodiment, the registered mark data of four lines and three columns) is set as one unit, and this unit is called a "page" for convenience. Namely, registered mark data of one page means registered mark data of four lines and three columns which are adjacent to one another.

For example, when the line terminal 124 and the line terminal 136 become continuous due to the finger of the operator touching the touch portion 160, and the control section 22 receives the touch signal in this state from the infrared ray light-receiving portion 20, the routine proceeds from step 710 via steps 714, 716 to step 718. If the same touch signal is not continuously received up until then, in step 902, touch signal processing is carried out.

Figure 45:
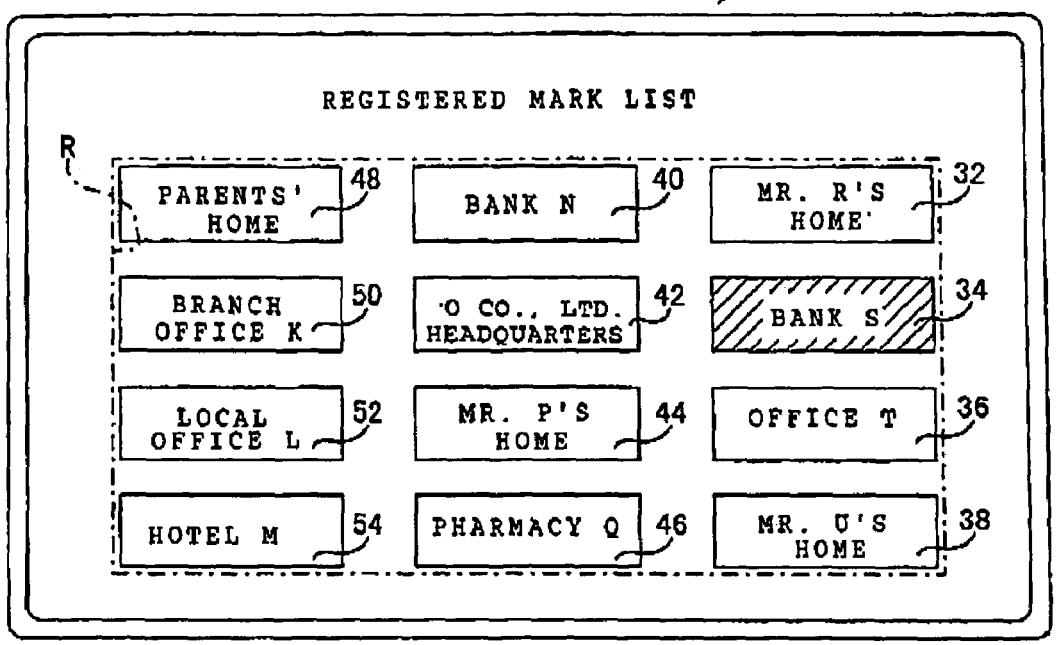
FIG. 45 is a screen example corresponding to FIG. 12, and showing a state in which reversing processing of a selection button has been carried out.

As shown in FIG. 44, when the registered mark search program in the present embodiment is started-up, the selection buttons 32-54 displayed on the monitor device 26 are made to be in a matrix form on the whole. The number of lines thereof is equal to the number of line terminals 122-128, and the number of columns is equal to the number of line terminals 132-136. Namely, the points of intersection of the line terminals 122-136 (in other words, the touch portions 150-172) correspond to the selection buttons 32-54. In step 902, the selection button 34 corresponding to the received touch signal (i.e., corresponding to the point of intersection of the line terminal 124 and the line terminal 136 in this case), and the label of the registered mark data displayed within this selection button 34, are reverse-displayed (see FIG. 45).

If the movable portion 100 of the push switch 96 is pressed via the sheet switch 110 and the panel 84, and the fixed contact of the main body 98 and the movable contact of the movable portion 100 become continuous, and the infrared ray light-receiving portion 20 receives an infrared ray signal L emitted from the infrared ray light-emitting element 102 on the basis of the continuity signal at this time, a click signal is sent from the infrared ray light-receiving portion 20 to the control section 22. In such a case, the routine proceeds from step 716 of FIG. 40 to step 738, and, for example, the control section 22 makes the map data of this touch portion be displayed on the monitor device 26, centered around the point corresponding to the registered mark displayed on the selection button 34 corresponding to the touch signal received immediately before receipt of the click signal (refer to FIG. 41 for one aspect of a display example).

On the other hand, when the set time TA is exceeded and the finger does not touch the touch portion 160, the routine proceeds from step 724 of FIG. 40 to step 728, and the usual scrolling processing at the time of starting-up the registered mark search program is carried out.

In this usual scrolling processing, the screen moves in a predetermined direction on the basis of the finger position of the operator on the sheet switch 110 (on the panel 84) (i.e., on the basis of the touch signal).

Namely, when the finger touches the touch portion 160 for example, because the touch portion 160 is positioned to the approximate right of the center of the panel 84, in step 728, the expanded registered mark data is moved on the whole by one column to the left with respect to the display region R. In this way, the registered mark data which were label-displayed on the selection buttons 48-54 (i.e., positioned at the left end side of the display region R) move toward the outer left side of the display region R. Similarly, the registered mark data which were label-displayed on the selection buttons 32-46 also move and are label-displayed within the selection buttons 40-54. Moreover, one column of the registered mark data, which until then were positioned at the outer right side of the display region R and were not label-displayed, are positioned within the display region R and label-displayed on the selection buttons 32-38 (see FIG. 46).

In this way, by continuously touching the right side of the panel 84 (the sheet switch 110) with the finger, the display region R moves relatively toward the right. Accordingly, by continuously touching the panel 84 (the sheet switch 110) until the desired registered mark data is positioned within the display region R, the desired registered mark data can be displayed on the screen of the monitor device 26.

Note that, as described above, in the present embodiment, the number of lines of the expanded registered mark data is the same as the number of lines of the selection buttons 32-54. Thus, the registered mark data which could not completely be displayed in the display region R exist at the outer side, in the direction (strictly speaking, the direction along the direction corresponding to the column direction of the selection buttons 32-54) along the column direction (in the present embodiment, the up-down direction in FIGS. 44-14) of the selection buttons 32-54, with respect to the display region R. However, registered mark data does not exist at the outer side, in the direction along the column direction of the selection buttons 32-54, with respect to the display region R.

Thus, at the time of starting-up the present registered mark search program, processing for moving the registered mark data in the direction along the column direction of the selection buttons 32-54 with respect to the display region R is not carried out. Further, although it will not particularly be described by using the flowcharts, this usual scrolling processing is ended by the same touch signal ending, i.e., either the finger moving away from the sheet switch 110, or the finger moving on the sheet switch 110, when this usual scrolling processing ends, the routine proceeds to step 730 and returns to step 700.

In contrast, when the finger slides from the touch portion 160 to the touch portion 158 before the set time TA is exceeded, and thereafter the finger slides from the touch portion 158 to the touch portion 156 before the set time TA is exceeded, and further, the finger moves away from the sheet switch 110 before the set time TA is exceeded, in the same way as at the above-described time of starting-up the map screen display program, the routine goes through steps 710, 712 of FIG. 40 and proceeds to step 736, and high-speed scrolling processing is carried out.

At the time of starting-up the registered mark search program as well, the processings of steps 800-840 are carried out as shown in FIG. 39 in the same way as at the above-described time of starting-up the map screen display program. However, at the above-described time of starting-up the map screen display program, the speed setting processing of step 812 was the setting of the moving speed of the map data. However, at the time of starting-up the present registered mark search program, the speed setting processing of step 812 means the display time of the registered mark data within the display region R. Further, in the same way as at the time of usual scrolling, in the high-speed scrolling processing as well, at the time of starting-up the present registered mark search program, processing for moving the registered mark data in the direction along the column direction (in the present embodiment, the up-down direction of FIGS. 44-14) of the selection buttons 32-54 with respect to the display region R is not carried out.

When high-speed scrolling is started in step 814, all of the registered mark data (i.e. the registered mark data label-displayed within the selection buttons 32-54), which are label-displayed in the display region R are moved at one time, with respect to the display region R, toward the outer side in the direction of the vector calculated in step 808, i.e., the direction corresponding to the direction of the vector whose starting end position is the touch portion 156 on the sheet switch 110 and whose final end position is the touch portion 160.

Moreover, one page of the registered mark data, which is adjacent at the outer side of the display region R in the direction opposite to the direction of the vector computed in step 808, is moved at one time into the display region R and is label-displayed within the corresponding selection buttons 32-54 (see FIG. 47).

Next, after the labels of the registered mark data are displayed within the display region R (i.e., within the selection buttons 32-54) for the time which was set in step 812, all of the registered mark data label-displayed in the display region R in this state are moved at one time out of the display region R in the direction of the same vector as described above. Moreover, in this state, one page of the registered mark data, which is adjacent at the outer side of the display region R in the direction opposite the direction of the vector computed in step 808, is moved at one time into the display region R and is label-displayed within the corresponding selection buttons 32-54.

After the above-described start of the high-speed scrolling, the loop of steps 802, 804, 806, 802 in FIG. 39 is circled, and high-speed scrolling (i.e., movement of the registered mark data) is repeatedly continued.

Next, in this state, for example, when the finger of the operator touches the touch portion 156 within a time shorter than the set time TB on the sheet switch 110 and the touch signal accompanying this is sent from the infrared ray light-receiving portion 20 to the control section 22, direction setting processing is carried out in step 826. Next, in step 828, speed changing processing is carried out, and the display time within the display region R is set to be one level slower. After passing through step 830, when decelerated scrolling is started in step 832, all of the registered mark data are moved at one time from the substantial center of the sheet switch 110 in the direction opposite the direction toward the touch portion 156, and the one page of registered mark data, which is adjacent at the outer side of the display region R in the direction from the substantial center of the sheet switch 110 toward the touch portion 156, is moved at one time into the display region R.

After the above-described start of the decelerated scrolling, the loop of steps 802, 804, 806, 802 in FIG. 39 is circled, and during that time, the registered mark data which has moved into the display region R is displayed within the display region R for the time set in step 826, i.e., a time which is one level slower than the display time therebefore, and thereafter, is moved.

In this way, at the time of starting-up the present registered mark search program, even if there is a case such as the desired registered mark data (i.e., the registered mark data for which display is desired) is far from the registered mark displayed in the display region R, by carrying out the above-described high-speed scrolling, the desired registered mark data can be displayed faster than when the usual scrolling is carried out.

Furthermore, in a case in which the desired registered mark data is approaching after the start of high-speed scrolling, or in a case in which the desired registered mark data was displayed in the display region R but the stopping of the movement of the registered mark data was not in time, or the like, the desired registered mark data can calmly and reliably be displayed in the display region R by carrying out decelerated scrolling.

Further, by carrying out the high-speed scrolling and the decelerated scrolling as described above, it suffices to not separately display a high-speed scrolling mode button or a decelerated scrolling mode button within the display region R. Thus, effective, practical use of the display region R, such as increasing the size or increasing the numbers of the selection buttons 32-54 or the like, is possible.

Note that, as described above, the present embodiment was a structure in which the moving direction (i.e., the scrolling direction) of the registered mark data at the time of starting-up the registered mark search program is limited to only the line direction of the selection buttons 32-54 (in the present embodiment, the left-right direction of FIGS. 44-14). However, it goes without saying that, depending on the way of lining up the expanded registered mark data, a case in which the movement direction of the registered mark data is not the line direction of the selection buttons 32-54 suffices.

Namely, in a case in which the registered mark data are lined up in an aspect in which the number of columns of the registered mark data is equal to the number of columns of the selection buttons 32-54 and which has a number of lines which is a number obtained by dividing the number of registered mark data by the number of columns, the moving direction of the registered mark data is of course the direction corresponding to the column direction (in the present embodiment, the up-down direction in FIGS. 44-14).

Further, when the registered mark data at the time of expansion are lined up in line directions and column directions of numbers greater than the number of lines and the number of columns of the selection buttons 32-54, there is the need to move the registered mark data in both the line direction and the column direction. Moreover, the convenience can be increased even more by making the registered mark data movable not only in the line direction and the column direction, but also in a direction which is inclined in the column direction with respect to the line direction.

Further, the present embodiment was structured such that, when the registered mark search program is started-up, both the high-speed scrolling and the decelerated scrolling move one page of registered mark data, and the display times are made to be different in the high-speed scrolling and the decelerated scrolling. However, the high-speed scrolling and the decelerated scrolling are not limited to such processings.

For example, a structure is possible in which, in the high-speed scrolling, several pages of registered mark data are moved at one time, and in the decelerated scrolling, the number of pages of registered mark data which is moved at one time is reduced. Moreover, the high-speed scrolling and the decelerated scrolling also may be structured such that only one column of registered mark data is moved in the same way as the usual scrolling, but the display times of the high-speed scrolling, the decelerated scrolling, and the usual scrolling are changed.

To elucidate further, a structure may be used in which processings which are similar to those at the time of starting-up the registered mark search program are carried out also at the time of starting-up the above-described map screen display program.

(Operation and Effects of the Present Embodiment at the Time of Starting-Up the Search-by-Genre Program)

Next, the operation and effects relating to screen switching (i.e., usual scrolling as the usual switching, high-speed scrolling as high-speed switching, and decelerated scrolling as changed-speed switching) at the time of starting-up the search-by-genre program will be described.

Note that the operation and effects at the time of starting-up the search-by-genre program are basically the same as at the above-described time of starting-up the map screen program. Thus, hereinafter, explanation will center around the differences from the time of starting-up the registered mark search program and the characteristic portions at the time of starting-up the search-by-genre program, and detailed description relating to processings which are basically the same will be omitted.

At the time of starting-up the search-by-genre program as well, in step 704, the images or other data including the selection buttons 32-54 are read from the storage medium 24, and classification data, which is display data at the time of starting-up the search-by-genre program, is read and expanded hierarchically.

The classification data in the present embodiment is divided into large classification data, intermediate classification data, and small classification data. All of the intermediate classification data belong to one or a plurality of the plural large classification data, and all of the small classification data belong to one or a plurality of the plural intermediate classification data. Namely, there is a structure in which the intermediate classification data and the small classification data are lined up hierarchically with the large classification data being at the apex.

Further, in step 706, it is judged whether or not predetermined classification data are displayed in the display region R of the screen of the monitor device 26. If predetermined classification data are not displayed, in step 708, screen display processing is carried out.

As shown in FIG. 48, in the screen display processing at the time of starting-up the search-by-genre program, the selection buttons 32-54 are displayed within the display region R in a matrix form (in the present embodiment, four lines and three columns). Further, in this state, labels of the large classification data positioned within the display region R, among the large classification data which are lined up in one column, are displayed on the respective selection buttons 48-54 which are in the lefthand-most column. Moreover, in this state, the labels of the intermediate classification data belonging to the displayed large classification data are displayed on the selection buttons 40-46 in order from the first. The labels of the small classification data belonging to the displayed intermediate classification data are displayed on the selection buttons 32-38 in order from the first.

However, when, among the small classification data displayed on the selection buttons 32-38, two or more thereof belong to the same intermediate classification data, only the label of the intermediate classification data at the left side (i.e., the same line) of the label of the small classification data positioned at the top, among the selection buttons 32-38 which display the labels of the small classification data belonging to the same intermediate classification data, is displayed on the selection buttons 40-46. The selection buttons 40-46 at the left side of the labels of the small classification data positioned below, among the labels of the small classification data belonging to the same intermediate classification, are left blank.

Similarly, when, among the intermediate classification data displayed on the selection buttons 40-46, two or more thereof belong to the same large classification data, only the label of the large classification data at the left side (i.e., the same line) of the label of the intermediate classification data positioned at the top, among the selection buttons 40-46 which display the labels of the intermediate classification data belonging to the same large classification data, is displayed on the selection buttons 48-54. The selection buttons 48-54 at the left side of the labels of the intermediate classification data positioned below, among the labels of the intermediate classification data belonging to the same intermediate classification, are left blank.

Figure 49:
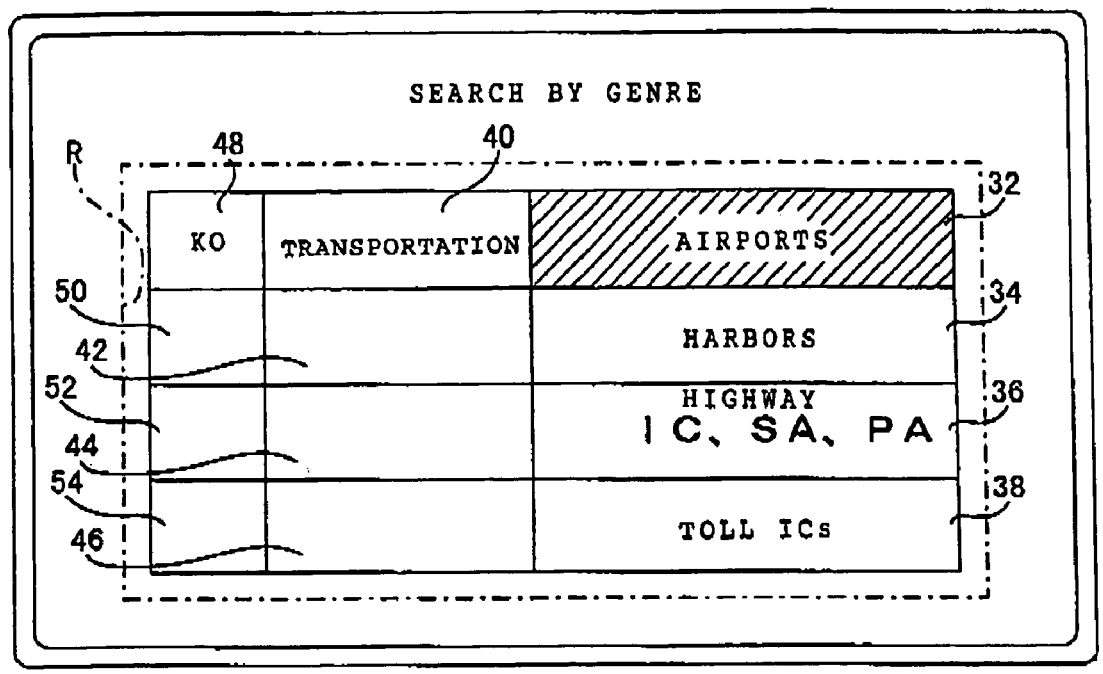
FIG. 49 is a screen example corresponding to FIG. 16, and showing a state in which reversing processing of a selection button has been carried out.

In this way, in the state in which labels of the respective classification data are displayed, when the line terminal 124 and the line terminal 136 become continuous due to the finger of the operator touching the touch portion 160, and the control section 22 receives the touch signal in this state from the infrared ray light-receiving portion 20, the routine proceeds from step 710 via steps 714, 716 to step 718. If the same touch signal has not been continuously received up until then, in step 902, touch signal processing is carried out. In the same way as at the time of starting-up the registered mark search program, the corresponding selection button 34 and the label of the classification data (small classification data) displayed within the selection button 34 are reverse-displayed (see FIG. 49).

If, in this state, the movable portion 100 of the push switch 96 is pressed via the sheet switch 110 and the panel 84, and the fixed contact of the main body 98 and the movable contact of the movable portion 100 become continuous, and further, the infrared ray light-receiving portion 20 receives the infrared ray signal L emitted from the infrared ray light-emitting element 102 on the basis of the continuity signal at this time, a click signal is sent from the infrared ray light-receiving portion 20 to the control section 22.

When the control section 22 receives a click signal immediately after receiving this click signal, i.e., the touch signal corresponding to the touch portion 160, in step 902, among the individual data included in the small classification data which is label-displayed in the selection button 34 corresponding to the touch portion 160, e.g., among the registered mark data explained at the time of starting-up the registered mark search program, the registered mark data included in that small classification data are displayed on the selection buttons 32-54, or only the registered mark data belonging to this small classification data are extracted and then expanded, and the above-described registered mark search program is started-up.

Figure 54:
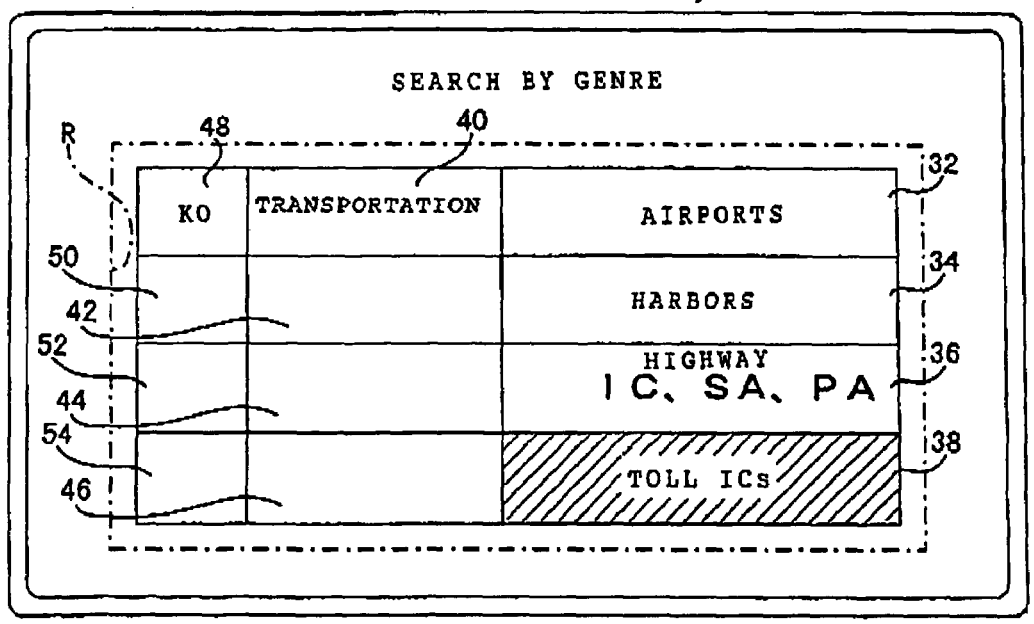
FIG. 54 is a screen example immediately before start of data movement (high speed scrolling) of small classification data.

Further, if the control section 22 receives a click signal immediately after receipt of the touch signal corresponding to the touch portion 152, in step 902, the small classification data included in the intermediate classification data which is label-displayed on the selection button 40 corresponding to the touch portion 152, is expanded into one column, and the labels of the small classification data within the display region R are label-displayed on the selection buttons 32-38 (as an example, see FIG. 54). However, if the number of small classification data belonging to that intermediate classification data is smaller than the number of selection buttons 32-38, the small classification data for the intermediate classification data before or after the corresponding intermediate classification data are similarly label-displayed.

Moreover, if the control section 22 receives a click signal immediately after receipt of a touch signal corresponding to the touch portion 150, in step 902, the intermediate classification data, which are included in the large classification data displayed on the selection button 48 corresponding to the touch portion 150, are expanded in one column, and the labels of the intermediate classification data within the display region R are displayed on the selection buttons 40-46.

Figure 52:
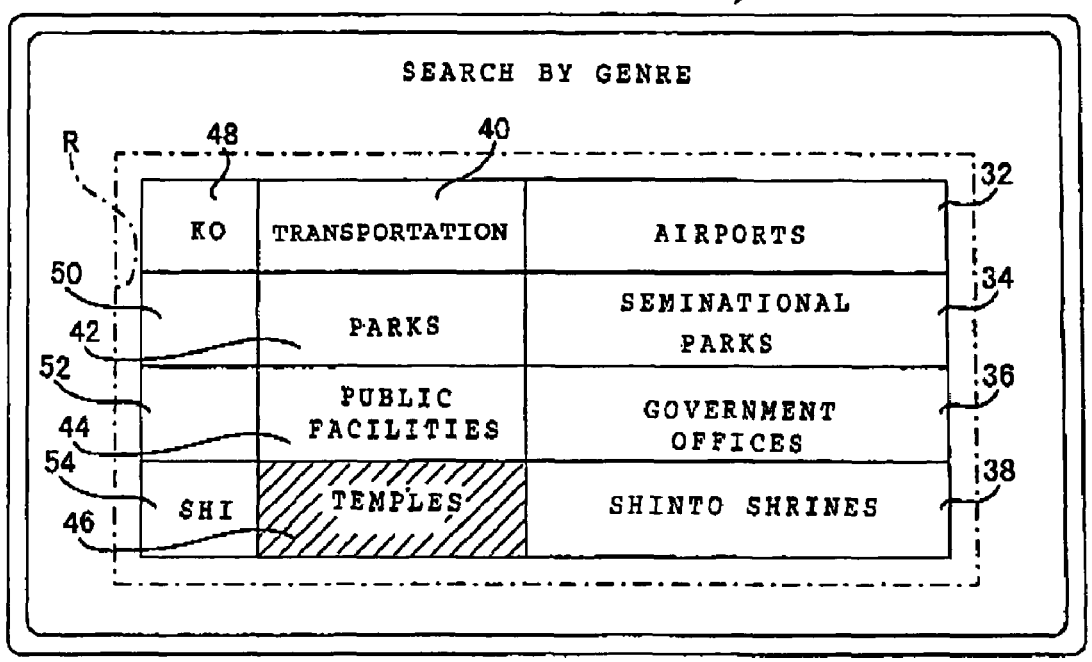
FIG. 52 is a screen example immediately before start of data movement (high speed scrolling) of intermediate classification data.

Further, the labels of the first small classification data, which belong to the respective intermediate classification data whose labels are displayed on the selection buttons 40-46, are respectively displayed on the selection buttons 32-38 positioned at the right sides of the selection buttons 40-46 at which the labels of the corresponding intermediate classification data are displayed (see FIG. 52 as one example). However, when the number of intermediate and small classification data belonging to that large classification data is smaller than the number of selection buttons 40-46, the intermediate classification data and the classification data for the large classification data before or after that large classification data are similarly label-displayed.

In contrast, for example, when the finger is slid in the column direction on the sheet switch 110 as in the case in which, for example, the finger is slid from the touch portion 156 to the touch portion 162 and thereafter the finger is slid from the touch portion 162 to the touch portion 168 before the set time TA has been exceeded, and the finger is moved away from the sheet switch 110 before the set time TA is exceeded, the routine passes through steps 710, 712 of FIG. 40 and proceeds to step 736 and high-speed scrolling processing is carried out, in the same way as at the time of starting-up the above-described registered mark search program.

However, in the present embodiment, the classification data are divided into and lined up as the three classification data which are the large classification data, the intermediate classification data and the small classification data along the line directions of the selection buttons 32-54, and basically, there is no other classification data. Thus, data, which is positioned at the outer side of the display region R in the direction along the line direction of the selection buttons 32-54, does not exist. Accordingly, in the present embodiment, at the time of starting-up the search-by-genre program, high-speed scrolling and decelerated scrolling along the line direction of the selection buttons 32-54 is not carried out, and scrolling is not carried out in the line direction of the selection buttons 32-54 at the time of usual scrolling as well.

Further, in the present embodiment, the modes of high-speed scrolling and decelerated scrolling differ in accordance with the way the finger slides on which of the columns of the touch portions 150-172 which are in matrix form. Hereinafter, explanation will be given on a column-by-column basis.

When the high-speed scrolling processing is begun in step 814 due to the finger sliding from the touch portion 156 to the touch portion 168, first, all of the large classification data are lined up in one column.

Next, among the large classification data which are lined up in one column, the labels of the large classification data which can be displayed within the display region R are displayed on the selection buttons 48-52 from the position of the selection button 54 and the label of the large classification data which were reverse-displayed in step 902 on the basis of the touch signal received immediately before proceeding to step 736 in FIG. 40.

Figure 50:
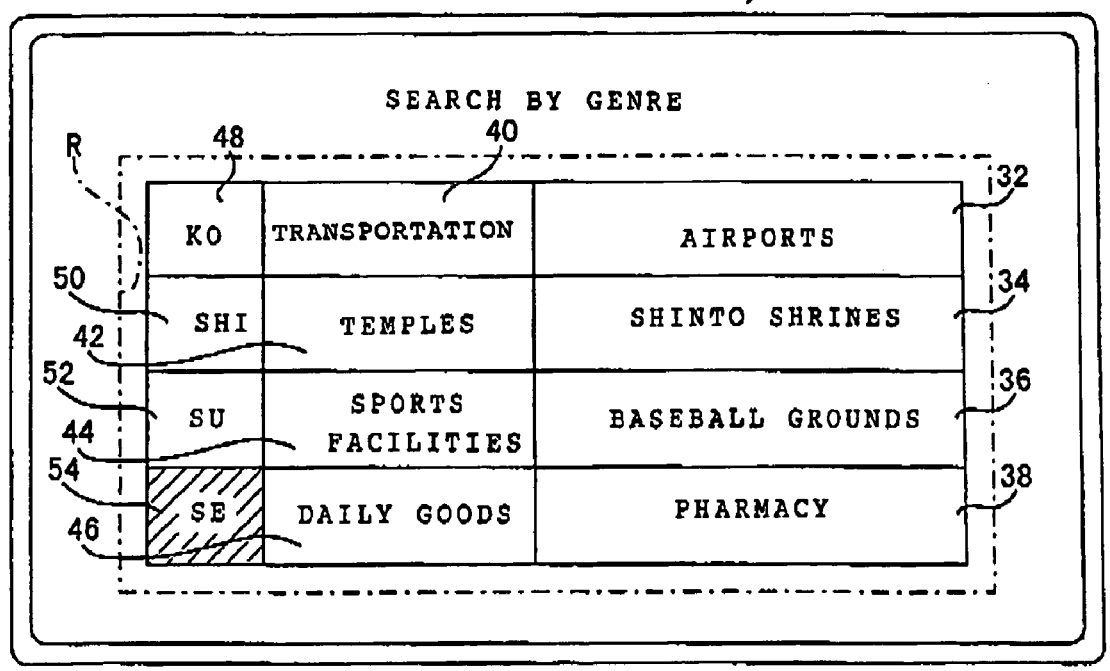
FIG. 50 is a screen example immediately before start of data movement (high speed scrolling) of large classification data.

Moreover, the labels of the first intermediate classification data, which belong to the respective large classification data displayed on the selection buttons 48-54, are displayed on the selection buttons 40-46 at the right of the corresponding selection buttons 48-54. Further, the labels of the first small classification data, which belong to the intermediate classification data of the labels displayed on the respective selection buttons 40-46, are displayed on the selection buttons 32-38 at the right of the corresponding selection buttons 40-46 (see FIG. 50).

Next, from this state, all of the large classification data move, with respect to the display region R, in the direction of the vector computed in step 808. Note that the movement of the large classification data at this time may be such that, as at the time of starting-up the registered mark search program, the large classification data (i.e., the four large classification data) within the display region R are moved at one time, and the large classification data (i.e., the four large classification data), which can be displayed in the display region R and which include the large classification data adjacent to the display region R at the side in the direction opposite the vector computed in step 808, are moved into the display region R at one time, and the labels of the corresponding large classification data are displayed on the selection buttons 48-54. Further, the large classification data may be moved in the direction of the vector computed in step 808, and the labels of the corresponding large classification data after movement may be displayed on the selection buttons 48-54.

Moreover, when the large classification data moves and labels are newly displayed within the selection buttons 48-54, the labels of the first intermediate classification data belonging to the respective large classification data which are displayed are newly displayed on the respective selection buttons 40-46 at the right side of the labels of the corresponding large classification data. The labels of the first small classification data belonging to the displayed intermediate classification data are newly displayed on the respective selection buttons 32-38 at the right side of the labels of the corresponding intermediate classification data (see FIG. 51).

On the other hand, when high-speed scrolling is started in step 814 due to the finger sliding from the touch portion 158 toward the touch portion 170, first, if all of the intermediate classification data or the large classification data which was desired previously is determined, the intermediate classification data belonging to that desired large classification data is expanded in one column.

Next, among the intermediate classification data which are lined up in one column, the labels of the intermediate classification data which can be displayed within the display region R are displayed on the selection buttons 40-44 from the position of the selection button 46 and the label of the intermediate classification data which were reverse-displayed in step 902 on the basis of the touch signal received immediately before proceeding to step 736 in FIG. 40.

Moreover, the labels of the first small classification data, which belong to the intermediate classification data of the labels displayed on the respective selection buttons 40-46, are displayed on the selection buttons 32-38 at the right of the corresponding selection buttons 40-46 (see FIG. 52).

In this state, the intermediate classification data move, with respect to the display region R, in the direction of the vector computed in step 808. Note that, in the same way as at the time of moving the large classification data, it may be structured such that the intermediate classification data (i.e., the four intermediate classification data) within the display region R are moved at one time, and the intermediate classification data (i.e., the four intermediate classification data), which can be displayed within the display region R and which include the intermediate classification data adjacent to the display region R at the side in the direction opposite to the vector computed in step 808, are moved into the display region R at one time, and the labels of the corresponding intermediate classification data are displayed on the selection buttons 48-54. Further, the intermediate classification data may be moved in the direction of the vector computed in step 808, and the labels of the corresponding intermediate classification data after movement may be displayed on the selection buttons 40-46.

When the intermediate classification data move and the labels are newly displayed within the selection buttons 40-46, the labels of the first small classification data corresponding to the respective intermediate classification data which are displayed are newly displayed on the respective selection buttons 32-38 at the right side of the labels of the corresponding intermediate classification data (see FIG. 53).

In contrast, when the high-speed scrolling processing is started in step 814 due to the finger sliding from the touch portion 160 toward the touch portion 172, first, if all of the small classification data, or the large classification data or the intermediate classification data desired previously is determined, the small classification data belonging to the desired large classification data or intermediate classification data are expanded in one column.

Next, among the small classification data which are lined up in one column, the labels of the small classification data which can be displayed within the display region R are displayed on the selection buttons 32-36 from the position of the selection button 38 and the label of the small classification data which were reverse-displayed in step 902 on the basis of the touch signal received immediately before proceeding to step 736 in FIG. 40 (see FIG. 54).

In this state, as shown in FIG. 55, the small classification data move, with respect to the display region R, in the direction of the vector computed in step 808. Note that, in the same way as at the time of moving the large classification data and the intermediate classification data, it may be structured such that the small classification data (i.e., the four small classification data) within the display region R are moved at one time, and the small classification data (i.e., the four small classification data), which can be displayed within the display region R and which include the small classification data adjacent to the display region R at the side in the direction opposite to the vector computed in step 808, are moved into the display region R at one time, and the labels of the corresponding small classification data are displayed on the selection buttons 32-38. Further, the small classification data may be moved in the direction of the vector computed in step 808, and the labels of the corresponding small classification data after movement may be displayed on the selection buttons 32-38.

After the above-described start of the high-speed scrolling, the loop of steps 802, 804, 806, 802 in FIG. 39 is circled, and high-speed scrolling (i.e., movement of the classification data) is repeatedly continued.

Next, in this state, for example, when the finger of the operator touches the touch portion 170 or the like within a time shorter than the set time TB on the sheet switch 110 and the touch signal accompanying this is sent from the infrared ray light-receiving portion 20 to the control section 22, direction setting processing is carried out in step 826. Further, in step 828, speed changing processing is carried out, and the display time within the display region R is set to be one level slower.

After passing through step 830, when decelerated scrolling is started in step 832, the classification data (i.e., one of the large classification data, the intermediate classification data, the small classification data), which was high-speed scrolled in the direction opposite to the direction from the substantial center of the sheet switch 110 toward the touch portion 170 or the like, moves in a moving mode which is similar to that at the time of the high-speed scrolling. Accompanying this, the classification data other than these classification data also move, and the labels of the classification data positioned within the display region R are displayed on the corresponding selection buttons 32-54.

After the above-described start of the decelerated scrolling, the loop of steps 802, 804, 806, 802 in FIG. 40 is circled, and during that time, the classification data which had moved into the display region R is moved after being displayed in the display region for the time set in step 826, i.e., a time which is one level slower than the display time therebefore.

In this way, at the time of starting-up the present search-by-genre program, even if there is a case such as the desired classification data (i.e., the classification data for which display is desired) is far from the classification data displayed in the display region R, by carrying out the above-described high-speed scrolling, the desired classification data can be displayed faster than when the usual scrolling is carried out. Furthermore, in a case in which the desired classification data is approaching after the start of high-speed scrolling, or in a case in which the desired classification data was displayed in the display region R but the stopping of the movement of the classification data was not in time, or the like, the desired classification data can calmly and reliably be displayed in the display region R by carrying out decelerated scrolling.

Further, by carrying out high-speed scrolling, decelerated scrolling, and usual scrolling for each of the large classification data, the intermediate classification data, and the small classification data, for example, even if the small classification data are huge or the sum of the individual data included in the respective small classification data (e.g., the registered mark data at the time of starting-up the registered mark search program) is huge, the desired small classification data or individual data can be quickly searched for, and the operability improves.

Moreover, by carrying out the high-speed scrolling and the decelerated scrolling as described above, it suffices to not separately display a high-speed scrolling mode button or a decelerated scrolling mode button within the display region R. Thus, effective, practical use of the display region R, such as increasing the size or increasing the numbers of the selection buttons 32-54 or the like, is possible.

Note that, as described above, the present embodiment was structured such that the three types which are the large classification data, the intermediate classification data, and the small classification data are lined up in the line direction of the selection buttons 32-54. However, a structure may be used in which these three types of classification data are lined up in the column direction of the selection buttons 32-54. In this case, it goes without saying that the moving direction (scrolling direction) of the respective classification data is the line direction, whereas the moving direction (scrolling direction) of the respective classification data was the column direction in the structure in which the three types of classification data were lined up in the line direction of the selection buttons 32-54.

Moreover, in the present embodiment, the classification data was structured by the three types which were the large classification data, the intermediate classification data and the small classification data. However, it is possible to make the classification data into four or more types. Of course, when the classification data is four or more types, this may be handled by increasing the line terminals 122-136 and the number of columns of the selection buttons 32-54. However, this can also be handled without increasing the line terminals 122-136 and the number of columns of the selection buttons 32-54, by using a structure in which scrolling along the line direction of the selection buttons 32-54 is possible, and the classification data positioned outside of the display region R in the line direction of the selection buttons 32-54 are moved and displayed within the display region R by scrolling along the line direction of the selection buttons 32-54.

Further, the present embodiment which was described up until now was structured such that all of the above-described map screen display program, registered mark search program and search-by-genre program can be started-up. However, a structure may be used which has (which can start-up), among these three programs, any one or two. Or, the above-described high-speed scrolling processing and decelerated scrolling processing may be applied to other programs.

Moreover, the present embodiment was structured to have both the high-speed scrolling processing and the decelerated scrolling processing, but may be structured so as to not have the decelerated scrolling processing.

Further, each of the above-described embodiments was structured such that the infrared ray signal L based on the touch signal and the click signal is sent from the controller 70 to the device main body 12, and the infrared ray signal L is processed and judged at the control section 22 of the device main body 12. However, a structure may be used in which the touch signals and the click signals are processed and judged at the CPU 88 within the controller 70, and only the results thereof are sent as the infrared ray signal L (in other words, the control means may be divided between the control section 22 and the CPU 88).

INDUSTRIAL APPLICABILITY

As described above, the screen operating device for a vehicle relating to the present invention can be utilized in car navigation devices and car audio devices mounted in vehicles, as well as in various devices using monitor devices, such as air conditioning devices for vehicles or the like which display various types of icons or virtual buttons on an output screen of a monitor device in place of a conventional operation panel and which select a desired function such as temperature adjustment or the like.

The invention claimed is:
1. A screen operating device for a vehicle comprising:
a case provided within a vehicle cabin, and provided as a separate body from an outputting means which displays an image;
position detecting means having, at a reverse surface of a sheet-shaped operation surface which is provided at the case in a state in which an obverse of the operation surface is exposed from the case and whose obverse is a flat surface or a curved surface, a plurality of first line terminals disposed parallel to one another and a plurality of second line terminals disposed parallel to one another along a direction orthogonal to the plurality of first line terminals in a state of being separated from the plurality of first line terminals in a direction of thickness of the operation surface, and when the operation surface is pressed, the position detecting means outputs a position detection signal corresponding to a pressed region on the press surface only when the operating surface is positively depressed a distance necessary to create contact between one of the plurality of first line terminals and one of the plurality of second line terminals;

pressing force detecting means provided within the case at a side of the second line terminals opposite the operation surface, and in a state in which one of the plurality of first line terminals contacts one of the plurality of second line terminals due to a pressing force with respect to the operation surface, when the pressing force is a predetermined value or more, and results in said operation surface being pushed a greater distance in a thickness direction than said distance necessary to output a position detection signal, a continuous state arises, and the pressing force detecting means outputs a pressing force detection signal which is different than the position detection signal; and control means provided as a separate body from the outputting means and the case, and displaying an image at the outputting means, and switching or maintaining the image displayed at the outputting means on the basis of a detection signal corresponding to at least one of a presence/absence of the operating body on the operation surface, a position of the operating body on the operating surface, and a locus of movement on the operation surface, among the position detection signal and the pressing force detection signal, wherein said control means carries out a specific processing other than the outputting of a predetermined screen upon the sequential receipt of a position detection signal followed by the receipt of a pressing force signal in less than a predetermined time.

2. The screen operating device for a vehicle of claim 1, wherein when a pressing force detection signal is not outputted after said predetermined time has elapsed from the outputting of a position detection signal, a predetermined screen is outputted to the outputting means.

3. The screen operating device for a vehicle of claim 1, wherein when the position detection signal is outputted continuously after said predetermined time has elapsed from output of the position detection signal, the control means outputs a predetermined screen to the outputting means.

4. The screen operating device for a vehicle of claim 1, wherein when the control means displays, at the outputting means, a first screen based on a specific function and one or a plurality of function switching portions belonging to another function which is different than the specific function, and the position of the operating body on the operation surface based on the position detection signal corresponds to the function switching portion, the control means displays at the outputting means a second screen based on the other function to which said function switching portion belongs.

5. The screen operating device for a vehicle of claim 4, wherein, in a state in which the control means displays the second screen on the outputting means, when the position detection signal is not outputted, the control means displays the first screen on the outputting means.

6. The screen operating device for a vehicle of claim 4, wherein, in a displayed state of the second screen, the control means displays on or a plurality of selection portions belonging to the other function, and in a state immediately after switching to the second screen, the control means sets the selection portion, which is at a position corresponding to the function switching portion which was selected during display of the first screen immediately before display of the second screen, in a selected state.

7. The screen operating device for a vehicle of claim 6, wherein the control means displays, at the function switching portion, processing contents at the time of selecting the selection portion which is set in the selected state immediately after the second screen switching.

8. The screen operating device for a vehicle of claim 4, wherein, in a displayed state of the second screen, the control means displays one or a plurality of selection portions belonging to the other function, and in a state immediately after switching to the second screen, the control means sets the selection portion, which is at a position corresponding to the function switching portion which was selected during display of the first screen immediately before display of the second screen, in a selected state.

9. The screen operating device for a vehicle of claim 8, wherein the control means displays, at the function switching portion, processing contents at the time of selecting the selection portion which set in the selected state immediately after the second screen switching.

10. The screen operating device for a vehicle of claim 1, wherein the control means displays data at respective predetermined positions in a display region of the outputting means, and, on the basis of the position detection signal, the control means computes a moving direction of the operating body moving on the operation surface, and the control means moves all of or a portion of the data in a direction substantially opposite to the moving direction, and displays, at the outputting means, data of an outer side of the display region in a direction corresponding to the moving direction.

11. The screen operating device for a vehicle of claim 10, wherein on the basis of the position detection signal which changes, the control means computes a staying time of the operating body at a least one point of a movement starting point of the operating body on the operating surface, one or plural intermediate points during movement, and a movement ending point, or a moving time from at least one of the points to another one point, and the control means executes movement of the data when the computed staying time or moving time is less than a predetermined value.

12. The screen operating device for a vehicle of a claim 11, wherein on the basis of a predetermined detection signal which the detecting means outputs other than the position detection signal which changes, the control means moves all of or a portion of the data at a speed which is different than a moving speed of the data based on the position detection signal which changes.

13. The screen operating device for a vehicle of claim 12, wherein on the basis of the position detection signal which changes, the control means computes a staying time of the operating body at least one point of a movement starting point of the operating body on the operating surface, one or plural intermediate points during movement, and a movement ending point, or a moving time from at least one of the points to another one point, and sets a moving speed of the data on the basis of the computed staying time or moving time.

14. The screen operating device for a vehicle of claim 13, wherein
the control means executes movement of the data when the position detection signal, in a case in which the position detecting means detects the operating body whose movement on the operation surface has ended and which is positioned on the operating surface, is outputted a predetermined time after the position detection signal.

15. The screen operating device for a vehicle of claim 10, wherein
the control means executes movement of the data when the position detection signal, in a case in which the position detecting means detects the operating body whose movement on the operating surface has ended and which is positioned on the operation surface, is not outputted immediately after the position detection signal which changes is outputted.

16. The screen operating device for a vehicle of claim 10, wherein
on the basis of the position detection signal which changes, the control means computes a staying time of the operating body at least one point of a movement starting point of the operating body on the operation surface, one or plural intermediate points during movement, and a movement ending point, or a moving time from at least one of the points to another one point, and sets a moving speed of the data on the basis of the computed staying time or moving time.

17. The screen operating device for a vehicle of claim 16, wherein
the control means executes movement of the data when the position detection signal, in a case in which the position detecting means detects the operating body whose movement on the operation surface has ended and which is positioned on the operation surface, is not outputted immediately after the position detection signal which changes is outputted.

18. The screen operating device for a vehicle of claim 10, wherein
on the basis of a predetermined detection signal which the detecting means outputs other than the position detection signal which changes, the control means moves all of or a portion of the data at a speed which is different than a moving speed of the data based on the position detection signal which changes.

19. The screen operating device for a vehicle of claim 18, wherein
on the basis of the position detection signal which changes, the control means computes a staying time of the operating body at least one point of a movement starting point of the operating body on the operation surface, one or plural intermediate points during movement, and a movement ending point, or a moving time from at least one of the points to another one point, and sets a moving speed of the data on the basis of the computed staying time or moving time.

20. The screen operating device for a vehicle of claim 19, wherein
the control means executes movement of the data when the position detection signal, in a case in which the position detecting means detects the operating body whose movement on the operation surface has ended and which is positioned on the operation surface, is not outputted immediately after the position detection signal which changes is outputted.

21. A screen operating device for a vehicle comprising:
a case provided within a vehicle cabin, and provided as a separate body from an outputting means which displays an image;
position detecting means having, at a reverse surface of a sheet-shaped operation surface which is provided at the case in a state in which an obverse of the operation surface is exposed from the case and whose obverse is a flat surface or a curved surface, a plurality of first line terminals disposed parallel to one another and a plurality of second line terminals disposed parallel to one another along a direction orthogonal to the plurality of first line terminals in a state of being separated from the plurality of first line terminals in a direction of thickness of the operation surface, and when the operation surface is pressed, the position detecting means outputs a position detection signal corresponding to a pressed region on the press surface only when the operating surface is positively depressed a distance necessary to create contact between one of the plurality of first line terminals and one of the plurality of second line terminals;
pressing force detecting means provided within the case at a side of the second line terminals opposite the operation surface, and in a state in which one of the plurality of first line terminals contacts one of the plurality of second line terminals due to a pressing force with respect to the operation surface, when the pressing force is a predetermined value or more that is greater than a pressing force required for the position detecting means to output a position detection signal, a continuous state arises, and the pressing force detecting means outputs a pressing force detection signal which is different than the position detection signal; and
control means provided as a separate body from the outputting means and the case, and displaying an image at the outputting means, and switching or maintaining the image displayed at the outputting means on the basis of a detection signal corresponding to at least one of a presence/absence of the operating body on the operation surface, a position of the operating body on the operating surface, and a locus of movement on the operation surface, among the position detection signal and the pressing force detection signal,
wherein said control means carries out a specific processing other than the outputting of a predetermined screen upon the sequential receipt of a position detection signal followed by the receipt of a pressing force signal in less than a predetermined time.

* * * * *